United States Patent
Saito

(10) Patent No.: US 12,004,551 B2
(45) Date of Patent: Jun. 11, 2024

(54) FAT/OIL COMPOSITION CONTAINING FINE PARTICLE COMPOSITE AND METHOD FOR PRODUCING SAME

(71) Applicant: MIZKAN HOLDINGS CO., LTD., Aichi (JP)

(72) Inventor: Takeki Saito, Aichi (JP)

(73) Assignee: Mizkan Holdings Co., Ltd., Aichi (JP)

( * ) Notice: Subject to any disclaimer, the term of this patent is extended or adjusted under 35 U.S.C. 154(b) by 756 days.

(21) Appl. No.: 17/115,616

(22) Filed: Dec. 8, 2020

(65) Prior Publication Data
US 2021/0084961 A1    Mar. 25, 2021

Related U.S. Application Data

(63) Continuation of application No. PCT/JP2019/019209, filed on May 15, 2019.

(30) Foreign Application Priority Data

Jun. 8, 2018 (JP) ................ 2018-110107
Nov. 9, 2018 (WO) .......... PCT/JP2018/041708

(51) Int. Cl.
   A23P 10/47    (2016.01)
   A23D 9/007    (2006.01)
   A23L 5/30     (2016.01)
   A23L 19/00    (2016.01)
   A23L 29/00    (2016.01)
   A23L 33/105   (2016.01)
   A23L 33/24    (2016.01)

(52) U.S. Cl.
   CPC ............ A23P 10/47 (2016.08); A23D 9/007 (2013.01); A23L 5/32 (2016.08); A23L 19/01 (2016.08); A23L 29/04 (2016.08); A23L 33/105 (2016.08); A23L 33/24 (2016.08)

(58) Field of Classification Search
   CPC ........ A23P 10/47; A23L 33/24; A23L 33/105; A23L 29/04; A23L 19/01; A23L 5/32; A23D 9/007
   See application file for complete search history.

(56) References Cited

U.S. PATENT DOCUMENTS

| | | | |
|---|---|---|---|
| 2010/0143568 A1 | 6/2010 | Quail et al. | |
| 2011/0293785 A1* | 12/2011 | Franklin | C12P 7/6445 426/61 |
| 2012/0288598 A1* | 11/2012 | Leusner | A23L 7/161 426/291 |
| 2016/0309751 A1* | 10/2016 | Kemboi | A23L 19/03 |
| 2017/0119024 A1* | 5/2017 | Shin | A23L 2/04 |
| 2019/0373925 A1 | 12/2019 | Higuchi et al. | |
| 2019/0373929 A1 | 12/2019 | Higuchi et al. | |

FOREIGN PATENT DOCUMENTS

| | | |
|---|---|---|
| AU | 2018344621 A1 | 9/2019 |
| AU | 2018417768 A1 | 2/2020 |
| BR | 0302585 A | 3/2004 |
| CN | 101480218 A | 7/2009 |
| CN | 107156623 A | 9/2017 |
| IN | 103096725 A | 5/2013 |
| JP | H02186942 A | 7/1990 |
| JP | H07278586 A | 10/1995 |
| JP | H07327605 A | 12/1995 |
| JP | H10028565 A | 2/1998 |
| JP | 2002001155 A | 1/2002 |
| JP | 2003144949 A | 5/2003 |
| JP | 2004159606 A | 6/2004 |
| JP | 2006141291 A | 6/2006 |
| JP | 2007268515 A | 10/2007 |
| JP | 2008173092 A | 7/2008 |
| JP | 2008231024 A | 10/2008 |
| JP | 2009543562 A | 12/2009 |
| JP | 2014103914 A | 6/2014 |
| JP | 2015208315 A | 11/2015 |
| WO | 03/059085 A1 | 7/2003 |
| WO | 2018155488 A1 | 8/2018 |
| WO | 2019/069490 A1 | 4/2019 |
| WO | 2019138596 A1 | 7/2019 |
| WO | 2019/193780 A1 | 10/2019 |

OTHER PUBLICATIONS

English Translation for JP2014103914 published Jun. 2014.*
Fleming. Jul. 2012. "How to Substitut Butter". https://www.godairyfree.org/dairy-substitutes/how-to-substitute-butter.*
Altomonte. Sep. 2017. "How To Substitute Oil For Butter In A Recipe". https://www.yummy.ph/lessons/baking/oil-substitute-for-butter-in-baking.*
Bob's Red Mill. Jan. 2018. "Can I Substitute Oil for Butter?". https://www.bobsredmill.com/blog/healthy-living/can-i-substitute-oil-for-butter/.*
Examination Report No. 2 issued in corresponding Australian Application No. 2019282505, dated May 7, 2021 (12 pages).
Office Action issued in corresponding Brazilian Application No. BR1120200249718, dated May 25, 2021 (21 pages).

(Continued)

*Primary Examiner* — Anthony J Weier
(74) *Attorney, Agent, or Firm* — Osha Bergman Watanabe & Burton LLP

(57) ABSTRACT

A composition facilitates smooth and efficient intake of a food containing abundant insoluble dietary fibers, including non-edible part, through improvement in its texture and taste. The composition includes a fine particle composite having insoluble dietary fibers and fat/oil. The composition includes edible and inedible parts of a food material. A dry weight ratio of inedible part to edible and inedible part is 1% to 80%. The composition has 0.1 mass % or more of insoluble dietary fibers, a fine particle content of 2 to 98 mass %, a total fat/oil content of 10 to 98 mass %, and less than 20 mass % water. A modal diameter after ultrasonication is 0.3 to 200 μm, a ratio of specific surface area per unit volume after ultrasonication to minimum particle size after ultrasonication is 0.1 or more, a ratio of specific surface area per unit volume before and after ultrasonication is 0.01 to 0.99.

19 Claims, No Drawings

(56) References Cited

OTHER PUBLICATIONS

Office Action issued in corresponding Chinese Application No. 2019800355513.7, dated Jun. 7, 2021 (14 pages).
Office Action issued in corresponding Indian Application No. 202017046775, dated Aug. 11, 2021 (7 pages).
D.S. Sogi et al., "Biological evaluation of tomato waste seed meals and protein concentrate", Food Chemistry, vol. 89, 2005, pp. 53-56 (4 pages).
S.C. Peyton et al., "Corncobs as Energy with Urea Nitrogen in Dairy Rations", Journal of Dairy Science, vol. 65, No. 8, 1982, pp. 1465-1471 (7 pages).
International Search Report issued in International Application No. PCT/JP2019/019209, mailed Aug. 13, 2019 (2 pages).
Written Opinion issued in International Application No. PCT/JP2019/019209, mailed Aug. 13, 2019 (11 pages).

* cited by examiner

FAT/OIL COMPOSITION CONTAINING FINE PARTICLE COMPOSITE AND METHOD FOR PRODUCING SAME

TECHNICAL FIELD

One or more embodiments of the present invention relate to a fat/oil composition containing a fine particle composite containing insoluble dietary fibers and a method for producing thereof.

BACKGROUND

Conventionally, a composition containing dietary fibers having various functions have been desired to be actively eaten in terms of its health function. However, a composition containing a large amount of dietary fibers is incompatible with other foods, and may not be satisfactorily eaten in a daily diet, which has prevented people from applying to various uses.

Particularly, since insoluble dietary fibers are insoluble in water by nature, a composition containing a large amount of insoluble dietary fibers tends to cause water separation in the composition, and due to its poor texture, it has become a large obstacle for daily food intake.

Although a method of using a food containing insoluble dietary fibers as a powder composition, its stability is poor, so that it becomes palatable as if it contained paper pulp in the mouth at the time of eating, and not only deteriorates the eating taste of other foods but also the fibers are entangled with each other in the mouth and can be eaten smoothly.

Further, as a composition containing crushed dietary fibers, for example, a seasoning obtained by pulverizing green and yellow vegetables in the presence of oil (Patent Literature 1), a spread food in which a non-nut plant material is pulverized to produce a powder having an average particle diameter of less than about 100 μm, and then the obtained powder is exposed to an elevated temperature (Patent Literature 2), and the like have been reported.

As a size reduction technique of food, a seed coat, a seed and an edible oil are contained, and a solid content of 50% integrated diameter (median diameter) is 4 to 15 μm. A method for producing a natural product in which a natural product having a moisture content of 5 wt % or less and a maximum particle diameter of 5000 μm or less is ultrafinely pulverized to a maximum particle diameter of 30 μm or less by an ultrafine pulverizer having a pulverizing function in an organic medium (Patent Literature 4), and a method for producing an ultrafinely pulverized product of a natural product having a maximum particle size of 100 μm or less by a one-step wet pulverization using an ultrafinely pulverizing machine having an abrasion function and a whole natural product in a dry state as a raw material (Patent Literature 5) have been reported.

Further, as techniques associated with a food containing microrefined dietary fibers, a vegetable juice containing fine cellulose having an average particle diameter of 20 μm or less (Patent Literature 6), a vegetable beverage containing ground burdock fibers having an average particle diameter of 163 μm or less (Patent Literature 7), a liquid composition containing crystalline cellulose, a water-insoluble component having a specific gravity of 1 g/cm3 or more and an oil having fluidity at 25° C. (Patent Literature 8), and the like have been reported.

PATENT LITERATURES

[Patent Literature 1] JP 2006-141291-A
[Patent Literature 2] JP-2009-543562-A
[Patent Literature 3] JP 2004-159606-A
[Patent Literature 4] JP 2003-144949-A
[Patent Literature 5] JP 2007-268515-A
[Patent Literature 6] JP H10-028565-A
[Patent Literature 7] JP 2008-173092-A
[Patent Literature 8] JP 2015-208315-A However, Patent Literatures 1 to 5 do not focus on insoluble dietary fibers, nor do they make dietary fibers easier to take in. Patent Literatures 6 and 7, which focus on dietary fibers, simply make the dietary fibers into vegetable juice, but they do not relate to a fat/oil composition. Patent Literature 8 does not relate to an invention containing a fine particle composite containing dietary fibers, or an invention which makes the dietary fibers easier to take in.

SUMMARY

One or more embodiments of the present invention includes provision of a composition which facilitates to smoothly and efficiently take in a food containing a large amount of insoluble dietary fibers, including a non-edible part, through the improvement of its texture and taste.

In using a non-edible part of foods (food materials) containing insoluble dietary fibers which were not conventionally used for eating, together with an edible part of foods (food materials), as a result of intensive studies, the present inventor found that the characteristics such as eatability of foods (food materials) containing many insoluble dietary fibers were improved by forming a composite which can be disintegrated by external disturbance and controlling the composite particle size to a predetermined size, controlling the ratio of the post-disturbance fine particle minimum particle size [μm] to the pre-disturbance fine particle specific surface area per volume unit [m$^2$/mL] in a predetermined range, and adjusting the content of the components in the composition in a predetermined range, controlling microrefinement so as to adjust the ratio of the post-disturbance specific surface area per volume unit [m$^2$/mL] of the fine particle to the pre-disturbance specific surface area per volume unit [m$^2$/mL] of the fine particle in a predetermined range, controlling the viscosity by a Bostwick viscometer at 20° C. and for 1 second in a predetermined range.

That is, one or more embodiments of the present invention provide the following.

[1] A composition comprising
  a fine particle composite comprising insoluble dietary fibers and
  a fat/oil,
  wherein the composition satisfies the following (1) to (8):
  (1) the composition comprises an edible part and an inedible part of a food material, wherein a dry weight proportion of the inedible part/(the edible part+the inedible part) is 1% or more and 80% or less,
  (2) the composition comprises the insoluble dietary fiber at a content of 0.1 mass % or more,
  (3) a fine particle content is 2 mass % or more and 98 mass % or less,
  (4) a total fat/oil content is 10 mass % or more and 98 mass % or less,
  (5) the composition comprises water at a content of less than 20 mass %,
  (6) a modal diameter after ultrasonication is 0.3 μm or more and 200 μm or less,
  (7) (specific surface area per unit volume after ultrasonication [m$^2$/mL])/(minimum particle size after ultrasonication [μm]) is 0.1 or more, (8) (specific surface area per unit volume before ultrasonication [m²/mL])/(specific surface area per unit volume after ultrasonication [m²/mL]) is 0.01 or more and 0.99 or less.

[2] The composition according to [1], wherein the total fat/oil content is 20 mass % or more and 98 mass % or less.

[3] The composition according to [1] or [2], wherein the total fat/oil content [mass %]/(water content [mass %]+total fat/oil content [mass %]) is 75% or more.

[4] The composition according to any one of [1] to [3], wherein 90 mass % or more of the total fat/oil content is an edible fat/oil in a liquid state at 20° C.

[5] The composition according to any one of [1] to [4], wherein a viscosity by a Bostwick viscometer at a measurement temperature of 20° C. for a measurement time of 1 second is 0.1 cm or more.

[6] The composition according to any one of [1] to [5], wherein a viscosity of a fat/oil part in the composition by a Bostwick viscometer at a measurement temperature of 20° C. for a measurement time of 10 seconds is 10.0 cm or more.

[7] The composition according to any one of [1] to [6], wherein a maximum particle size before ultrasonication is 30 μm or more.

[8] The composition according to any one of [1] to [7], wherein the fine particle content is 15 mass % or more.

[9] The composition according to any one of [1] to [8], not comprising an emulsifier as a food additive formulation.

[10] The composition according to any one of [1] to [9], wherein a total content of food materials containing insoluble dietary fibers to a total insoluble component content in the composition is 30 mass % or more.

[11] The composition according to any one of [1] to [10], wherein the insoluble dietary fibers contain those derived from an edible part and/or an inedible part of a food material containing insoluble dietary fibers.

[12] The composition according to [11], wherein the insoluble dietary fibers include those derived from an edible part and an inedible part of the same kind of a food material containing insoluble dietary fibers.

[13] The composition according to [11] or [12], wherein the food material containing insoluble dietary fibers is one or more selected from the group consisting of nuts/seeds, grains, pulses, vegetables, tubers and roots, mushrooms and fruits.

[14] The composition according to [13], wherein the food material containing insoluble dietary fibers is one or more selected from the group consisting of carrots, pumpkins, corns, edamame, bell peppers, beets, green peas, broccolis and tomatoes.

[15] The composition according to [13] or [14], wherein an inedible part of the food material containing insoluble dietary fibers is one or more selected from the group consisting of corn cores, bell pepper seeds or stems, pumpkin seeds or guts, carrot skins or stems, green pea pods, beet skins, broccoli stalks and leaves, edamame pods and tomato stems.

[16] The composition according to any one of [13] to [15], wherein a water activity value of the food material containing insoluble dietary fibers is 0.10 or more and 0.95 or less.

[17] The composition according to any one of [11] to [16], comprising a pulverized product of the food material containing insoluble dietary fibers.

[18] The composition according to [17], wherein the pulverized product is a stirred media mill-treated product of a dried food material.

[19] The composition according to [18], wherein the stirred media mill-treated product is a wet stirred media mill-treated product.

[20] A composition comprising
a fine particle composite comprising insoluble dietary fibers and
a fat/oil,
wherein the composition satisfies the following (1) to (8):
(1) the composition comprises an edible part and an inedible part of a food material, wherein a dry weight ratio of (the inedible part)/(edible part+inedible part) is 1% or more and 80% or less,
(2) the composition comprises insoluble dietary fibers at a content of 0.1 mass % or more,
(3) a fine particle content is 2 mass % or more and 98 mass % or less,
(4) a total fat/oil content is 10 mass % or more and 98 mass % or less,
(5) the composition comprises water at a content of less than 20 mass %,
(6) a modal diameter after ultrasonication is 0.3 μm or more and 200 μm or less,
(7) (specific surface area per unit volume after ultrasonication [m²/mL])/(minimum particle size after ultrasonication [μm]) is 0.1 or more,
(8) 90 mass % or more of the total fat/oil content is a liquid edible fat/oil at 20° C.

[21] A composition comprising
a fine particle composite comprising insoluble dietary fibers and
a fat/oil,
wherein the composition satisfies the following (1) to (8):
(1) the composition comprises an edible part and an inedible part of a food material, wherein a dry weight ratio of (the inedible part)/(the edible part+the inedible part) is 1% or more and 80% or less,
(2) the composition comprises the insoluble dietary fibers at a content of 0.1 mass % or more,
(3) a fine particle content is 2 mass % or more and 98 mass % or less,
(4) a total fat/oil content is 10 mass % or more and 98 mass % or less,
(5) a water content is less than 20 mass %,
(6) a modal diameter after ultrasonication is 0.3 μm or more and 200 μm or less,
(7) (specific surface area per unit volume after ultrasonication [m²/mL])/(minimum particle size after ultrasonication [μm]) is 0.1 or more,
(8) a viscosity of a fat/oil part in the composition by a Bostwick viscometer at a measurement temperature of 20° C. for a measurement time of 10 seconds is 10.0 cm or more.

[22] A composition comprising
a fine particle composite comprising insoluble dietary fibers and
a fat/oil,
wherein the composition satisfies the following (1) to (8):
(1) the composition comprises an edible part and an inedible part of a food material, wherein a dry weight proportion of (the inedible part)/(the edible part+the inedible part) is 1% or more and 80% or less,
(2) the composition comprises the insoluble dietary fibers at a content of 0.1 mass % or more,
(3) a fine particle content is 2 mass % or more and 98 mass % or less,
(4) a total fat/oil content is 10 mass % or more and 98 mass % or less, (5) the composition comprises water at a content of less than 20 mass %,
(6) a modal diameter after ultrasonication is 0.3 µm or more and 200 µm or less,
(7) (specific surface area per unit volume after ultrasonication [m²/mL])/(minimum particle size after ultrasonication [µm]) is 0.1 or more,
(8) a total content of food materials containing insoluble dietary fibers to a total insoluble component content in the composition is 30 mass % or more.

[23] A composition comprising
a fine particle composite comprising insoluble dietary fibers and
a fat/oil,
wherein the composition satisfies the following (1) to (8):
(1) the composition comprises an edible part and an inedible part of a food material, and a dry weight ratio of (the inedible part)/(edible part+inedible part) is 1% or more and 80% or less,
(2) the composition comprises the insoluble dietary fibers at a content of 0.1 mass % or more,
(3) a fine particle content is 2 mass % or more and 98 mass % or less,
(4) a total fat/oil content is 10 mass % or more and 98 mass % or less,
(5) the composition comprises water at a content of less than 20 mass %,
(6) a modal diameter after ultrasonication is 0.3 µm or more and 200 µm or less,
(7) (specific surface area per unit volume after ultrasonication [m²/mL])/(minimum particle size after ultrasonication [µm]) is 0.1 or more,
(8) the insoluble dietary fibers comprises those derived from an edible part and an inedible part of a food material of the same kind.

[24] A food product and a drink product comprising the composition according to any one of [1] to [23].

[25] A liquid seasoning comprising the composition according to any one of [1] to [23].

[26] A method for producing the composition according to any one of [1] to [23], the method comprising pulverizing a food material containing insoluble dietary fibers.

[27] The method according to [26], wherein a water activity value of the food material containing insoluble dietary fibers is 0.95 or less.

[28] The method according to [26] or [27], comprising adding fine particles of one or more food material containing insoluble dietary fibers, selected from the group consisting of dried nuts/seeds, dried grains, dried pulses, dried vegetables, dried tubers and roots, dried mushrooms and dried fruits and a fat/oil.

[29] The method according to any one of [26] to [28], comprising pulverizing a composition comprising fine particles of a food material containing insoluble dietary fibers and a fat/oil to prepare the composition in such a way as to satisfy the following (1) to (8):
(1) the composition comprises an edible part and an inedible part of the food material, and a dry weight ratio of (the inedible part)/(the edible part+the inedible part) is 1% or more and 80% or less,
(2) the composition comprises insoluble dietary fibers at a content of 0.1 mass % or more,
(3) a fine particle content is 2 mass % or more and 98 mass % or less,
(4) a total fat/oil content is 10 mass % or more and 98 mass % or less,
(5) the composition comprises water at a content of less than 20 mass %,
(6) a modal diameter after ultrasonication is 0.3 µm or more and 200 µm or less,
(7) (specific surface area per unit volume after ultrasonication [m²/mL])/(minimum particle size after ultrasonication [µm]) is 0.1 or more,
(8) (specific surface area per unit volume before ultrasonication [m²/mL])/(specific surface area per unit volume after ultrasonication [m²/mL]) is 0.01 or more and 0.99 or less.

[30] A method for enhancing eatability of a composition comprising insoluble dietary fibers, the method comprising pulverizing the composition containing insoluble dietary fibers to obtain the composition according to any one of [1] to [23].

[31] A method for producing a liquid seasoning, the method comprising causing the liquid seasoning to contain the composition according to any one of [1] to [23].

[32] A method for producing a consistent liquid composition, the method comprising mixing the composition according to any one of [1] to [23] and a liquid composition.

[33] A method for increasing viscosity of a liquid composition, the method comprising mixing the composition according to any one of [1] to [23] and a liquid composition.

[34] A method for producing an acidic emulsified liquid seasoning, the method comprising mixing the composition according to any one of [1] to [23] and an emulsified liquid composition.

[35] A method for controlling denaturation of an emulsified liquid seasoning, the method comprising mixing the composition according to any one of [1] to [23] and an emulsified liquid composition.

[36] A method for producing an emulsified liquid composition, the method comprising mixing the composition according to any one of [1] to [23], a liquid fat/oil and water.

[37] A method for enhancing emulsion stability of an emulsified liquid composition after mixed, the method comprising mixing the composition according to any one of [1] to [23] and a liquid fat/oil and water.

[38] A method for producing a food product composition, the method comprising mixing the composition according to any one of [1] to [23] and a solid food material, wherein the composition and the solid food material are in a state of being homogeneously mixed.

[39] A method for causing a mixture of the composition according to any one of [1] to [23] and a solid food material to become compatible without unevenness, the method comprising mixing the composition and the solid food material.

[40] A method for producing a heated dish, the method comprising heat cooking a food material using the composition according to any one of [1] to [23] as a cooking oil for a food product.

[41] A method for using the composition according to any one of [1] to [23] as a heat cooking oil for a food product.

[42] A method for producing an expandable food product to which water resistance is imparted, comprising treating an expandable food product with the composition according to any one of [1] to [23].

[43] A method for imparting water resistance to an expandable food product, comprising treating an expandable food product with the composition according to any one of [1] to [23].

[44] A method for producing a food product with suppressed component loss during cooking, the method comprising treating a food product whose component is likely to be lost during cooking with the composition according to any one of [1] to [23].

[45] A method for controlling component loss from a food product whose component is likely to be lost during cooking, the method comprising treating the food product with the composition according to any one of [1] to [23].

The composition containing a fine particle composite containing insoluble dietary fibers derived from food materials and a fat/oil according to one or more embodiments of the present invention is superior in the properties such as improvement of eatability of the insoluble dietary fibers, especially its non-edible part through the improvement of texture and taste. In particular, if the microrefinement is carried out such that the ratio of the post-ultrasonication specific surface area per unit volume of the fine particles to the pre-ultrasonication specific surface area per unit volume of the fine particles to from 0.01 to 0.99, the texture and swallowability upon intake are improved.

DETAILED DESCRIPTION

Examples of one or more embodiments of the present invention are described hereinafter, but one or more embodiments of the present invention are not limited to these embodiments, and can be implemented with any modifications without departing from the spirit thereof.

[Fat/Oil Composition Containing Insoluble Dietary Fibers]

An aspect of one or more embodiments of the present invention relates to a composition comprising a fine particle composite comprising insoluble dietary fibers and a fat/oil (hereinafter suitably referred to as "the composition of one or more embodiments of the present invention").

[Insoluble Dietary Fibers]

The composition of one or more embodiments of the present invention contains insoluble dietary fibers. In the present disclosure, the "dietary fibers" means the general term for indigestible components in food products which are not digested by human digestive enzymes. In the present disclosure, the "insoluble dietary fibers" refers to those which are water-insoluble among the dietary fibers. Examples of the insoluble dietary fibers include, but not limited thereto, lignins, cellulose, hemicelluloses, chitins, and chitosans. However, lignins, particularly acid-soluble lignin, among insoluble dietary fibers have notably poor eatability which is thus supposed to notably benefit the eatability improvement effect when one or more embodiments of the present invention is applied. From such a viewpoint, the insoluble dietary fibers containing lignins, particularly acid-soluble lignin, are preferable.

The composition of one or more embodiments of the present invention contains a certain content percentage or more of insoluble dietary fibers. Specifically, the lower limit of content percentage of insoluble dietary fibers in the composition of one or more embodiments of the present invention is typically 0.1 mass % or more. Particularly, it is preferable that the lower limit thereof be additionally 0.2 mass % or more, further 0.3 mass % or more, further 0.4 mass % or more, further 0.5 mass % or more, and furthermore 0.7 mass % or more, or 1 mass % or more, or 1.5 mass % or more, or 2 mass % or more, or 2.5 mass % and particularly 3 mass % or more. When a content percentage of insoluble dietary fibers is the lower limit or more, the eatability of the composition is notably enhanced, hence preferable. On the other hand, the upper limit of content percentage of insoluble dietary fibers in the composition of one or more embodiments of the present invention is not limited and, from the viewpoint of industrial productivity, it is preferable to be typically 20 mass % or less, additionally 15 mass % or less and further 10 mass % or less.

The constitution of insoluble dietary fibers in the composition of one or more embodiments of the present invention is not limited. However, from the reason described above, the eatability enhancement effect is supposed to be more notably obtained by the application of one or more embodiments of the present invention when a percentage of lignins (of these, acid-soluble lignin) in all the insoluble dietary fibers is a certain value or more. Specifically, it is preferable that a dry mass percentage of lignins (of these, acid-soluble lignin) in all the insoluble dietary fibers be typically 5% or more, additionally 10% or more, further 30% or more.

The origin of the insoluble dietary fibers is not limited and may be various natural materials containing insoluble dietary fibers or those synthesized. In the former case, the insoluble dietary fibers contained in various materials may be isolated and purified but such materials containing insoluble dietary fibers may also be used directly. In the latter case, food materials are preferable as the material containing insoluble dietary fibers. The food materials containing insoluble dietary fibers are to be described hereinafter.

For the measurement of contents of water, dietary fibers, insoluble dietary fibers and total fat/oil in one or more embodiments of the present invention, a common method used for component measurement of food products can be used; e.g., a measurement method in accordance with the methods described in STANDARD TABLES OF FOOD COMPOSITION IN JAPAN can be used. Specifically, a method of subjecting the composition to the modified Prosky method can be used for the quantitative method for dietary fibers and insoluble dietary fibers of a food product, a method of subjecting the composition to the vacuum heating drying method can be used for the quantitative method for water, and a method of subjecting the composition to Soxhlet extraction method for the quantitative method for a total fat/oil content.

[Food Material Containing Insoluble Dietary Fibers]

As described above, insoluble dietary fibers contained in the composition of one or more embodiments of the present invention may be those derived from food materials. As a result, the composition of one or more embodiments of the present invention may contain a food material containing insoluble dietary fibers. The kind of the food material containing insoluble dietary fibers is not limited and any food materials suitable for eating and drinking can be used. However, it is preferable to contain a certain percentage or more of insoluble dietary fibers. Specifically, it is preferable that a dry mass percentage of insoluble dietary fibers in the food material be typically 1 mass % or more, additionally 3 mass % or more, further 5 mass % or more and particularly 10 mass % or more.

Examples of such a food material containing insoluble dietary fibers include, but not limited thereto, plant-based materials, microbe-based materials and animal-based materials. Of these, plant-based materials are preferable. Examples of the plant-based material include, but not limited thereto, vegetables, tubers and roots, fruits, algae, grains, nuts/seeds, pulses, mushrooms and spices. These food materials may be used singly, or 2 or more may be used together in any combination. Alternatively, these food materials may be used directly, or may be used after various treatments (e.g., drying, heating, removing harshness, skinning, removing nuts/seeds, after-ripening, salting and skin processing) are applied. The category of the food material can be judged as the state of the whole plant combined with the inedible parts.

The kinds of vegetables are not limited as long as an edible part and/or an inedible part thereof contains insoluble dietary fibers. Examples thereof include, but not limited thereto, radishes, carrots, rutabagas, parsnips, turnips, black salsifies, lotus roots, beets (beet (beetroots): cultivated varieties of beet taproots for consumption), threeleaf arrowhead, shallots, garlics, Rakkyo, lily bulbs, kale, onions, asparaguses, Japanese spikenard, cabbages, lettuces, spinaches, Chinese cabbages, turnip rape, Japanese mustard spinach, pak choi, Oriental garlic, scallions, nozawana, giant butterbur, fudanso (Swiss chard), water greens, tomatoes, eggplants, pumpkins, green peppers, cucumbers, myoga, cauliflowers, broccolis, edible chrysanthemums, bitter melons, okras, artichokes, zucchinis, sugar beets, tigernuts, gingers, perillas, horseradish, bell peppers, herbs (watercress, coriander, water spinach, celery, tarragon, chive, chervil, sage, thyme, laurel, parsley, mustard green (karashina), mugworts, basil, oregano, rosemary, peppermints, savory, lemon grass, dill, horseradish leaf, Japanese pepper leaf, stevia), western bracken fern, Asian royal ferns and bamboo shoot. Of these, carrots, pumpkins, tomatoes, bell peppers, cabbages, beets (beetroots), onions, broccolis, asparaguses, spinach and kale are preferable, and carrots, pumpkins, tomatoes, bell peppers, beets (beetroots), broccolis, spinach, kale and tomatoes are particularly preferable.

The kinds of tubers and roots are not limited as long as an edible part and/or an inedible part thereof contains insoluble dietary fibers. Examples thereof include, but not limited thereto, sweet potatoes, cassava, yacon, taro, eddoe, konnyaku yam, tashiroimo (Polynesian arrowroot), potatoes, purple sweet potatoes, Jerusalem artichoke, Asian fawnlilies, yams, Japanese yams, Chinese yams and Japanese arrowroot. Of these, purple sweet potatoes and sweet potatoes are particularly preferable.

The kinds of fruits are not limited as long as an edible part and/or an inedible part thereof contains insoluble dietary fibers. Examples thereof include, but not limited thereto, Chinese quinces, Siberian pears (white pears, Chinese pears), pears, quinces, common medlars, Amelanchier canadensis, shipovas, apples, American cherries (black cherries, dark cherries), apricots, plums, cherries (sweet cherries), sour cherries, blackthorns, Japanese plums, peaches, ginkgoes, chestnuts, chocolate vines, figs, persimmons, blackcurrants, raspberries, kiwi fruits, silverberries, mulberries (dodome), cranberries, cowberries (iwamomo, hamanashi, okamaringo), pomegranates, Hardy kiwi (shirakuchizuru, kokuwa), sea buckthorns (saji, hippophae, seaberries), gooseberries, jujubes, Japanese bush cherries (koume, ikuri), blue honeysuckles, bilberries, redcurrants, grapes, blackberries, blueberries, pawpaws, matsubusa, raspberries, downy cherries, Mandarin oranges, kumquats, trifoliate oranges, olives, loquats, Japanese bayberries, monk fruits, tropical fruits (e.g., mango, mangosteen, papaya, cherimoya, atemoya, banana, durian, star fruit, guava, pineapple, acerola, passion fruit, dragon fruit, lychee and canistel), strawberries, watermelons, melons, avocados, miracle fruits, oranges, lemons, prunes, yuzus, sudachi, grapefruits, bitter oranges and flat lemons. Of these, avocado and apple are preferable.

The kinds of algae are not limited as long as an edible part and/or an inedible part thereof contains insoluble dietary fibers. Examples thereof include, but not limited thereto, macroalgae such as konbu kelps, wakame seaweeds, lavers, green lavers and red algae; and microalgae such as green algae, red algae, blue-green algae, dinoflagellates and euglena. Specific examples thereof include sea lettuce, green laver, perforated sea lettuce, green caviar (kubirezuta), katashiokusa, green caviar, kuromiru, tamamiru, torinoashi (yuikiri), hitoegusa, hiraaonori, fusaiwazuta, grass kelp, akamoku, amijigusa, arame sea oak, antokume, ishige, ichimegasa, iroro, heath, umitoranoo, sea fan, oobamoku, Okinawa mozuku, kaigara amanori, kagome nori, kajime (arame sea oak), kayamonori, gibasa (akamoku, ginbaso, jinbaso, jibasa), sanadagusa, shiwanokawa, shiwayahazu, seiyo habanori, tsuruarame, nanori (kayamonori), nebarimo, nokogirimoku, habanori, hijiki, hirome, oyster thief, futomozuku, hondawara, makonbu, rigid hornwort, mugiwara nori (kayamonori), muchimo, moduku (mozuku), yuna, wakame, Asakusa nori, ibotsunomata, ushikenori, usukawakaninote, ezotsunomata (kurohaginnanso), oobusa, ogonori, okitsunori, obakusa, katanori, kabanori, kamogashiranori, kijinoo, kurohaginnanso (ezotsunomata), sakuranori, shiramo white algae, tanbanori, tsunomata, tsurushiramo, tsurutsuru, tosakanori, tosakamatsu, nogenori (fukuro funori), layer (nori, susabinori), hanafunori, harigane, hiragaragara, hirakusa, hiramukade, pirihiba, fukuro funori, fushitsunagi, makusa, maruba amanori, mitsudesozo, euglena, chlorella, mirin, mukadenori, yuikiri, yukari and red algae. Of these, konbu kelps, lavers and green lavers are particularly preferable. Of these algae, some of the microalgae such as chlorella have an extremely strong cell wall and are thus likely to have difficulty in forming composites of fine particles containing insoluble dietary fibers to be described later. For this reason, it is preferable to use microalgae pre-treated for cell wall destruction or use algae other than microalgae.

The kinds of nuts/seeds are not limited as long as an edible part and/or an inedible part thereof contains insoluble dietary fibers. Examples thereof include, but not limited thereto, almonds, cashew nuts, pecans, macadamia nuts, pistachios, hazelnuts, coconuts, pine nuts, sunflower seeds, pumpkin seeds, watermelon seeds, chinquapins, walnuts, chestnuts, ginkgoes, sesames and Brazil nuts. Of these, almonds, cashew nuts, macadamia nuts, pistachios, hazelnuts and coconuts are preferable.

The kinds of pulses are not limited as long as an edible part and/or an inedible part thereof contains insoluble dietary fibers. Food materials, a part of its edible parts is treated as vegetables (edamame, green peas), can also be considered as pulses or not as the state of the whole plant (soybeans and peas) combined with the inedible parts (pod, etc.). Examples thereof include, but not limited thereto, string beans, kidney beans, red string beans, white string beans, black beans, pinto beans, toramame beans, lima beans, scarlet runner beans, peas (particularly green peas, which are immature seeds), pigeon peas, mung beans, black-eyed peas, adzuki beans, broad beans, soybeans (particularly edamames, immature soybean seeds, which are soybeans harvested in pods while still immature and have characteristic of having green color appearance) chick peas, Lens culinaris, hiramame, lentils, peanuts, lupinus beans, grass peas, carobs, twisted cluster beans, African locust beans, coffee beans, cocoa beans and Mexican jumping beans. Of these, peas (particularly green peas, which are immature seeds) and soybeans (particularly edamames, immature seeds) are preferable. Cacao mass, as a processed product of cocoa beans, can also be used but cocoa beans are fermented during the production steps and further the husk and germ of cocoa beans are separated in the production steps thereby providing less of the original flavor. For this reason, it is preferable to use cocoa beans, when used, in forms other than cacao mass.

The kinds of grains are not limited as long as an edible part and/or an inedible part thereof contains insoluble dietary fibers. Examples thereof include, but not limited thereto, corns (particularly sweet corn), rice, wheats, barleys, great millets, oats, triticales, ryes, buckwheats, fonios, quinoas, barnyard millets, foxtail millets, millets, giant corns, sugar canes and amaranthuses. Of these, corns (particularly sweet corn) and giant corns are preferable.

The kinds of mushrooms are not limited as long as an edible part and/or an inedible part thereof contains insoluble dietary fibers. Examples thereof include, but not limited thereto, shiitake mushroom, matsutake mushroom, Jew's Ear Fungus, hen of the woods, polypore, oyster mushroom, king trumpet mushroom, enokitake mushroom, shimeji mushroom, honey mushroom, common mushroom, butterscotch mushroom, Jersey cow mushroom, hatsutake mushroom and weeping milk cap.

The kinds of spices are not limited as long as an edible part and/or an inedible part thereof contains insoluble dietary fibers. Examples thereof include, but not limited thereto, white peppers, red peppers, chili peppers, horseradish, mustards, poppy seeds, nutmegs, cinnamon, cardamoms, cumin, saffron, allspices, cloves, Japanese peppers, orange peels, fennel, licorices, fenugreeks, dill seeds, Chinese peppers, long peppers and olive fruits. Of these, white peppers, red peppers and chili peppers are particularly preferable.

For the food material containing insoluble dietary fibers, any food materials containing various examples provided above can be suitably selected and used but the selection may be made particularly considering the following properties.

For the food material containing insoluble dietary fibers, it is preferable to use food materials having a predetermined value or more of an available carbohydrate from the viewpoint of forming fine particle composites to be described later in the composition. Specifically, it is preferable that the available carbohydrate in the food material containing insoluble dietary fibers be typically 2% or more, additionally 3% or more, further 5% or more, furthermore 7% or more and particularly 10% or more. On the other hand, the food materials having a low monosaccharide equivalent such as sesame (the available carbohydrate is about 1 mass %) can also be used but it is preferable to use food materials having the lower limit or more of the available carbohydrate from the viewpoint of forming fine particle composites to be described later in the composition. Further, when a dried food material is used as the food material containing insoluble dietary fibers as described later, the available carbohydrate after drying may be the lower limit or more. An available carbohydrate content in a food material means the total value of directly analyzed components (starch, glucose, fructose, sucrose, maltose, lactose, galactose and trehalose) in the carbohydrates measured in accordance with the method described in STANDARD TABLES OF FOOD COMPOSITION IN JAPAN and a usable unit therefor is "% (monosaccharide equivalent g/100 g)".

Water activity of the food material containing insoluble dietary fibers is not particularly limited and it is preferable that a water activity be a predetermined value or less from the viewpoint of forming fine particle composites to be described later in the composition. Specifically, it is preferable that a water activity value of the food material containing insoluble dietary fibers be 0.95 or less, additionally 0.9 or less, further 0.8 or less and furthermore 0.65 or less. Water activities of common fruits and vegetables are often higher than the upper limit value described above and thus it is preferable that such a food material, when used as the food material containing insoluble dietary fibers, be subjected to dry treatment in advance as described later. On the other hand, the lower limit of water activity value of the food material of the insoluble dietary fibers is not particularly limited and it is preferable to be typically 0.10 or more, additionally 0.20 or more, further 0.30 or more and furthermore 0.40 or more from the viewpoint of easiness in storage management. The water activity value of a food material can be measured in accordance with a routine method using a common water activity meter.

The form of the food material containing insoluble dietary fibers is not particularly limited and a raw food material may be used or those subjected to various treatments as described above (e.g., drying, heating, removing harshness, skinning, removing nuts/seeds, after-ripening, salting and skin processing) may be used. However, it is preferable to use a food material subjected to dry treatment in advance, that is, a dry food material (dried nuts/seeds, dried grains, dried pulses, dried vegetables, dried tubers and roots, dried mushrooms and dried fruits), from the viewpoint of forming fine particle composites to be described later in the composition. The method for drying the food material can be any method commonly used for drying food products. Examples thereof include drying in the sun, drying in the shade, freeze drying, air drying (e.g., hot-air drying, fluidized bed drying, spray drying, drum drying and low-temperature drying), drying under applied pressure, drying under reduced pressure, microwave drying and oil-heat drying. Of these, methods of air drying (e.g., hot-air drying, fluidized bed drying, spray drying, drum drying and low-temperature drying) and freeze drying are preferable from the aspect of low degrees of changes in the original color tone and flavor found in a food material and controlling smells (burned smell, etc.) other than a food product.

When the food material containing insoluble dietary fibers is used in the composition of one or more embodiments of the present invention, it is preferable to use food materials having a predetermined value or more of an available carbohydrate from the viewpoint of forming fine particle composites to be described later in the composition. The usage percentage thereof is not limited and any percentage can be used depending on the kind of a food material and the content percentage of insoluble dietary fibers. However, the composition containing a certain percentage or more of a food material containing insoluble dietary fibers is preferable because more notable effects by the application of one or more embodiments of the present invention are achieved. Specifically, it is preferable that a total mass percentage of the food material containing insoluble dietary fibers (particularly, nuts/seeds, grains, pulses, vegetables, tubers and roots, mushrooms and fruits) on a dry mass basis to the total mass of all the insoluble components in the composition (components insoluble at 20° C. in the composition. For example, at 20° C., crystallized solid fats/oils insoluble in the composition and crystallized salts insoluble in the composition are included but liquid fats/oils which are liquid at 20° C. and soluble in the composition are not included.) on a dry mass basis be typically 30 mass % or more, additionally 40 mass % or more, additionally 50 mass % or more, additionally 60 mass % or more, additionally 70 mass % or more, further 80 mass % or more, furthermore 90 mass % or more and particularly 100 mass %. When the composition is a food product, any insoluble components contained therein are supposed to be derived from food materials but when these food materials are separated into food materials containing insoluble dietary fibers and the other food materials (free of insoluble dietary fibers), the above percentage can be calculated. For example, when a composition contains 20 parts by mass of fine particles containing insoluble dietary fibers derived from a dried carrot, which is a food material containing insoluble dietary fibers, 30 parts by mass of dried tuna which is the other food materials (free of insoluble dietary fibers) and 50 parts by mass of water, the percentage of the food material containing insoluble dietary fibers (carrot: 20 parts by mass) to the insoluble component (dried carrot+dried tuna: 50 parts by mass) is 40 mass %.

[Other Food Materials]

The composition of one or more embodiments of the present invention may contain any one or more food materials free of insoluble dietary fibers other than the food material containing insoluble dietary fibers described above. Examples of such food material include plant-based food materials, microbe-based food products and animal-based food materials.

[Inedible Parts and Edible Parts of Food Materials]

When the food material used in the composition of one or more embodiments of the present invention, i.e., the food material containing insoluble dietary fibers and/or the other food materials (free of insoluble dietary fibers) contain not only edible parts but also inedible parts, the edible parts only may be used, the inedible parts only may be used, or both the edible parts and inedible parts may be used together. the present disclosure, the "inedible part" of a food material represents a part unsuitable for typical consumption of the food material and a part disposed in the typical dietary custom, and the "edible part" represents the part remaining when the disposal part (inedible part) are removed from the whole food material. Particularly, for food materials containing insoluble dietary fibers, the part containing insoluble dietary fibers has poor eatability and compatibility with other food products and thus there has been many parts disposed without being used for eating but such inedible parts containing insoluble dietary fibers can be preferably used in one or more embodiments of the present invention.

The edible parts and/or inedible parts of food materials containing insoluble dietary fibers used in the composition of one or more embodiments of the present invention may be those respectively derived from food materials containing insoluble dietary fibers of a single kind or any combination of those derived from food materials containing insoluble dietary fibers of several kinds. Further, when both edible parts and inedible parts are combined, it is preferable that a dry weight ratio of the "inedible parts/(edible parts+inedible parts)" be typically 1% or more because the quality of taste of edible parts enhances, additionally 1.5% or more, further 2.0% or more, furthermore 2.5% or more, further 3.0% or more, further 5.0% or more and particularly 9.0% or more. Further, it is preferable that the upper limit of the above proportion be typically 80% or less, 75% or less, additionally 72.5% or less, further 70% or less, furthermore 67.5% and particularly 64% or less.

Further, when the composition of one or more embodiments of the present invention contains both edible parts and inedible parts of food materials containing insoluble dietary fibers, these edible parts and inedible parts may be those respectively derived from food materials containing insoluble dietary fibers of different kinds, but it is preferable to comprise edible parts and inedible parts derived from food materials containing insoluble dietary fibers of the same kind. That is, when a part or whole of the edible parts and a part or whole of the inedible parts derived from a food material containing insoluble dietary fibers of the same kind are used, the nutrition of such a food material containing insoluble dietary fibers can be consumed without waste. Particularly, in the composition of one or more embodiments of the present invention, the texture and taste imparted by insoluble dietary fibers are improved as described hereafter and thus such inedible parts of food materials containing abundant insoluble dietary fibers can be easily consumed without waste.

Examples of the inedible part of food materials containing insoluble dietary fibers include skins, nuts/seeds, cores and strained lees of various food materials containing insoluble dietary fibers described earlier. Of these, skins, nuts/seeds, cores and strained lees of corns (examples thereof include sweet corn), bell peppers, pumpkins, beets, broccolis, edamame, tomatoes, rice, onions, cabbages, apples, grapes, sugar canes, citrus fruits (examples thereof include satsuma orange and yuzu), but not limited thereto, can be preferably used for one or more embodiments of the present invention because the nutrition remains in abundance. Specific examples of the inedible part of food materials containing insoluble dietary fibers include, but not limited thereto, bract, pistil and cob (core) of corns (examples thereof include sweet corn), seed and stem of bell peppers, seed and gut of pumpkins, skin of beets, stalk and leaf of broccolis, pod of edamame, stem of tomatoes, rice hull of rice (hull), skin (protective outer covering), bottom part and head part of onions, core of cabbages, core of apples, skin and seed of grapes, strained lee of sugar canes, skin, seed and albedo of citrus fruits (examples thereof include satsuma orange and yuzu). Additionally, the inedible part is preferably those that do not contain components harmful to the human body to the extent that they affect the human body.

When the composition of one or more embodiments of the present invention contains the other food materials (free of insoluble dietary fibers) in addition to the food materials containing insoluble dietary fibers, edible parts and/or inedible parts thereof can also be used in any combination as in the case of the food material containing insoluble dietary fibers.

Parts and percentage of inedible parts in food materials used in the composition of one or more embodiments of the present invention, that is, food materials containing insoluble dietary fibers and/or the other food materials (free of insoluble dietary fibers), can be naturally understood by a person skilled in the art who handles such food products and processed products of the food products. As an example, "Disposal part" and "Disposal rate" described in STANDARD TABLES OF FOOD COMPOSITION IN JAPAN 2015 (seventh revised edition) are referred, and these can be applied as the parts and percentage of inedible parts. The following Table 1 includes examples of food materials containing insoluble dietary fibers and "Disposal part" and "Disposal rate" (that is, parts and percentage of inedible parts) of these food materials described in STANDARD TABLES OF FOOD COMPOSITION IN JAPAN 2015 (seventh revised edition). Parts and percentage of edible parts in food materials can also be understood based on the parts and percentage of inedible parts.

TABLE 1

| Food material containing insoluble dietary fibers | Inedible part (disposal part) | Percentage of inedible part (disposal rate) |
|---|---|---|
| Vegetables/Edamame/raw | Pod | 45% |
| Vegetables/(corns)/sweet corn/immature seeds, raw | Bract, pistil and cob | 50% |
| Vegetables/(Pumpkin)/Japanese Kabocha pumpkin/fruit, raw | Gut, seed and both ends | 9% |
| Vegetables/(green peppers)/red pepper/fruit, raw (bell pepper) | Stem, core and seed | 10% |
| Vegetables/beets/root, raw | Root end, skin and petiole | 10% |
| Vegetables/broccoli/floret, raw | Stalk and leaf | 50% |
| Vegetables/(tomatoes)/tomato/fruit, raw | Stem | 3% |
| Vegetables/(Cabbages)/cabbage/head leaf, raw | Core | 15% |
| Vegetables/spinach/leaf, raw | Base | 10% |
| Vegetables/kale/leaf, raw | Petiole base | 3% |
| Vegetables/(peas)/green pea/raw | Pod | 55% |
| Vegetables/broad bean/immature bean/raw | Seed coat, pod | 80% |
| Vegetables/(carrots)/root, with skin, raw | Rood end and petiole base | 3% |
| Tubers and roots and starches/sweet potato/tuber, raw | Epidermis and both ends | 10% |

[Fats/Oils]

The composition of one or more embodiments of the present invention contains one or more fats/oils. One or more in any combination of various fatty acids that make up fats/oils (e.g., linoleic acid, linolenic acid, oleic acid, palmitic acid, stearic acid, hexanoic acid, octanoic acid, decanoic acid, lauric acid, myristic acid and pentadecanoic acid) may be used but it is preferable to use edible fats/oils, or food materials containing edible fats/oils and food materials having edible fats/oils as raw materials.

Examples of the edible fats/oils include sesame oils, rapeseed oils, high oleic rapeseed oils, soybean oils, palm oils, palm stearin, palm olein, palm kernel oils, palm middle fraction (PMF), cottonseed oils, corn oils, sunflower oils, high-oleic sunflower oils, safflower oils, olive oils, linseed oils, rice-bran oils, camellia oils, perilla oils, flavor oils, coconut oils, grapeseed oils, peanut oils, almond oils, avocado oils, salad oils, canola oils, fish oils, beef tallow, lard, chicken fat, or MCT (middle chain triglyceride), diglyceride, hydrogenated oils, transesterified oils, creams, ghees and cacao butters. Of these, liquid edible fats/oils such as sesame oils, olive oils, rapeseed oils, soybean oils, creams, sunflower oils, rice-bran oils and palm olein are preferable because they have an effect to enhance the smoothness of the composition.

The liquid edible fats/oils (liquid fats/oils, liquid fats/oils) in one or more embodiments of the present invention represent fats/oils having liquid flowability at room temperature, and the solid edible fats/oils (solid fats/oils, solid fats/oils) represent fats/oils having solid flowability at room temperature. The "room temperature" in the present disclosure represents, unless otherwise specified, 20° C. The having "liquid flowability" in the present disclosure means, by a Bostwick viscometer at 20° C. for 10 seconds, a Bostwick viscosity of 10 cm or more, 15 cm or more, or 28 cm or more. The "Bostwick viscosity" herein means a measured value of a sample run-down distance in a trough at a predetermined temperature for a predetermined time. Further, for the Bostwick viscometer, those having a trough length of 28.0 cm and a Bostwick viscosity, that is, the maximum sample run-down distance in a trough of 28.0 cm are used.

It is preferable in one or more embodiments of the present invention that a fat/oil part in the composition (e.g., separated fat/oil components when centrifuged at 15,000 rpm for 1 minute) have liquid flowability at room temperature, and it is further preferable to be a liquid composition having liquid flowability at room temperature as the whole composition.

It is further preferable that liquid fats/oils are in a predetermined proportion in all the fats/oils. Specifically, a mass percentage of liquid fats/oils to all the fats/oils is preferably 10 mass % or more, further preferably 20 mass % or more, further preferably 30 mass % or more, further preferably 40 mass % or more, further preferably 50 mass % or more, further preferably 60 mass % or more, further preferably 70 mass % or more, further preferably 80 mass % or more, further preferably 90 mass % or more, further preferably 92 mass % or more, further preferably 95 mass % or more and most preferably 100 mass %. Further, the edible fats/oils may be the fats/oils contained in food materials of the composition but it is preferable to add extracted and purified fats/oils separately from food materials because the compatibility with food materials is good. In this case, a mass percentage of the extracted and purified fats/oils to all the fats/oils is preferably 10 mass % or more and additionally preferably 30 mass % or more.

On the other hand, fats/oils other than cacao butters are preferably used from the viewpoint of handleability during production. Further, a proportion of butter containing abundant cholesterol (as a result, animal-based fats/oils) in the total fat/oil content in the composition is desirably 90 mass % or less, further desirably 80 mass % or less, further desirably 70 mass % or less, further desirably 60 mass % or less, further desirably 50 mass % or less, further desirably 40 mass % or less, further desirably 30 mass % or less, further desirably 20 mass % or less, further desirably 10 mass % or less and particularly preferably not used. These edible fats/oils may be used singly, or 2 or more may be used together in combination. Using the edible fats/oils containing a higher proportion of unsaturated fatty acids (total proportion of monounsaturated fatty acids and polyunsaturated fatty acids) than a proportion of saturated fatty acids is preferable because microrefinement treatment can be carried out efficiently, and further preferable when a proportion of unsaturated fatty acids is higher than 2 time the amount of a proportion of saturated fatty acids.

On the other hand, examples of the food material having edible fats/oils as raw materials include butters, margarines, shortenings, heavy creams and soymilk creams (e.g., "Kocream (Kokurimu) (registered trademark) by FUJI OIL CO., LTD."). Food materials which are liquid at room temperature are preferable in the aspect of convenience. Further, food materials containing edible fats/oils among the food materials containing insoluble dietary fibers and other food materials described earlier can also be used for such a purpose. These food materials may be used singly, or two or more may be used together in any combination.

It is preferable, however, to add extracted and purified edible fats/oils separately from food materials from the viewpoint of enhancing the compatibility of food materials regardless of whether food materials containing insoluble dietary fibers and other food materials comprise fats/oils. Specifically, it is preferable that typically 10 mass % or more and additionally 30 mass % or more of the total fat/oil content contained in the composition of one or more embodiments of the present invention be derived from extracted and purified edible fats/oils.

The composition of one or more embodiments of the present invention preferably contains a certain value or less of the total fat/oil content from the viewpoint of preferably forming fine particle composites to be described later in the composition. The total fats/oils content in the composition herein means a content of fats/oils derived from all components of all food materials contained in the composition. Specifically, it is preferable that the upper limit of total fat/oil content in the composition of one or more embodiments of the present invention be typically 98 mass % or less, additionally 90 mass % or less and further 80 mass % or less. On the other hand, the lower limit of total fat/oil content in the composition of one or more embodiments of the present invention is not limited and, from the viewpoint of readily forming fine particle composites to be described later in the composition, it is preferable to be typically 10 mass % or more, further 20 mass % or more and additionally 30 mass % or more.

Further, when fats/oils are solidified by a method of using solid fats/oils in part or whole for the fats/oils of one or more embodiments of the present invention, the final composition can be a solid composition. Thus, a food product containing abundant insoluble dietary fibers can be produced as a solid composition which can be smoothly and efficiently eaten with inedible parts through improvement in its texture and taste.

Thus, one or more embodiments of the present invention include the following inventions:
(a) A composition comprising a fine particle composite comprising insoluble dietary fibers and a fat/oil, wherein the composition satisfies the following (1) to (8):
(1) the composition comprises an edible part and an inedible part of a food material, wherein a dry weight proportion of the inedible part/(the edible part+the inedible part) is 1% or more and 80% or less,
(2) the composition comprises the insoluble dietary fiber at a content of 0.1 mass % or more,
(3) a fine particle content is 2 mass % or more and 98 mass % or less,
(4) a total fat/oil content is 10 mass % or more and 98 mass % or less,
(5) the composition comprises water at a content of less than 20 mass %,
(6) a modal diameter after ultrasonication is 0.3 μm or more and 200 μm or less,
(7) (a specific surface area per unit volume after ultrasonication [$m^2$/mL])/(a minimum particle size after ultrasonication [μm]) is 0.1 or more,
(8) (a specific surface area per unit volume before ultrasonication [$m^2$/mL])/(a specific surface area per unit volume after ultrasonication [$m^2$/mL]) is 0.01 or more and 0.99 or less.
(b) A solid composition comprising a fine particle composite comprising insoluble dietary fibers and a solid fat/oil, wherein the solid composition satisfies the following (1) to (8):
(1) the composition comprises an edible part and an inedible part of a food material, wherein a dry weight proportion of the inedible part/(the edible part+the inedible part) is 1% or more and 80% or less,
(2) the composition comprises the insoluble dietary fibers at a content of 0.1 mass % or more,
(3) a fine particle content is 2 mass % or more and 98 mass % or less,
(4) a total fat/oil content is 10 mass % or more and 98 mass % or less,
(5) a water content is less than 20 mass %,
(6) a modal diameter after ultrasonication is 0.3 μm or more and 200 μm or less,
(7) (a specific surface area per unit volume after ultrasonication [$m^2$/mL])/(a minimum particle size after ultrasonication [μm]) is 0.1 or more,
(8) (a specific surface area per unit volume before ultrasonication [$m^2$/mL])/(a specific surface area per unit volume after ultrasonication [$m^2$/mL]) is 0.01 or more and 0.99 or less.

[Seasoning and Food Additives]

The composition of one or more embodiments of the present invention may comprise any one or more seasonings and food additives. Examples of the seasoning and food additive include soy sauces, misos, alcohols, saccharides (e.g., glucose, sucrose, fructose, glucose fructose corn syrup and fructose glucose corn syrup), sugar alcohols (e.g., xylitol, erythritol and maltitol), artificial sweeteners (e.g., sucralose, aspartame, saccharine and acesulfame K), minerals (e.g., calcium, potassium sodium, iron, zinc and magnesium, and salts thereof), aromas, pH adjusting agents (e.g., sodium hydroxide, potassium hydroxide, lactic acid, citric acid, tartaric acid, malic acid and acetic acid), cyclodextrin, antioxidants (e.g., vitamin E, vitamin C, tea extracts, raw coffee bean extracts, chlorogenic acid, spice extracts, caffeic acid, rosemary extracts, vitamin C palmitate, rutin, quercetin, red bayberry extracts and sesame extracts), emulsifiers (e.g., glycerol esters of fatty acids, monoglyceride acetates, monoglyceride lactates, monoglyceride citrate, monoglyceride diacetyl tartrate, monoglyceride succinate, polyglycerol esters of fatty acids, polyglycerol esters of condensed ricinoleic acid, quillaja extracts, soybean saponin, tea seed saponin and sucrose esters of fatty acids), coloring agents and thickening stabilizers.

However, considering the recent awareness in natural consciousness, it is preferable that the composition of one or more embodiments of the present invention does not contain so-called emulsifiers and/or coloring agents and/or thickening stabilizers (e.g., those described as "coloring agent", "thickening stabilizer" and "emulsifier" in "Food additive list for labelling" of Food additive labelling handbook (edition of $23^{rd}$ year of the Heisei). Of these, from the viewpoint of achieving the quality in which the taste of a material is easily sensed, it is preferable that the composition of one or more embodiments of the present invention does not comprise an emulsifier. Further, it is furthermore desirable that the composition of one or more embodiments of the present invention does not comprise food additives (e.g., substances descried in "Food additive list for labelling" of Food additive labelling handbook (edition of $23^{rd}$ year of the Heisei) used for the purpose of food additives). Further, from the viewpoint of achieving sweetness of a food product itself which is easily sensed, it is preferable not to add saccharides (glucose, sucrose, fructose, glucose fructose corn syrup and fructose glucose corn syrup). Further, the composition of one or more embodiments of the present invention may be an embodiment free from acetic acid because the taste of a material is easily sensed. Furthermore, the composition may be an embodiment free from the bamboo leaf part, further the Gramineae plant's leaf part, as fibers are sharp and likely to hurt in the mouth.

[Bostwick Viscosity]

When the composition of one or more embodiments of the present invention has a predetermined value or less of a Bostwick viscosity at 20° C., the composition is not solid-liquid separated and maintains the flowability thereof while containing the inedible parts of food materials, that is, shows good swallowability, is notably enhanced in the eatability, whereby the quality is achieved so that a food product containing abundant insoluble dietary fibers can be effortlessly and efficiently eaten with inedible parts, hence preferable. Specifically, it is preferable that a viscosity measured value (measurement temperature 20° C.) by a Bostwick viscometer be, for 1 second, typically 28.0 cm or less, additionally 26.0 cm or less, further 20.0 cm or less, furthermore 10 cm or less and particularly 5 cm or less. The lower limit of a Bostwick viscosity at 20° C. is not limited and it is preferable that a viscosity measured value (measurement temperature 20° C.) by a Bostwick viscometer be, for 1 second, typically 0.1 cm or more, additionally 1.0 cm or more, further 2.0 cm or more and furthermore 3.0 cm or more. The "Bostwick viscosity" in the present disclosure can be measured using a Bostwick viscometer. For example, a KO type Bostwick viscometer (manufactured by FUKAYATEKKOUSYO, those having a trough length of 28.0 cm and a Bostwick viscosity, that is, the maximum sample run-down distance in a trough of 28.0 cm) can be used as the measurement instrument. For measurement, an instrument is horizontally set up using a level, a gate is closed and then a sample adjusted to a temperature of 20° C. is poured into a reservoir to the full, the time is measured while pressing down a trigger to open the gate, and a run-down distance of the material in a trough at the time point when 1 second has passed is measured thereby to obtain a viscosity measured value by a Bostwick viscometer.

[Water]

It is preferable that the composition of one or more embodiments of the present invention comprise water. The water in the composition may be those derived from various components of the composition described earlier but further water may be added. In one or more embodiments of the present invention, the water content in the composition means the total content of the water content derived from various components of the composition and the water content separately added.

Specifically, it is preferable that a mass ratio of the water content to the whole composition be typically less than 20 mass %, additionally less than 17.5 mass %, further less than 15 mass % and furthermore less than 12.5 mass % from the viewpoint of reducing eatability of the composition associated with syneresis from the composition, that is, not losing swallowability. When a mass ratio of the water content to the whole composition is the upper limit or less, the control of forming fine particle composites becomes easy, hence preferable. On the other hand, the lower limit of the mass ratio of the water content is not limited and it is convenient, from the viewpoint of industrial productivity, to be typically 0 mass % or more, further 0.1 mass % or more, additionally 0.2 mass % or more and additionally 0.9 mass % or more.

Further, it is preferable in the composition of one or more embodiments of the present invention that, from the viewpoint of preferably forming fine particle composites to be described later in the composition, a percentage of total fat/oil content to the sum of the water content and the total fat/oil content, that is, a value of the "total fat/oil content/(water content+total fat/oil content)", be typically 75 mass % or more, further 80 mass % or more and additionally 85 mass % or more. On the other hand, the upper limit of the value of the "total fat/oil content/(water content+total fat/oil content)" is not limited and, from the viewpoint of readily forming fine particle composites to be described later in the composition, it is preferable to be typically 100 mass % or less.

[Fine Particle and Fine Particle Composite]

In the composition of one or more embodiments of the present invention, insoluble dietary fibers are present in the form of fine particles. The fine particles may be formed from one or more insoluble dietary fibers only but may also be formed from one or more insoluble dietary fibers and one or more other components.

In the composition of one or more embodiments of the present invention, multiple fine particles containing insoluble dietary fibers described above agglomerate and form composites which can be disintegrated by disturbance. That is, the composition of one or more embodiments of the present invention contains composites of fine particles containing insoluble dietary fibers. When the composition of one or more embodiments of the present invention contains insoluble dietary fibers in such a composite state, the water separation of the composition can be controlled and the composition has improved texture, is easily eaten and becomes more compatible with other food products. In one or more embodiments of the present invention, a typical example of the disturbance from outside for disintegrating fine particle composites is supposed to be ultrasonication, unless otherwise specified. The "ultrasonication" in the present disclosure represents, unless otherwise specified, application treatment to a sample for measurement by ultrasound having a frequency of 40 kHz with an output of 40 W for 3 minutes.

The composition of one or more embodiments of the present invention contains composites of fine particles containing insoluble dietary fibers, and also has the shape and size of fine particle composites adjusted to the ranges to be described later before and after applying disturbance thereby to provide a composition having advantageous characteristics such as enhanced eatability through improvement in the texture and taste of the composition containing abundant insoluble dietary fibers. The cause thereof is unknown but it is conceived that composites in distinctive shapes as if a plurality of dietary fibers were twisted together are formed in the composition and these composites demonstrate various effects. In recent years, studies on microrefinement technology has been actively conducted in various fields including the food field, however, the properties provided by the shape of secondary structure (composite) formed by agglomeration of microrefined fine particles have not been aware at all. It has of course not been known that the shape and size of such fine particle composites, when adjusted, can provide so far unknown various effects.

[Particle Size in the Composition]

The composition of one or more embodiments of the present invention preferably satisfies the following specific requirements on various parameters regarding the particle sizes of fine particle composites and fine particles contained in the composition before and after disturbance, that is, mode particle size, maximum particle size, minimum particle size and particle size d50. That is, the composition of one or more embodiments of the present invention contains a large number of fine particle composites in the state of not applying disturbance, that is, the state before ultrasonication, whereas in the state of applying disturbance, that is, the state after ultrasonication, a part or all of the fine particle composites are disrupted to be single fine particles, whereby various parameters regarding particle sizes such as not only mode particle size but also maximum particle size, minimum particle size and particle size d50 drastically change after ultrasonication from those therebefore.

The mode particle size (modal diameter) of fine particle composites in the composition of one or more embodiments of the present invention after disturbance is adjusted to within a predetermined range. Specifically, a mode particle size after disturbance of the composition of one or more embodiments of the present invention, that is, after ultrasonication, is typically 0.3 µm or more. It is preferable to be additionally 1.0 µm or more, further 3.0 µm or more, furthermore 5.0 µm or more, furthermore 6.0 µm or more and particularly 7.0 µm or more. When a mode particle size of the composition after ultrasonication is the lower limit or more, the composition has a quality which is less likely to dry and thus storable for a long period of time, hence preferable. On the other hand, a mode particle size after disturbance of the composition of one or more embodiments of the present invention, that is, after ultrasonication, is typically 200 µm or less. It is preferable to be additionally 180 µm or less, further 160 µm or less, furthermore 140 µm or less, or 120 µm or less, or 100 µm or less and particularly 50 µm or less. When a mode particle size of the composition after ultrasonication is the upper limit or less, the texture is prevented from being deteriorated and thus suitable texture and feel at the time of eating can be imparted to the composition.

It is preferable that the mode particle size (mode diameter) of fine particle composites before disturbance of the composition of one or more embodiments of the present invention be also adjusted to within a predetermined range. Specifically, it is preferable that a mode particle size before disturbance of the composition of one or more embodiments of the present invention, that is, before ultrasonication, be typically 5 µm or more, additionally 10 µm or more and further 12 µm or more from the viewpoint of the composition having a quality which is less likely to undergo syneresis and thus maintaining the improvement effect on eatability and enabling commercial distribution. On the other hand, a mode particle size before disturbance of the composition of one or more embodiments of the present invention, that is, before ultrasonication, is typically 400 µm or less, additionally 300 µm or less and further 200 µm or less from the viewpoint of preventing the texture from being deteriorated and imparting suitable texture and feel to the composition at the time of eating.

Further, the mode particle diameter in the present disclosure represents a particle size of a channel having the highest particle frequency % when a particle size distribution of each channel is obtained by measuring the composition using a laser diffraction particle size distribution analyzer. When there are more than one channels with exactly the same particle frequency %, the particle size of a channel having the smallest particle size among them is employed. When a particle size distribution is normal distribution, the value thereof corresponds to the median size thereof but when there is a shift in a particle distribution, particularly when there are more than one peaks in a particle distribution, numerical values substantially vary. The particle size distribution measurement of a sample using a laser diffraction particle size distribution analyzer can be carried out by, for example, the following method. When a sample is a thermoplastic solid, the sample is liquefied by heat treatment and subsequently subjected to the analysis to carry out the analysis using a laser diffraction particle size distribution analyzer.

It is preferable that the maximum particle size of fine particle composites before disturbance of the composition of one or more embodiments of the present invention be adjusted to within a predetermined range. Specifically, it is preferable that a maximum particle size before disturbance of the composition of one or more embodiments of the present invention, that is, before ultrasonication, be typically 30 µm or more, further 100 µm or more, further 110 µm or more, additionally 140 µm or more and additionally 155 µm or more from the viewpoint of enabling the prevention of an unfavorable flavor from being imparted due to the tissue disruption of a food material. On the other hand, the maximum particle size of the composition of one or more embodiments of the present invention before disturbance, that is, before ultrasonication, is not limited and it is preferable to be typically 2,000 µm or less and additionally 1,500 µm or less. When a maximum particle size of the composition before ultrasonication is the upper limit or less, it is convenient on the ground of industrial productivity.

It is preferable that the maximum particle size of fine particle composites after disturbance of the composition of one or more embodiments of the present invention be adjusted to within a predetermined range. Specifically, it is preferable that a maximum particle size after disturbance of the composition of one or more embodiments of the present invention, that is, after ultrasonication, be typically 20 µm or more and additionally 30 µm or more from the viewpoint of less likely imparting an unfavorable flavor due to the tissue disruption of a food material. On the other hand, a maximum particle size of the composition of one or more embodiments of the present invention after disturbance, that is, after ultrasonication, is not limited and it is preferable to be typically 1,100 µm or less and additionally to be 800 µm or less. When a maximum particle size of the composition after ultrasonication is the upper limit or less, it is convenient on the ground of industrial productivity.

The composition of one or more embodiments of the present invention is a turbid system which thus makes it difficult to visually discriminate accurately a maximum particle size, but when a maximum particle size after disturbance is larger than a certain value, a maximum particle size in the sample after disturbance observed using a microscope is considered to have a high probability of being also larger than the certain value, and when a maximum particle size before disturbance is larger than a certain value, a maximum particle size in the sample before disturbance observed using a microscope is considered to have a high probability of being also larger than the certain value.

It is preferable that the minimum particle size of fine particle composites before disturbance of the composition of one or more embodiments of the present invention be adjusted to within a predetermined range. Specifically, it is preferable that a minimum particle size before disturbance of the composition of one or more embodiments of the present invention, that is, before ultrasonication, be 1 µm or more from the viewpoint of notably enhancing the eatability of dietary fibers. On the other hand, a minimum particle size of fine particle composites before disturbance of the composition of one or more embodiments of the present invention is not limited and it is preferable to be typically 90 µm or less and additionally 80 µm or less.

It is preferable that the minimum particle size (dmin) of fine particle composites after disturbance of the composition of one or more embodiments of the present invention be adjusted to within a predetermined range. Specifically, it is preferable that a minimum particle size (dmin) after disturbance of the composition of one or more embodiments of the present invention, that is, after ultrasonication, be typically 0.3 µm or more and additionally 0.5 µm or more from the viewpoint of notably enhancing the eatability of dietary fibers. On the other hand, a minimum particle size (dmin) of fine particle composites after disturbance of the composition of one or more embodiments of the present invention is not limited and it is preferable to be typically 2.5 μm or less.

That is, when a "minimum particle size (dmin) of fine particle composites after disturbance/minimum particle size of fine particle composites before disturbance" is 85% or less, fine-sized dietary fibers can be easily eaten as a composite, hence preferable and it is thus more preferable to be 75% or less.

In addition to the above mode particle diameter, maximum particle diameter and minimum particle size, the particle diameter d50 (50% cumulative diameter, median particle size, median size) of fine particle composites before and after disturbance of the composition of one or more embodiments of the present invention is also preferably adjusted to within a predetermined range. Specifically, it is preferable that a particle size d50 of the composition of one or more embodiments of the present invention before disturbance, that is, before ultrasonication, be typically 5 μm or more, additionally 10 μm or more, and typically 400 μm or less, additionally 300 μm or less, further 250 μm or less and additionally 200 μm or less. On the other hand, it is preferable that a particle size d50 of the composition of one or more embodiments of the present invention after disturbance, that is, after ultrasonication, be typically 1 μm or more, additionally 5 μm or more and further 7 μm or more, and typically 150 μm or less, additionally 100 μm or less and further 75 μm or less. The particle size d50 of the composition is defined as the particle size at which, when a particle size distribution of the composition is divided into 2 groups at a certain particle size, a ratio of a proportion of the cumulative value of particle frequency % on the larger side to a proportion of the cumulative value of particle frequency % on the smaller side is 50:50. The particle size d50 of the composition can be measured using, for example, a laser diffraction particle size distribution analyzer to be described later.

The "particle size" in the present disclosure represents, unless otherwise specified, is all measured on a volumetric basis. Further, the "particle" in the present disclosure is a concept, unless otherwise specified, which can encompass not only a single fine particle but a fine particle composite composed of agglomeration of such fine particles.

Measurement conditions for various parameters regarding the particle sizes of one or more embodiments of the present invention are not limited and can be the following conditions. A solvent usable at the time of measurement can be any solvent as long as it is less likely to affect the structure of insoluble dietary fibers in the composition. As an example, ethanol is preferably used. A laser diffraction particle size distribution analyzer used for the measurement is not limited and, for example, a Microtrac MT3300 EXII system of MicrotracBEL Corp. can be used. A measurement application software is not limited and, for example, DMS2 (Data Management System version 2, MicrotracBEL Corp.) can be used. When the measurement apparatus and software described above are used, press down WASH button of the software to carry our washing, then press down SET ZERO button of the software to carry out zero adjustment, and a sample is directly loaded at SAMPLE LOADING until a concentration of the sample reaches an appropriate range for the measurement. A sample before disturbance, that is, a sample which is not ultrasonicated, is adjusted to a concentration within an appropriate range in 2 sample loadings after sample loading and then immediately subjected to laser diffraction at a flow rate of 60% and a measurement time of 10 seconds to use a result as a measured value. On the other hand, when a sample after disturbance, that is, an ultrasonicated sample, is measured, a sample ultrasonicated in advance may be loaded or ultrasonication is carried out using the above measurement apparatus after a sample is loaded and subsequently the measurement may be carried out. In the latter case, a sample which has not been subjected to ultrasonication is loaded and adjusted to a concentration within an appropriate range at SAMPLE LOADING and subsequently ultrasonication is carried out by pressing down ULTRASONICATION BUTTON of the software. Thereafter, defoaming was carried out 3 times, the sample loading is carried out again, the concentration is confirmed to have been still within the appropriate range and subsequently laser diffraction is carried out at a flow rate of 60% and a measurement time of 10 seconds to use a result as a measured value. Parameters at the measurement include, for example, distribution mode: volume, particle refractive index: 1.60, solvent refractive index: 1.36, measurement upper limit (μm)=2,000.00 μm and measurement lower limit (μm)=0.021 μm.

When various particle sizes of the composition in one or more embodiments of the present invention are determined, it is preferable that a particle size distribution of each channel (CH) be measured and then a particle size of each measurement channel shown in Table 2 to be described later be used as the standard for determination. Specifically, frequencies of the particles having a particle size or less than those specified in each channel of Table 2 to be described later and also having a particle size larger than those specified in a channel having a number greater by one (the maximum channel in the measurement range uses the measurement lower limit particle size) are measured by each channel of Table 2 to be described later, whereby the particle frequency % of each channel can be determined using the total frequency of all channels within the measurement range as the denominator (this is also called "particle frequency % of XX channel). For example, the particle frequency % of Channel 1 represents the frequency % of particles which are 2,000.00 μm or less and larger than 1,826.00 μm. Particularly, the maximum particle size can be determined as a particle size of the channel having the largest particle size among the channels in which the particle frequencies % are detected as the results obtained by measuring a particle frequency % of each of 132 channels of Table 2 to be described later. In other words, when the maximum particle size of the composition in one or more embodiments of the present invention is measured using a laser diffraction particle size distribution analyzer, preferable measurement conditions therefor use ethanol as the measurement solvent and a particle size is readily measured after loading a sample which is a target from the measurement upper limit of 2,000.00 μm and the measurement lower limit of 0.021 μm.

[Particle Specific Surface Area [m²/mL] in the Composition]

It is preferable that, in addition to the above various requirements, the composition of one or more embodiments of the present invention satisfy the following requirement on the specific surface area per unit volume of particles (fine particles and fine particle composites) [$m^2$/mL] in the composition before and after applying disturbance, that is, before and after ultrasonication. That is, the composition of one or more embodiments of the present invention contains a large number of fine particle composites in the state of not applying disturbance, that is, the state before ultrasonication, whereas in the state of applying disturbance, that is, the state after ultrasonication, a part or all of the fine particle composites are disrupted to be single fine particles, whereby the specific surface area per unit volume thereof [m²/mL] also drastically changes after ultrasonication from that therebefore.

That is, it is preferable that a specific surface area per unit volume of particles (fine particles and fine particle composites) in the composition before applying disturbance ($\gamma_B$), that is, before ultrasonication, be typically 1.00 m²/mL or less, additionally 0.90 m²/mL or less and additionally 0.80 m²/mL or less. When such a specific surface area ($\gamma_B$) is the upper limit or less, fine particles form enough composites thereby to provide sufficient stability enhancement effect of one or more embodiments of the present invention, hence preferable. The lower limit of such a specific surface area ($\gamma_B$) is not limited and it is preferable to range from, from the viewpoint of enforcing the stability enhancement effect of the composition, typically 0.05 m²/mL or more, additionally 0.07 m²/mL or more, additionally 0.10 m²/mL or more to further 0.15 m²/mL or more.

It is preferable that a specific surface area per unit volume of particles in the composition (fine particles and fine particle composites) after applying disturbance ($\gamma_A$), that is, after ultrasonication, be typically 1.70 m²/mL or less, further 1.50 m²/mL or less, further 1.30 m²/mL or less, further 1.10 m²/mL or less and additionally 0.80 m²/mL or less. When such a specific surface area ($\gamma_A$) is the upper limit or less, fine particles form enough composites thereby to provide sufficient stability enhancement effect of one or more embodiments of the present invention, hence preferable. The lower limit of such a specific surface area (IA) is not limited and it is preferable to range from, from the viewpoint of enforcing the stability enhancement effect of the composition, typically 0.07 m²/mL or more, additionally 0.10 m²/mL or more, further 0.15 m²/mL or more to additionally 0.20 m²/mL or more.

It is preferable that a ratio of specific surface areas per unit volume of particles (fine particles and fine particle composites) [m²/mL] in the composition before and after applying disturbance, that is, before and after ultrasonication, that is ($\gamma_B/\gamma_A$), satisfy a predetermined range. Specifically, it is preferable for ($\gamma_B/\gamma_A$) to be typically 0.99 or less, it is preferable to be 0.97 or less, it is preferable to be 0.95 or less, it is preferable to be 0.90 or less, it is preferable to be 0.85 or less and it is additionally preferable to be 0.80 or less. When a $\gamma_B/\gamma_A$ is the upper limit or less, dietary fibers are favorably in the form of composites thereby to suitably exhibit the stability enhancement effect of the composition, hence preferable. That is, the ratio shows that the whole food material including the inedible parts of food materials is microrefined to finer particles and further that the particles form composites in a more stable existing embodiment in the composition, and means that a fibrous feel and swallowability affecting the efficiency during eating are improved. The lower limit of ($\gamma_B/\gamma_A$) is not limited and it is preferable to be typically 0.01 or more, 0.02 or more, 0.03 or more, 0.04 or more, 0.06 or more, 0.10 or more, 0.20 or more or 0.30 or more. This requirement, $\gamma_B/\gamma_A$=from 0.01 to 0.99, is the numerical values obtained when the whole food material is more finely microrefined and not obtainable in Comparative Examples 1 to 4 in which microrefinement is not sufficient.

In one or more embodiments of the present invention, the specific surface area per unit volume [m²/mL] of the composition represents a specific surface area per unit volume (1 mL) when particles measured using a laser diffraction particle size distribution analyzer are assumed to be spherical. The specific surface area per unit volume [m²/mL] when particles are assumed to be spherical is a numerical value based on a measurement mechanism different from measured values reflecting components and surface structure of particles (a specific surface area per volume and per mass determined by permeability method or gas adsorption method). Further, the specific surface area per unit volume when particles are assumed to be spherical is determined by, when a surface area per particle is ai and a particle size is di, $6 \times \Sigma(ai) \div \Sigma(ai \cdot di)$.

Particularly, in the composition of one or more embodiments of the present invention, it is preferable that a proportion of a specific surface area per unit volume of particles (fine particles and fine particle composites) [m²/mL] in the composition after disturbance to a minimum particle size [μm] (dmin) of the fine particle composites after disturbance, that is, a value of ("specific surface area per unit volume after ultrasonication [m²/mL])/(minimum particle size after ultrasonication [μm]($\gamma_A$/dmin))", satisfy a predetermined range. The reason therefor is that the insoluble dietary fibers derived from edible parts of a food material are softer than inedible parts and such a morphological property is strongly reflected in the minimum particle size [μm], whereas the insoluble dietary fibers derived from inedible parts are harder than edible parts, less likely to be microrefined and such a morphological property is strongly reflected in the specific surface area per unit volume [m²/mL], whereby the smaller value shows that the whole food material including the inedible parts is more finely microrefined. Thus, this is because the larger the ($\gamma_A$/dmin), the more the edible parts and the inedible parts of a food material as whole are homogeneously microrefined and the stronger the improvement effects on textures (swallowability and a fibrous feel) are provided. A specific range for ($\gamma_A$/dmin) is typically 0.1 or more, but it is preferable to be additionally 0.2 or more, additionally 0.3 or more, further 0.4 or more and particularly 0.5 or more. The upper limit is not limited and may be typically 5.0 or less, 3.0 or less or 1.5 or less.

[Content of Fine Particles]

It is preferable in the composition of one or more embodiments of the present invention that the fine particle content (a content of fine particles and fine particle composites containing insoluble dietary fibers) satisfy a predetermined range. Specifically, it is preferable that a percentage of fine particle content to the whole composition be typically 2 mass % or more, additionally 4 mass % or more, additionally 6 mass % or more, further 8 mass % or more, further 9 mass % or more, further 10 mass % or more, further 15 mass % or more, further 20 mass % or more and particularly 25 mass % or more. When the mass percentage is the lower limit value or more, the taste of containing insoluble dietary fibers can be sufficiently perceived, hence preferable. On the other hand, it is preferable that the upper limit of the mass percentage be typically 98 mass % or less, additionally 91 mass % or less, further 85 mass % or less, furthermore 80 mass % or less and particularly 55 mass % or less. When a mass percentage is the upper limit value or less, food materials containing insoluble dietary fibers can be easily consumed, hence preferable. When the fine particle composite included as a fine particle content is a composite of food product fine particles, the taste is more easily perceived, hence preferable, and it is the most preferable that food product fine particles containing dietary fibers and fine particle composites thereof be contained.

In one or more embodiments of the present invention, the fine particle content in the composition can be measured by, for example, the following procedure. That is, a mass of the components, which is obtained by excluding food products larger than 2,000 μm (the distance of the longest part is 2 mm) which are not measurement targets for the laser diffraction particle size distribution measurement or particle shape image analyzer and food products not containing insoluble dietary fibers from all the insoluble components in the composition, is measured. For example, when the composition contains food products and the like larger than 2 mm, a mass of precipitated fraction, which is obtained by passing the composition through a 9-mesh (opening 2 mm) in advance and centrifuging the fraction thereof to thoroughly remove the separated supernatant therefrom, is considered to be a fine particle content in the composition (when the fats/oils contain solid fats/oils, food products and the like larger than 2 mm are removed as necessary while in the state of being dissolved by heating, subsequently centrifugation is carried out to remove the separated supernatant). In this case, a part of fats/oils and water are taken into the precipitated fraction, and hence the total mass of fine particles and fine particle composites in the composition represents the total wet mass of these components taken into the precipitated fraction and the food material. When the composition contains insoluble components which do not contain insoluble dietary fibers (crystallized salts and crystallized solid fats/oils), such food products are removed from the composition in advance and then centrifuged to similarly measure a fine particle content in the composition.

More specifically, in one or more embodiments of the present invention, the content of fine particles in the composition can be measured by, for example, the following procedure. That is, for example, any amount of the composition is allowed to pass through the 9-mesh (Tyler mesh), followed by centrifuging the passed fraction at 15,000 rpm for 1 minute and measuring a precipitated fraction mass from which the separated supernatant has been thoroughly removed thereby to measure a content of fine particles in the composition. The residue on the mesh when allowing the composition to pass through the 9-mesh is allowed to thoroughly stand and subsequently fine particles containing insoluble dietary fibers, smaller than the opening of the 9-mesh are allowed to thoroughly pass through using a spatula or the like so that the particle size of the composition remains unchanged thereby to obtain a passed fraction. For the composition having a flowability low enough not to pass through the 9-mesh (e.g., a physical property having a Bostwick viscosity of 10 cm or less at 20° C. for 30 seconds), the composition which has been allowed to pass through the 9-mesh in the state of being diluted to about 3-fold with a solvent such as an olive oil is centrifuged thereby to measure the content of fine particles containing insoluble dietary fibers in the composition. Further, for a thermoplastic composition, the composition, in the state of being given flowability by heating and diluted to about 3-fold with a solvent such as water, is allowed to pass through the 9-mesh and subsequently centrifuged thereby to measure the content of fine particles containing insoluble dietary fibers in the composition.

[Production Method of the Composition]

A method for preparing the composition of one or more embodiments of the present invention is not limited and any technique can be used as long as a composition satisfying the above various requirements can be obtained. Specifically, ingredients for the composition of one or more embodiments of the present invention, for example, food materials containing insoluble dietary fibers as well as any other food materials used, edible fats/oils, seasonings and other components may be mixed. However, a method may include a microrefinement step of a food material containing insoluble dietary fibers in the presence of an edible fat/oil and other food materials and components as necessary and a pulverized product obtained by such a method. When food materials containing insoluble dietary fibers are thus microrefined, composites of fine particles containing insoluble dietary fibers are easily formed. The reason why composites of fine particles are formed by such a microrefinement is unknown but when food materials containing insoluble dietary fibers are microrefined, it is possible that fine particles containing insoluble dietary fibers are formed and such multiple fine particles come together and re-agglomerate to form composites having the above special shape characteristics. The formation of composites by the agglomeration of fine particles can be facilitated particularly when a certain amount of water or fats/oils are coexisted, a high shear force is applied, or pressure applying conditions and temperature increasing conditions are applied. The formation of composites having specific configuration properties by the re-agglomeration of fine particle composites under such conditions and various useful effects described earlier can be obtained by such a formation of composites have not been known at all up to date.

A means for the microrefinement used in one or more embodiments of the present invention is not particularly limited. The temperature during microrefining is not also limited and may be any of high-temperature pulverization, room-temperature pulverization or low-temperature pulverization. The pressure during microrefinement is not also limited and may be any of high-pressure pulverization, normal-pressure pulverization or low-pressure pulverization. However, from the viewpoint of efficiently obtaining the composition containing fine particles in a specific shape specified in one or more embodiments of the present invention and fine particle composites, a means may be those capable of treating food materials and other components, i.e., the ingredients for the composition, in a short time using a high shear force under pressure applying conditions and temperature increasing conditions. Examples of the apparatus for such a microrefinement include apparatuses such as blenders, mixers, mills, kneaders, grinders, disintegrators, abrasioners and any of these may be used. The system at the time of microrefining may be either dry pulverization or wet pulverization. In the case of dry microrefinement, examples of the apparatus usable include stirred media mills such as dry bead mills, ball mills (roll system, vibration system and the like), jet mills, high-speed rotation type impact mills (pin mill and the like), roll mills and hammer mills. In contrast, for wet microrefinement, examples of the apparatus usable include stirred media mills such as bead mills and ball mills (roll system, vibration system, planetary mills and the like), roll mills, colloid mills, star burst and high-pressure homogenizer. Of these, stirred media mills (ball mills and bead mill) or high-pressure homogenizer is preferable and a stirred media mill-treated product treated by a stirred media mill is more preferable. Of these, a wet stirred media mill-treated product treated by a wet stirred media mill is further preferable and it is particularly preferable to use a wet bead mill. By using a wet stirred media mill, when a food product composition is left to stand, the water in the composition, is less likely to dry in comparison with other microrefinement treatment methods thereby to provide a quality with high stability, hence preferable. The principle thereof is unknown but it is conceived that fine particle composites in a preferable state by wet stirred media mill treatment are easily formed.

When the microrefinement treatment is carried out using a wet stirred media mill such as a wet bead mill as an example, food materials and other components, i.e., the ingredients for the composition, are loaded in a wet stirred media mill and crushed. Conditions such as the size of beads, loading rate, outlet mesh size, delivery rate of a raw material slurry, mill rotational strength and one-time pass system (one-pass) or multiple circulation system (circulation system) may suitably be selected and adjusted according to the size and properties of food materials, further properties of the intended fine particle composite. Hereinafter, an example of specific conditions is presented but one or more embodiments of the present invention are not limited to the following conditions.

It is preferable that a particle size of the bead used for a wet bead mill be typically 2 mm or less and additionally 1 mm or less. In the case of a bead mill grinder using beads having a larger particle size than the above upper limit value (e.g., a stirred media mill called a "ball mill" such as attritors which typically use beads of 3 to 10 mm), the treatment requires an extended time for obtaining a composition containing fine particles in a specific shape specified in one or more embodiments of the present invention and fine particle composites and it is principally difficult to apply a pressure higher than the normal pressure, because of which it is difficult to obtain the composition of one or more embodiments of the present invention. Further, the material of bead used for a wet bead mill may be the same material as a material of a bead mill inner cylinder, and the material may be zirconia.

The treatment using a wet stirred media mill may be carried out under pressure applying conditions. The method for creating pressure applying conditions at the time of microrefinement treatment is not limited, and for preferably achieving pressure applying conditions in particularly a bead mill grinder, a method of treatment with a filter having a suitable size installed at a treatment outlet while adjusting a delivery rate of the contents and pressure applying conditions is preferable. The pressure applying conditions during treatment are not limited and it is preferable that a difference between the maximum pressure and the normal pressure during treatment time may be typically 0.01 MPa or more, 0.02 MPa or more, 0.03 MPa or more or 0.04 MPa or more. When a difference between the maximum pressure and the normal pressure during treatment time is the above lower limit value or more, the composition containing fine particles in a specific shape specified in one or more embodiments of the present invention and fine particle composites can be obtained efficiently in a short time. On the other hand, the upper limit of pressure during treatment is not limited and it is preferable that a difference between the maximum pressure and the normal pressure during treatment time be typically 1.00 MPa or less, additionally 0.50 MPa or less, further 0.40 MPa or less and furthermore 0.30 MPa or less as a pressure applying condition which is overwhelming is likely to cause breakage of equipment.

The temperature during microrefinement treatment using a wet stirred media mill is not also limited and may be any of high-temperature pulverization, room-temperature pulverization or low-temperature pulverization. However, it is preferable that a sample temperature at the time of completing the pulverization treatment (treatment temperature: T2) to a sample temperature immediately after starting the pulverization treatment (treatment temperature: T1) be adjusted in such a way as to be a temperature increasing condition within a range satisfying "T1+1<T2<T1+50" (the unit herein is Celsius (° C.)). Further, it is preferable that a sample temperature at the time of completing the pulverization treatment (treatment temperature: T2) be 25° C. or more (T2≥25). For food materials (food materials containing insoluble dietary fibers and other food materials) containing 10 mass % or more of sugar, when converted to a monosaccharide equivalent, in terms of dry weight proportion, such as bell peppers, tomatoes and beets (beetroots), the composition is vitrified as a temperature increases and hence the microrefinement treatment is carried out so that T1 and T2 (more preferably temperatures from start to completion of the microrefinement treatment) are 40° C. or less, whereby the vitrification is controlled and treatment efficiency is enhanced, hence preferable.

A target for the microrefinement treatment using a wet stirred media mill is a mixture of food materials (food materials containing insoluble dietary fibers and other food materials) and other components. Such a mixture may be subjected to coarse pulverization treatment using a jet mill, a pin mill, a stone pulverization mill or the like in advance as pretreatment. In this case, it is preferable that d50 (median particle size) of the mixture be adjusted to ranges typically from 10 μm or more, additionally 20 μm or more and typically 1,500 μm or less, additionally 1,000 μm or less and then subjected to the microrefinement treatment using a medium agitating mill. When a median particle size of the mixture is adjusted to within this range, it is convenient from the viewpoint of industrial productivity.

When a mixture to be a target for the microrefinement treatment using a wet stirred media mill contains water, a water content of food materials (food materials containing insoluble dietary fibers and other food materials) is adjusted to be a lower state than a water content of other components and media thereby enabling efficient obtention of the composition containing fine particles in a specific shape specified in one or more embodiments of the present invention and fine particle composites, hence preferable. Specifically, a pulverized product of stirred media mill-treated dried food materials by a stirred media mill using dried food materials as the food materials (food materials containing insoluble dietary fibers and the other food materials) with water in addition to fats/oils as media is preferable, and it is particularly preferable to subject food materials to wet bead mill treatment.

When the viscosity of the mixture to be a target for the microrefinement treatment using a wet stirred media mill is adjusted to be a predetermined value or less, the composition containing fine particles in a specific shape specified in one or more embodiments of the present invention and fine particle composites can be efficiently obtained, hence preferable. Specifically, it is preferable that the upper limit of a viscosity (measurement temperature 20° C.) of the above mixture be typically 20 Pa·s or less and additionally 8 Pa·s or less. On the other hand, the lower limit value of the viscosity (measurement temperature 20° C.) is not particularly limited and it is preferable to be typically 100 mPa·s or more and additionally 500 mPa·s or more.

When a Bostwick viscosity of the mixture to be a target for the microrefinement treatment using a stirred media mill is adjusted to the range of a predetermined value, a pressure during treatment using a wet stirred media mill is easily adjusted to the desired pressure conditions described earlier thereby further increasing microrefinement treatment efficiency, hence preferable. Specifically, it is preferable that the lower limit of a Bostwick viscosity (measurement temperature 20° C.) of the mixture be typically 0.1 cm or more in 1 second. Further, it is preferable that the upper limit of a Bostwick viscosity (measurement temperature 20° C.) of the mixture be typically 28.0 cm or less in 1 second.

The number of times and the duration of the microrefinement treatment using a stirred media mill are not limited and typically crushing by the one-pass treatment enables efficient obtention of the composition containing fine particles in a specific shape specified in one or more embodiments of the present invention and fine particle composites, hence preferable. In the case of one-pass treatment, it is preferable that treatment time thereof be typically 0.1 minutes or more, additionally 1 minute or more and further 2 minutes or more, and typically 25 minutes or less, additionally 22 minutes or less and further 20 minutes or less. The duration of microrefinement treatment using a stirred media mill or a high-pressure homogenizer represents the time from a treatment target is sheared thoroughly to a composition containing desired fine particle composites of one or more embodiments of the present invention is formed. As a specific example, when a bead mill crusher having, for example, a pulverization chamber capacity of 100 mL and a porosity (i.e., a treated solution is injectable) of 50% when the beads are excluded is used and a sample is one-pass treated at a speed of 200 mL per minute without being circulated, an empty space capacity of the pulverization chamber is 50 mL whereby a sample treatment time is (100 mL×50%)/(200 mL/min)=0.25 min (15 sec).

Further, when producing the composition of one or more embodiments of the present invention, any after treatment following the microrefinement treatment can be carried out and when conche treatment as carried out for chocolates or similar treatment thereto is carried out, the easy-to-eat quality is achieved, hence preferable. For example, when the composition is treated after the microrefinement treatment using a grinder at room temperature for about 10 hours, the composition becomes easy to be eaten, hence preferable.

[Properties and Usage of the Composition]

The composition of one or more embodiments of the present invention, when eaten as a food product, has improved textures (swallowability and a fibrous feel) and taste (a material feel) caused by insoluble dietary fibers, with a property of enhancing the eatability. Food products containing insoluble dietary fibers, typically having such unpleasant textures (swallowability and a fibrous feel) and weakness in taste (a material feel), often disturb eating. However, the composition of one or more embodiments of the present invention has overcame such unpleasant textures (swallowability and a fibrous feel) and weakness in taste (a material feel) despite of containing insoluble dietary fibers thereby notably enhancing the eatability, whereby food products containing abundant insoluble dietary fibers can be effortlessly and efficiently eaten with inedible parts.

The composition of one or more embodiments of the present invention can be eaten directly as a food product and also may be used as a raw material or a material for food products and drink products or liquid seasonings. That is, targets of one or more embodiments of the present invention encompass food products and drink products and liquid seasonings containing the composition of one or more embodiments of the present invention. When the composition of one or more embodiments of the present invention is used as a part of raw materials, seasonings such as sources, dipping sources, dips, mayonnaises, dressings, butters and jams having a high dispersion stability can be produced. Thus, when the composition of one or more embodiments of the present invention is added to a seasoning, the amount of the composition of one or more embodiments of the present invention added to a seasoning is not limited and it is desirable to be generally about 0.001 to 50 mass %. Additionally, the composition may be added to a seasoning at any timing during the production. In more detail, the composition may be added to a seasoning, ingredients (food materials and the like) for the composition of one or more embodiments of the present invention may be added to raw materials of a seasoning followed by carrying out the microrefinement treatment or these methods may be combined, but the method of adding the composition of one or more embodiments of the present invention to a seasoning is industrially convenient, hence preferable. The composition of one or more embodiments of the present invention is expected to be applied mainly in the food product field due to the unknown attribution of improving the unpleasant textures (swallowability and a fibrous feel) and weakness in taste (a material feel) described earlier.

[Usage for Imparting Consistency to a Liquid Composition]

The composition of one or more embodiments of the present invention, when mixed with a liquid composition (liquid seasonings and liquid beverages), can impart viscosity as its physical property and make a consistent composition which hardly drips without using a thickener or the like, hence extremely useful. Further, when the composition of one or more embodiments of the present invention is mixed with a liquid composition having a different color tone, a viscosity of the liquid composition around the composition is enhanced, particularly in the beginning of mixing, the appearance develops beautiful marble patterns making the composition's appearance commercially valuable, hence extremely useful. For an example of the latter, when soymilk and the composition of one or more embodiments of the present invention are mixed, a beverage having an appearance of marble pattern can be produced, and additionally when the composition of one or more embodiments of the present invention is sprinkled on an ice cream, the dissolved ice cream (an ice cream solution=a liquid composition) is mixed with the composition thereby to produce an ice cream having an appearance of beautiful marble pattern. When the composition of one or more embodiments of the present invention is mixed and stirred thoroughly with a suitable liquid composition, these effects can be obtained but, it is preferable to use in a proportion of 1 mass % or more of the composition of one or more embodiments of the present invention, use in a proportion of 5 mass % or more, use in a proportion of 10 mass % or more or use in a proportion of 30 mass % or more, to the final whole mixture. Further, when a proportion of the composition of one or more embodiments of the present invention used is too high, a rather hard consistent physical property is caused and thus it is preferable to use in a proportion of 90 mass % or less or use in a proportion of 70 mass % or less.

Further, when 0.1 mass % or more of alcohol is contained in a liquid composition, the composition of one or more embodiments of the present invention has better dispersibility, hence preferable.

Accordingly, one or more embodiments of the present invention comprise the following inventions.

(a) A method for producing a consistent liquid composition comprising mixing the composition of one or more embodiments of the present invention comprising the fine particle composites comprising insoluble dietary fibers and fats/oils and a liquid composition.

(b) A method for producing a liquid composition having an appearance of marble pattern comprising mixing the composition of one or more embodiments of the present invention comprising the fine particle composites comprising insoluble dietary fibers and fats/oils and a liquid composition.
(c) A method for enhancing a viscosity of a liquid composition comprising mixing the composition of one or more embodiments of the present invention comprising the fine particle composites comprising insoluble dietary fibers and fats/oils and a liquid composition.
[Usage for Controlling Denaturation of Emulsified Liquid Composition]

The composition of one or more embodiments of the present invention controls the denaturation of an emulsified liquid composition such as soymilks and cow's milks to begin with, particularly acid denaturation of proteins, and can make an acidic emulsified liquid seasoning less likely causing precipitation without using a stabilizer, hence extremely useful. When the composition of one or more embodiments of the present invention is mixed and stirred thoroughly with a suitable emulsified liquid composition, these effects can be obtained but, it is preferable to use in a proportion of 1 mass % or more, use in a proportion of 5 mass % or more, use in a proportion of 10 mass % or more or use in a proportion of 30 mass % or more of the composition of one or more embodiments of the present invention to the final whole mixture. Further, when a proportion of the composition of one or more embodiments of the present invention used is too high, a rather hard consistent physical property is caused and thus it is preferable to use in a proportion of 90 mass % or less and it is further preferable to use in a proportion of 70 mass % or less.

Accordingly, one or more embodiments of the present invention comprise the following inventions.
(a) A method for producing an acidic emulsified liquid seasoning comprising mixing the composition of one or more embodiments of the present invention comprising the fine particle composites comprising insoluble dietary fibers and fats/oils and an emulsified liquid composition.
(b) A method for controlling denaturation of an emulsified liquid composition comprising mixing the composition of one or more embodiments of the present invention comprising the fine particle composites comprising insoluble dietary fibers and fats/oils and an emulsified liquid composition.
[Usage for Emulsifying Liquid Fats/Oils and Water]

The composition of one or more embodiments of the present invention has an emulsification effect of liquid fats/oils (including liquid fats/oils contained in the composition of one or more embodiments of the present invention) and water (including water in seasonings having water as the main component such as vinegars) enabling the separation of an oil layer from an aqueous layer less likely to occur without using an emulsifier and thus is extremely useful to produce a highly stable emulsified liquid composition. Further, when the composition of one or more embodiments of the present invention is used in a dissolved gelatin solution and the like (the liquid composition) in the production process of jellies and gummies which are solid food products, water and liquid fats/oils in raw materials are homogeneously mixed with each other to produce a beautiful solid product. When the composition of one or more embodiments of the present invention is mixed and stirred thoroughly with suitable liquid fats/oils, water or a liquid composition containing water, these effects can be obtained but, it is preferable to use in a proportion of 1 mass % or more, use in a proportion of 5 mass % or more, use in a proportion of 10 mass % or more or use in a proportion of 30 mass % or more of the composition of one or more embodiments of the present invention to the final whole mixture. Further, when a proportion of the composition of one or more embodiments of the present invention used is too high, a rather hard consistent physical property is caused and thus it is preferable to use in a proportion of 90 mass % or less and it is further preferable to use in a proportion of 70 mass % or less.

Accordingly, one or more embodiments of the present invention comprise the following inventions.
(a) A method for producing an emulsified liquid composition comprising mixing the composition of one or more embodiments of the present invention comprising the fine particle composites comprising insoluble dietary fibers and fats/oils, liquid fats/oils and water.
(b) A method for enhancing emulsion stability of an emulsified liquid composition after mixed, comprising mixing the composition comprising the fine particle composites comprising insoluble dietary fibers, liquid fats/oils and water.
[Usage for Mixing with Solid Food Materials]

The composition of one or more embodiments of the present invention, when mixed (or tossed) with a solid food product (for example, tofus, potatoes, pastas or the like), has a property that the food material and the composition less likely cause lumps and become compatible without unevenness and is thus extremely useful when producing a dish in which the composition and a solid food material are mixed. Particularly, lumps are easy to be found in food materials having a whitish color tone (tofu, pasta, potatoes, rice and the like), thereby affecting a commercial value, thus making the composition particularly useful. When the composition of one or more embodiments of the present invention having a homogeneous appearance is suitably mixed (or tossed) with a solid food material, these effects can be obtained but, it is preferable to use in a proportion of 1 mass % or more, use in a proportion of 5 mass % or more, use in a proportion of 10 mass % or more or use in a proportion of 30 mass % or more of the composition of one or more embodiments of the present invention to the final whole mixture. Further, when a high amount of the composition of one or more embodiments of the present invention is used, a conspicuous appearance of the composition causes uneven appearance and thus it is preferable to use in a proportion of 90 mass % or less or use in a proportion of 70 mass % or less.

For a solid food material having a cooking step (e.g., rice and simmered dishes), the composition of one or more embodiments of the present invention can be mixed after the cooking step (e.g., rice cooking) but can also be mixed before a cooking step (e.g., rice cooking) to carry out cooking (e.g., rice cooking) in a state in which the composition is added, planning backwards, in such a way as to be a predetermined composition weight to an after-cooked mixture weight, whereby a solid food product (e.g., rice) less likely causing lumps and compatible with the composition without unevenness can also be obtained.

Accordingly, one or more embodiments of the present invention comprise the following inventions.
(a) A method for producing a food product composition comprising mixing the composition of one or more embodiments of the present invention comprising the fine particle composites comprising insoluble dietary fibers and fats/oils and a solid food material, wherein the composition and the solid food material are in a state of being homogeneously mixed.
(b) A method for causing a mixture of the composition comprising the fine particle composites comprising insoluble dietary fibers and fats/oils and a solid food material to become compatible without unevenness, comprising the composition and the solid food material.

[Usage for Heated Dishes Heat]

The composition of one or more embodiments of the present invention has properties of less likely fading color when heated and less likely burning when heated thereby enabling heat cooking while preserving a color of the composition without using a coloring agent, hence extremely useful to produce colorful heated dishes heat. For baked sweets (e.g., cookies), for example, when the composition is kneaded into a dough, baked sweets (e.g., cookies) less likely burning after heat cooked (e.g., a baking step) with a color of the composition preserved can be produced.

For a deep-fried dish (e.g., tempura), when the composition is mixed with a batter, a deep-fried dish (e.g., tempura) less likely burning after heat cooked (e.g., a frying step) with a color of the composition preserved can be produced.

When the composition of one or more embodiments of the present invention is directly used in a cooking oil, a cooking oil less likely fading a color of materials and less likely burning when heat cooked can be achieved. For example, when a heated dish preventing food materials from attaching a device using an oil such as stir-fried dishes (e.g., stir-fried rice) is prepared, the composition of one or more embodiments of the present invention is used as a cooking oil used for a device (e.g., a skillet), when a heated dish in which food materials are cooked in a heated liquid fat/oil (e.g., a deep-fried dish, specifically, tempura, fry, ajillo) is prepared, the composition of one or more embodiments of the present invention is used by heating as a cooking oil, the composition of one or more embodiments of the present invention is used as a cooking oil to prepare a heated dish cooked in a microwave (e.g., popcorn), and the composition of one or more embodiments of the present invention, when suitably diluted with a liquid fat/oil, enables the spray use without clogging a nozzle and the like and thus can be used as a cooking oil for spraying on food equipment (gears of food processing machinery, etc.).

When the composition of one or more embodiments of the present invention is suitably used for a heated dish, these effects can be obtained but, it is preferable to use in a proportion of 1 mass % or more, use in a proportion of 5 mass % or more, use in a proportion of 10 mass % or more or use in a proportion of 30 mass % or more of the composition of one or more embodiments of the present invention to the final whole mixture. Further, when a proportion of the composition of one or more embodiments of the present invention used is too high, a rather hard consistent physical property is caused and thus it is preferable to use in a proportion of 90 mass % or less or use in a proportion of 70 mass % or less.

Accordingly, one or more embodiments of the present invention comprise the following inventions.
(a) A method for producing a heated dish comprising heat cooking a food material using the composition of one or more embodiments of the present invention comprising the fine particle composites comprising insoluble dietary fibers and fats/oils as a cooking oil for a food product.
(b) A method for comprising using the composition of one or more embodiments of the present invention comprising the fine particle composites comprising insoluble dietary fibers and fats/oils as a cooking oil for a food product.

[Usage for Imparting Water Resistance to an Expandable Food Product]

The composition of one or more embodiments of the present invention can impart water resistance to an expandable food product which notably changes a texture by water absorption (sponge cakes, arare rice crackers, sembei rice crackers, breads, castella, pancakes, puffed rice, etc.) while imparting flavors of food materials derived from the composition and thus can impart water resistance to expandable food products without using an animal-based material (butter etc.) or a fat/oil containing food additives (margarine etc.), hence extremely useful. For example, when the composition of one or more embodiments of the present invention is applied to the surface of bread (an expandable food product), a flavor of a food material derived from the composition can be imparted to the bread while imparting water resistance and thus the composition can be favorably used for the purpose of closely contacting a food material containing abundant water such as sandwiches. When a sembei rice cracker is baked after the composition of one or more embodiments of the present invention is applied to the surface thereof, water resistance is imparted and a sembei rice cracker having an industrially preferable quality less likely changing a texture by humidity can be obtained. When the composition of one or more embodiments of the present invention is suitably used for expandable food products, these effects can be obtained but, the composition of one or more embodiments of the present invention may be used in a proportion of 1 mass % or more, 5 mass % or more, 10 mass % or more or 30 mass % or more to the final whole mixture. Further, when a proportion of the composition of one or more embodiments of the present invention used is too high, a rather hard consistent physical property is caused and thus it is preferable to use in a proportion of 90 mass % or less or use in a proportion of 70 mass % or less.

Accordingly, one or more embodiments of the present invention comprise the following embodiments.
(a) A method for producing a water resistance-imparted food product expandable by water absorption, comprising treating a food product expandable by water absorption with the composition of one or more embodiments of the present invention comprising the fine particle composites comprising insoluble dietary fibers and fats/oils.
(b) A method for imparting water resistance to an expandable food product comprising treating a food product expandable by water absorption with the composition of one or more embodiments of the present invention comprising the fine particle composites comprising insoluble dietary fibers and fats/oils.

[Usage for Controlling Water Loss from a Food Material]

The composition of one or more embodiments of the present invention can suppress component loss from a food product whose component is likely to be lost (animal-based food materials such as meats and fishes) while imparting a flavor of the food material derived from the composition thereto, hence extremely useful. For example, when the composition of one or more embodiments of the present invention is applied to the surface of a food product whose component is likely to be lost (e.g., steaks), the component (e.g., a meat juice) loss from the food product can be suppressed while a flavor of the food material derived from the composition is imparted to the food product (e.g., steaks), which is thereby favorably used. Further, when the composition of one or more embodiments of the present invention is applied to the surface of pre-cooked food product raw material (e.g., raw meats) and then grilled, the component (e.g., a meat juice) loss during the cooking step is suppressed and a food product with little component loss can be obtained. When the composition of one or more embodiments of the present invention is suitably mixed with a food product whose component is likely to be lost, the effect can be obtained but, the composition of one or more embodiments of the present invention may be used in a proportion of 1 mass % or more, 5 mass % or more, 10 mass % or more, or 30 mass % or more of the composition of one or more embodiments of the present invention to the final whole mixture. When the composition of one or more embodiments of the present invention is used in a too high proportion, a rather hard and consistent physical property can be given and thus the composition of one or more embodiments of the present invention may be used in a proportion of 90 mass % or less 70 mass % or less.

Accordingly, one or more embodiments of the present invention comprise the following inventions.
(a) A method for producing a food product (e.g., a meat dish and a fish dish) with controlled component loss during cooking, comprising treating a food product from which a component is easily lost during cooking (e.g., animal-based food materials such as meats and fishes) with the composition of one or more embodiments of the present invention comprising the fine particle composites comprising insoluble dietary fibers and fats/oils.
(b) A method for controlling component loss from a food product from which a component is easily lost during cooking (e.g., meats and fishes), comprising treating the food product (e.g., animal-based food materials such as meats and fishes) with the composition of one or more embodiments of the present invention comprising the fine particle composites comprising insoluble dietary fibers and fats/oils.

EXAMPLES

Hereafter, one or more embodiments of the present invention are described in further details in reference to examples but these examples are definitely illustrated for the purpose of convenience only and thus one or more embodiments of the present invention should not be limited to these examples in any senses.
[Preparation of Composition Samples]
Composition samples of Comparative Examples 1 to 6 and Test Examples 1 to 19 were prepared as follows.
Dried products of sweet corn which is a kind of the grains and beetroot, carrot, pumpkin, bell pepper, broccoli and tomato which are a kind of the vegetables were pulverized by the method described in the "Pretreatment" of Table 3 to be described later thereby to obtain dried pulverized products. Further, pea (edible part: green pea, inedible part: pod), soybean (edible part: soybean or edamame, inedible part: pod) which are a kind of pulses were boiled, removed from the pods and dried to be edible parts and pulverized by the method described in the "Pretreatment" of Table 3 to be described later thereby to obtain dried pulverized products. Each of the dried pulverized products was dried until a water activity level reached 0.95 or less. Note that the parts commonly subjected to eating and drinking (parts other than the inedible parts) are used as the edible parts of each food material together with, as the inedible part of some food materials, sweet corn core, bell pepper seed and stem, pumpkin seed and gut, beet skin, broccoli stalk and leaf, edamame pod and tomato stem.

These dried pulverized products were suitably mixed with media, water and fats/oils as necessary, in accordance with the formulation described in Tables to be described later, thoroughly agitated until the mixture were apparently homogeneous in a desk top agitator thereby to obtain a paste of coarsely pulverized composition. For the fats/oils, a commercial olive oil (saturated fatty acid 14%, unsaturated fatty acid 80%), a commercial rapeseed oil (saturated fatty acid 7%, unsaturated fatty acid 86%) and a palm oil (saturated fatty acid 50%, unsaturated fatty acid 50%) were used.

These coarsely pulverized products were pretreated as necessary in accordance with the "Pretreatment" of Table 3 to be described later and microrefinement treatment was carried out in accordance with the method described in the "Microrefinement treatment method" of Table 3 to be described later. When the "bead" was used as the media, a wet bead mill microgrinder and φ1 mm beads were used to carry out the microrefinement treatment in accordance with treatment conditions described in tables to be described later to obtain each of the composition samples. The pressure applying condition was adjusted in such a way that the maximum pressure (which is 0 because no pressure is applied in the case of treatment under the normal pressure) during the treatment is the pressure applying condition described in tables to be described later by suitably changing the outlet opening of the wet bead mill microgrinder and the delivery rate and the microrefinement treatment was carried out under constant conditions until after the treatment was finished.
<Particle Size Distribution (Modal Diameter, Maximum Size, d50, Specific Surface Area Per Unit Volume)>
Particle size distribution of each of the composition samples was measured using a Microtrac MT3300 EX2 system of MicrotracBEL Corp. as a laser diffraction particle size distribution analyzer. Ethanol was used as a solvent at the time of measurement and DMSII (Data Management System version 2, MicrotracBEL Corp.) was used as a measurement application software. At the time of measurement, press down WASH button of the measurement software to carry our washing, then press down SET ZERO button of the same software to carry out zero adjustment, and a sample was directly loaded at SAMPLE LOADING until a concentration of the sample reached an appropriate range.

When a sample of not applying disturbance, that is, a sample before ultrasonication, was measured, a sample concentration was adjusted to within an appropriate range in 2 sample loadings after the sample was loaded and then laser diffraction measurement was immediately carried out at a flow rate of 60% and a measurement time of 10 seconds to use an obtained result as a measured value. On the other hand, when a sample after applying disturbance, that is, a sample after ultrasonication, was measured, a sample concentration was adjusted to within an appropriate range after the sample was loaded at SAMPLE LOADING and subsequently ULTRASONICATION BUTTON of the software was pressed down to apply ultrasound at frequency of 40 kHz with an output of 40 W for 3 minutes. Thereafter, defoaming treatment was carried out 3 times, the sample loading treatment was carried out again, the sample concentration was confirmed to have been still within the appropriate range and subsequently laser diffraction measurement was readily carried out at a flow rate of 60% and a measurement time of 10 seconds to use an obtained result as a measured value. Measurement conditions used were distribution mode: volume, particle refractive index: 1.60, solvent refractive index: 1.36, measurement upper limit (μm)=2,000.00 μm and measurement lower limit (μm)=0.021 μm.

A particle size distribution of each channel of the samples was measured using a particle size of each measurement channel shown in the following Table 2 as the standard. Frequencies of the particles having a particle size or less than those specified in each channel and also having a particle size larger than those specified in a channel having a number greater by one (the maximum channel in the measurement range uses the measurement lower limit particle size) were measured by each channel, whereby the particle frequency % of each channel was determined using the total frequency of all channels within the measurement range as the denominator. Specifically, the particle frequencies % of the following 132 channels were measured respectively. From the results obtained by the measurement, the particle size of the channel having the highest particle frequency % was determined as the mode particle size. When there are more than one channels with exactly the same particle frequency %, the particle size of a channel having the smallest particle size among them was employed as the mode particle size. Further, a particle size of the channel having the largest particle size among the channels in which the particle frequencies % were detected was employed as the maximum particle size.

TABLE 2

| Channel | Particle size (μm) |
| --- | --- |
| 1 | 2000.000 |
| 2 | 1826.000 |
| 3 | 1674.000 |
| 4 | 1535.000 |
| 5 | 1408.000 |
| 6 | 1291.000 |
| 7 | 1184.000 |
| 8 | 1086.000 |
| 9 | 995.600 |
| 10 | 913.000 |
| 11 | 837.200 |
| 12 | 767.700 |
| 13 | 704.000 |
| 14 | 645.600 |
| 15 | 592.000 |
| 16 | 542.900 |
| 17 | 497.800 |
| 18 | 456.500 |
| 19 | 418.600 |
| 20 | 383.900 |
| 21 | 352.000 |
| 22 | 322.800 |
| 23 | 296.000 |
| 24 | 271.400 |
| 25 | 248.900 |
| 26 | 228.200 |
| 27 | 209.300 |
| 28 | 191.900 |
| 29 | 176.000 |
| 30 | 161.400 |
| 31 | 148.000 |
| 32 | 135.700 |
| 33 | 124.500 |
| 34 | 114.100 |
| 35 | 104.700 |
| 36 | 95.960 |
| 37 | 88.000 |
| 38 | 80.700 |
| 39 | 74.000 |
| 40 | 67.860 |
| 41 | 62.230 |
| 42 | 57.060 |
| 43 | 52.330 |
| 44 | 47.980 |
| 45 | 44.000 |
| 46 | 40.350 |
| 47 | 37.000 |
| 48 | 33.930 |
| 49 | 31.110 |
| 50 | 28.530 |
| 51 | 26.160 |
| 52 | 23.990 |
| 53 | 22.000 |
| 54 | 20.170 |
| 55 | 18.500 |
| 56 | 16.960 |
| 57 | 15.560 |
| 58 | 14.270 |
| 59 | 13.080 |

TABLE 2-continued

| Channel | Particle size (μm) |
| --- | --- |
| 60 | 12.000 |
| 61 | 11.000 |
| 62 | 10.090 |
| 63 | 9.250 |
| 64 | 8.482 |
| 65 | 7.778 |
| 66 | 7.133 |
| 67 | 6.541 |
| 68 | 5.998 |
| 69 | 5.500 |
| 70 | 5.044 |
| 71 | 4.625 |
| 72 | 4.241 |
| 73 | 3.889 |
| 74 | 3.566 |
| 75 | 3.270 |
| 76 | 2.999 |
| 77 | 2.750 |
| 78 | 2.522 |
| 79 | 2.312 |
| 80 | 2.121 |
| 81 | 1.945 |
| 82 | 1.783 |
| 83 | 1.635 |
| 84 | 1.499 |
| 85 | 1.375 |
| 86 | 1.261 |
| 87 | 1.156 |
| 88 | 1.060 |
| 89 | 0.972 |
| 90 | 0.892 |
| 91 | 0.818 |
| 92 | 0.750 |
| 93 | 0.688 |
| 94 | 0.630 |
| 95 | 0.578 |
| 96 | 0.530 |
| 97 | 0.488 |
| 98 | 0.446 |
| 99 | 0.409 |
| 100 | 0.375 |
| 101 | 0.344 |
| 102 | 0.315 |
| 103 | 0.289 |
| 104 | 0.265 |
| 105 | 0.243 |
| 106 | 0.223 |
| 107 | 0.204 |
| 108 | 0.187 |
| 109 | 0.172 |
| 110 | 0.158 |
| 111 | 0.145 |
| 112 | 0.133 |
| 113 | 0.122 |
| 114 | 0.111 |
| 115 | 0.102 |
| 116 | 0.094 |
| 117 | 0.086 |
| 118 | 0.079 |
| 119 | 0.072 |
| 120 | 0.066 |
| 121 | 0.061 |
| 122 | 0.056 |
| 123 | 0.051 |
| 124 | 0.047 |
| 125 | 0.043 |
| 126 | 0.039 |
| 127 | 0.036 |
| 128 | 0.033 |
| 129 | 0.030 |
| 130 | 0.028 |
| 131 | 0.026 |
| 132 | 0.023 |

[Sensory Evaluation of the Composition Samples]

Sensory evaluation was carried out by the following procedure on the composition samples of Comparative Examples 1 to 6 and Test Examples 1 to 19 obtained by the above procedure.

<"Material Feel", "Swallowability", "Fibrous Feel", "Eating Difficulty">

A sensory test, in which an extra amount (100 g) of each composition sample obtained in test examples and comparative examples was eaten and the quality of tastes when eaten was evaluated, was carried out by the total of 10 trained sensory inspectors. In this sensory test, the evaluation was made with the full point of 5 for each item of "material feel", "swallowability", "fibrous feel", "eating difficulty". Tastes of the compositions were evaluated for the "material feel" on 5: favorable flavor derived from food materials is intense, 4: favorable flavor derived from food materials is rather intense, 3: favorable flavor derived from food materials is tasted and tolerable, 2: favorable flavor derived from food materials is rather mild, 1: favorable flavor derived from food materials is mild, for the "swallowability" on 5 scales of 5: not uncomfortable when swallow down, 4: not much uncomfortable when swallow down, 3: slightly uncomfortable when swallow down but tolerable, 2: rather uncomfortable when swallow down, 1: uncomfortable when swallow down, for the "fibrous feel" on 5 scales of 5: no dry feeling or stringiness derived from dietary fibers, 4: dry feeling and stringiness derived from dietary fibers are not much noted, 3: slight dry feeling and stringiness derived from dietary fibers are sensed but tolerable, 2: dry feeling and stringiness derived from dietary fibers are rather noted, 1: dry feeling and stringiness derived from dietary fibers are sensed, for the "eating difficulty" on 5 scales of 5: food materials are not stuck in the mouse when eating and very easy to eat, 4: food materials are not much stuck in the mouth when eating and easy to eat, 3: food materials are slightly stuck in the mouth when eating but eatability is tolerable, 2: food materials are stuck in the mouth when eating and rather difficult to eat, 1: food materials are notably stuck in the mouth when eating and very difficult to eat. Each of the evaluation item was evaluated by a method in which each inspector selected one number closest to his or her own evaluation. Further, tally of the evaluation results was calculated from the arithmetic mean of the scores by a total of 10 inspectors.

<Operation Procedure of Sensory Evaluation>

Discrimination trainings of the following A) to C) were provided to the sensory inspectors on the evaluation items relating to the sense of taste, "material feel", "swallowability", "fibrous feel", and "eating difficulty" out of the above various sensory tests thereby to select inspectors who particularly excelled in the achievement, were experienced in product development, had enough knowledge in qualities such as product taste and appearance and were capable of carrying out absolute evaluations on each of the sensory inspections.

A) Quality of taste discrimination test in which, for five flavors (sweetness: taste of sugar, acidity: taste of tartaric acid, umami: taste of sodium glutamate, salty: taste of sodium chloride, bitterness: taste of caffeine), aqueous solutions having concentrations close to thresholds of the respective components are prepared and 2 distilled water samples are added to make a total of 7 samples, and from which the sample of each taste is accurately discriminated.

B) Concentration discrimination test in which concentration differences in 5 kinds of saline solutions and acetic acid aqueous solutions having slightly different concentrations are accurately discriminated.

C) Three-item discrimination test in which a total of 3 samples of 2 soy sauces from manufacturer A and 1 soy sauce from manufacturer B are provided from which the soy sauce from manufacturer B is accurately discriminated.

Additionally, for all of the above evaluation items, reference samples were evaluated by all inspectors in advance to standardize each score for the evaluation criteria and then an objective sensory inspection was carried out by a total of 10 panelists. The evaluation of each evaluation item was made by a method in which each inspector selected one number closest to his or her own evaluation from the 5-scale marks on each item. Tally of the evaluation results were calculated from the arithmetic mean of the scores by a total of 10 panelists and standard deviations were further calculated to evaluate variations among the panelists.

[Analysis and Evaluation Results on the Composition Samples]

The analysis and evaluation results on the composition samples of Comparative Examples 1 to 6 and Test Examples 1 to 19 are shown in the following from Table 3 to Table 8.

TABLE 3

| | | | Preparation Example | | | | | |
| --- | --- | --- | --- | --- | --- | --- | --- | --- |
| | | | Comparative Example 1 | Test Example 1 | Test Example 2 | Test Example 3 | Test Example 4 | Test Example 5 |
| Formulation | [Edible part] dried carrot | Parts by mass | | | | | | |
| | [Edible part] dried pumpkin | Parts by mass | | | | | | |
| | [Edible part] dried sweet corn | Parts by mass | 250 | 200 | 250 | 120 | 100 | |
| | [Edible part] dried edamame | Parts by mass | | | | 40 | | 400 |
| | [Edible part] dried bell pepper | Parts by mass | | | | | | |
| | [Edible part] dried beetroot | Parts by mass | | | | | | |
| | [Edible part] dried green pea | Parts by mass | | | | | | |
| | [Edible part] dried broccoli | Parts by mass | | | | | | |
| | [Edible part] dried tomato | Parts by mass | | | | | | |
| | [Edible part] dried sesame | Parts by mass | | | | | | |
| | [Inedible part] dried sweet corn (core) | Parts by mass | 250 | 100 | 250 | 100 | 250 | |
| | [Inedible part] dried bell pepper (seed, gut) | Parts by mass | | | | | | |
| | [Inedible part] dried pumpkin (seed, gut) | Parts by mass | | | | | | |
| | [Inedible part] dried beetroot (skin) | Parts by mass | | | | | | |
| | [Inedible part] dried broccoli (stalk, leave) | Parts by mass | | | | | | |

TABLE 3-continued

|  |  |  |  |  |  |  |  |
|---|---|---|---|---|---|---|---|
|  | [Inedible part] dried edamame (pod) | Parts by mass |  |  |  |  | 180 | 180 |
|  | [Inedible part] dried green pea (pod) | Parts by mass |  |  |  |  |  |  |
|  | [Inedible part] dried tomato (stem) | Parts by mass |  |  |  |  |  |  |
|  | [Inedible part] dried carrot (skin, stem) | Parts by mass |  |  |  |  |  |  |
|  | Palm oil | Parts by mass |  |  |  |  |  |  |
|  | Olive oil | Parts by mass | 500 | 700 | 500 | 560 | 650 |  |
|  | Rapeseed oil | Parts by mass |  |  |  |  |  | 420 |
|  | Water | Parts by mass |  |  |  |  |  |  |
|  | Total | Parts by mass | 1000 | 1000 | 1000 | 1000 | 1000 | 1000 |
| Measured value | Bostwick viscosity measured value (20° C. · 10 sec) of fat/oil parts in composition | cm | More than 28 cm | More than 28 cm | More than 28 cm | More than 28 cm | More than 28 cm | More than 28 cm |
|  | Total content of food materials containing insoluble dietary fibers to total insoluble component content in composition | % | 100 | 100 | 100 | 100 | 100 | 100 |
|  | Inedible part/ (edible part + inedible part) |  | 50% | 33% | 50% | 64% | 71% | 31% |
| Microrefinement treatment conditions | Pretreatment |  | Rotation crusher (Wonder crusher) | Rotation crusher (Wonder crusher) | Rotation crusher (Wonder crusher) | Rotation crusher (Wonder crusher) | Rotation crusher (Wonder crusher) | Rotation crusher (Wonder crusher) |
|  | Microrefinement treatment method |  | — | Stirred media mill | Stirred media mill | Stirred media mill | Stirred media mill | Stirred media mill |
|  | Treatment time | min | — | 5 | 3 | 3 | 3 | 10 |
|  | Bead size |  | — | Bead mill φ1 mm bead | Bead mill φ1 mm bead | Bead mill φ1 mm bead | Bead mill φ1 mm bead | Bead mill φ1 mm bead |
|  | Treatment temperature (immediately after starting) | (T1) ° C. | — | 22 | 21 | 21 | 22 | 21 |
|  | Treatment temperature (at time of completing treatment) | (T2) ° C. | — | 27 | 25 | 26 | 25 | 38 |
|  | Pressure applying condition at microrefining (Max pressure) | MPa | 0 (Normal pressure) | 0.35 | 0.20 | 0.11 | 0.20 | 0.15 |

|  |  |  | Preparation Example ||||
|---|---|---|---|---|---|---|
|  |  |  | Test Example 6 | Comparative Example 2 | Test Example 7 | Test Example 8 |
| Formulation | [Edible part] dried carrot | Parts by mass |  |  |  |  |
|  | [Edible part] dried pumpkin | Parts by mass |  |  |  |  |
|  | [Edible part] dried sweet corn | Parts by mass |  |  |  |  |
|  | [Edible part] dried edamame | Parts by mass | 220 | 220 |  |  |
|  | [Edible part] dried bell pepper | Parts by mass |  |  | 450 | 200 |
|  | [Edible part] dried beetroot | Parts by mass |  |  |  |  |
|  | [Edible part] dried green pea | Parts by mass |  |  |  |  |
|  | [Edible part] dried broccoli | Parts by mass |  |  |  |  |
|  | [Edible part] dried tomato | Parts by mass |  |  |  |  |
|  | [Edible part] dried sesame | Parts by mass |  |  |  |  |
|  | [Inedible part] dried sweet corn (core) | Parts by mass |  |  |  |  |
|  | [Inedible part] dried bell pepper (seed, gut) | Parts by mass |  |  | 50 | 10 |
|  | [Inedible part] dried pumpkin (seed, gut) | Parts by mass |  |  |  |  |
|  | [Inedible part] dried beetroot (skin) | Parts by mass |  |  |  |  |
|  | [Inedible part] dried broccoli (stalk, leave) | Parts by mass |  |  |  |  |
|  | [Inedible part] dried edamame (pod) | Parts by mass | 180 | 180 |  |  |
|  | [Inedible part] dried green pea (pod) | Parts by mass |  |  |  |  |

TABLE 3-continued

|  |  |  | | | | | |
|---|---|---|---|---|---|---|---|
|  | [Inedible part] dried tomato (stem) | Parts by mass | | | | | |
|  | [Inedible part] dried carrot (skin, stem) | Parts by mass | | | | | |
|  | Palm oil | Parts by mass | | | | | |
|  | Olive oil | Parts by mass | | 600 | 600 | 500 | 790 |
|  | Rapeseed oil | Parts by mass | | | | | |
|  | Water | Parts by mass | | | | | |
| Measured value | Total | Parts by mass | | 1000 | 1000 | 1000 | 1000 |
|  | Bostwick viscosity measured value (20° C. · 10 sec) of fat/oil parts in composition | cm | | More than 28 cm | More than 28 cm | More than 28 cm | More than 28 cm |
|  | Total content of food materials containing insoluble dietary fibers to total insoluble component content in composition | % | | 100 | 100 | 100 | 100 |
|  | Inedible part/ (edible part + inedible part) |  | | 45% | 45% | 10% | 5% |
| Microrefinement treatment conditions | Pretreatment |  | | Rotation crusher (Wonder crusher) | Rotation crusher (Wonder crusher) | Rotation crusher (Wonder crusher) | Rotation crusher (Wonder crusher) |
|  | Microrefinement treatment method |  | | Stirred media mill | — | Stirred media mill | Stirred media mill |
|  | Treatment time | min | | 3 | — | 15 | 5 |
|  | Bead size |  | | Bead mill φ1 mm bead | — | Bead mill φ1 mm bead | Bead mill φ1 mm bead |
|  | Treatment temperature (immediately after starting) | (T1) ° C. | | 21 | — | 20 | 21 |
|  | Treatment temperature (at time of completing treatment) | (T2) ° C. | | 23 | — | 28 | 33 |
|  | Pressure applying condition at microrefining (Max pressure) | MPa | | 0.07 | 0 (Normal pressure) | 0.04 | 0.05 |

TABLE 4

|  |  |  | Preparation Example | | | | |
|---|---|---|---|---|---|---|---|
|  |  |  | Comparative Example 3 | Test Example 9 | Test Example 10 | Test Example 11 | Test Example 12 |
| Formulation | [Edible part] dried carrot | Parts by mass | | | | | |
|  | [Edible part] dried pumpkin | Parts by mass | | | 400 | | |
|  | [Edible part] dried sweet corn | Parts by mass | | | | | |
|  | [Edible part] dried edamame | Parts by mass | | | | | |
|  | [Edible part] dried bell pepper | Parts by mass | 450 | | | | |
|  | [Edible part] dried beetroot | Parts by mass | | 100 | | | |
|  | [Edible part] dried green pea | Parts by mass | | | | 400 | 500 |
|  | [Edible part] dried broccoli | Parts by mass | | | | | |
|  | [Edible part] dried tomato | Parts by mass | | | | | |
|  | [Edible part] dried sesame | Parts by mass | | | | | |
|  | [Inedible part] dried sweet corn (core) | Parts by mass | | | | | |
|  | [Inedible part] dried bell pepper (seed, gut) | Parts by mass | 50 | | | | |
|  | [Inedible part] dried pumpkin (seed, gut) | Parts by mass | | | 100 | | |
|  | [Inedible part] dried beetroot (skin) | Parts by mass | | 100 | | | |
|  | [Inedible part] dried broccoli (stalk, leave) | Parts by mass | | | | | |
|  | [Inedible part] dried edamame (pod) | Parts by mass | | | | | |
|  | [Inedible part] dried green pea (pod) | Parts by mass | | | | 100 | 200 |

TABLE 4-continued

|  |  |  |  |  |  |  |  |
|---|---|---|---|---|---|---|---|---|
|  | [Inedible part] dried tomato (stem) | Parts by mass |  |  |  |  |  |
|  | [Inedible part] dried carrot (skin, stem) | Parts by mass |  |  |  |  |  |
|  | Palm oil | Parts by mass |  |  |  |  |  |
|  | Olive oil | Parts by mass | 500 | 800 | 500 | 500 | 300 |
|  | Rapeseed oil | Parts by mass |  |  |  |  |  |
|  | Water | Parts by mass |  |  |  |  |  |
| Measured value | Total | Parts by mass | 1000 | 1000 | 1000 | 1000 | 1000 |
|  | Bostwick viscosity measured value (20° C. · 10 sec) of fat/oil parts in composition | cm | More than 28 cm | More than 28 cm | More than 28 cm | More than 28 cm | More than 28 cm |
|  | Total content of food materials containing insoluble dietary fibers to total insoluble component content in composition | % | 100 | 100 | 100 | 100 | 100 |
|  | Inedible part/ (edible part + inedible part) |  | 10% | 50% | 20% | 20% | 29% |
| Microrefinement treatment conditions | Pretreatment |  | Rotation crusher (Wonder crusher) | Rotation crusher (Wonder crusher) | Rotation crusher (Wonder crusher) | Rotation crusher (Wonder crusher) | Rotation crusher (Wonder crusher) |
|  | Microrefinement treatment method |  | — | Stirred media mill | Stirred media mill | Stirred media mill | Stirred media mill |
|  | Treatment time | min | — | 15 | 15 | 20 | 3 |
|  | Bead size |  | — | Bead mill φ1 mm bead | Bead mill φ1 mm bead | Bead mill φ1 mm bead | Bead mill φ1 mm bead |
|  | Treatment temperature (immediately after starting) (T1) | ° C. | — | 23 | 21 | 21 | 23 |
|  | Treatment temperature (at time of completing treatment) (T2) | ° C. | — | 28 | 62 | 51 | 30 |
|  | Pressure applying condition at microrefining (Max pressure) | MPa | 0 (Normal pressure) | 0.08 | 0.20 | 0.04 | 0.07 |

|  |  |  | Preparation Example ||||
|---|---|---|---|---|---|---|
|  |  |  | Test Example 13 | Comparative Example 4 | Test Example 14 | Comparative Example 5 |
| Formulation | [Edible part] dried carrot | Parts by mass | 300 |  |  |  |
|  | [Edible part] dried pumpkin | Parts by mass |  |  |  |  |
|  | [Edible part] dried sweet corn | Parts by mass |  |  |  |  |
|  | [Edible part] dried edamame | Parts by mass |  |  |  |  |
|  | [Edible part] dried bell pepper | Parts by mass |  |  |  |  |
|  | [Edible part] dried beetroot | Parts by mass |  |  |  |  |
|  | [Edible part] dried green pea | Parts by mass |  |  |  |  |
|  | [Edible part] dried broccoli | Parts by mass |  |  |  |  |
|  | [Edible part] dried tomato | Parts by mass |  | 500 | 500 |  |
|  | [Edible part] dried sesame | Parts by mass |  |  |  | 1000 |
|  | [Inedible part] dried sweet corn (core) | Parts by mass |  |  |  |  |
|  | [Inedible part] dried bell pepper (seed, gut) | Parts by mass |  |  |  |  |
|  | [Inedible part] dried pumpkin (seed, gut) | Parts by mass |  |  |  |  |
|  | [Inedible part] dried beetroot (skin) | Parts by mass |  |  |  |  |
|  | [Inedible part] dried broccoli (stalk, leave) | Parts by mass |  |  |  |  |
|  | [Inedible part] dried edamame (pod) | Parts by mass |  |  |  |  |
|  | [Inedible part] dried green pea (pod) | Parts by mass |  |  |  |  |
|  | [Inedible part] dried tomato (stem) | Parts by mass |  |  | 50 |  |
|  | [Inedible part] dried carrot (skin, stem) | Parts by mass | 30 |  |  |  |

TABLE 4-continued

|  |  |  |  |  |  |  |  |
|---|---|---|---|---|---|---|---|
|  | Palm oil |  | Parts by mass |  |  |  |  |
|  | Olive oil |  | Parts by mass | 670 | 500 | 450 |  |
|  | Rapeseed oil |  | Parts by mass |  |  |  |  |
|  | Water |  | Parts by mass |  |  |  |  |
| Measured value | Total |  | Parts by mass | 1000 | 1000 | 1000 | 1000 |
|  | Bostwick viscosity measured value (20° C. · 10 sec) of fat/oil parts in composition |  | cm | More than 28 cm | More than 28 cm | More than 28 cm | More than 28 cm |
|  | Total content of food materials containing insoluble dietary fibers to total insoluble component content in composition |  | % | 100 | 100 | 100 | 100 |
|  | Inedible part/ (edible part + inedible part) |  |  | 9% | 0% | 9% | 0% |
| Microrefinement treatment conditions | Pretreatment |  |  | Rotation crusher (Wonder crusher) | jet mill | Rotation crusher (Wonder crusher) | Rotation crusher (Wonder crusher) |
|  | Microrefinement treatment method |  |  | Stirred media mill | — | Stirred media mill | Stirred media mill |
|  | Treatment time |  | min | 10 | — | 10 | 30 |
|  | Bead size |  |  | Bead mill φ1 mm bead | — | Bead mill φ1 mm bead | Attritor φ2 mm bead |
|  | Treatment temperature (immediately after starting) | (T1) | ° C. | 22 | — | 22 | 22 |
|  | Treatment temperature (at time of completing treatment) | (T2) | ° C. | 32 | — | 28 | 64 |
|  | Pressure applying condition at microrefining (Max pressure) |  | MPa | 0.07 | 0 (Normal pressure) | 0.07 | 0 (Normal pressure) |

TABLE 5

|  |  |  | Preparation Example | | |
|---|---|---|---|---|---|
|  |  |  | Test Example 15 | Test Example 16 | Test Example 17 |
| Formulation | [Edible part] dried carrot | Parts by mass |  |  |  |
|  | [Edible part] dried pumpkin | Parts by mass |  |  |  |
|  | [Edible part] dried sweet corn | Parts by mass |  | 100 | 100 |
|  | [Edible part] dried edamame | Parts by mass |  |  |  |
|  | [Edible part] dried bell pepper | Parts by mass |  |  |  |
|  | [Edible part] dried beetroot | Parts by mass |  |  |  |
|  | [Edible part] dried green pea | Parts by mass |  |  |  |
|  | [Edible part] dried broccoli | Parts by mass | 100 |  |  |
|  | [Edible part] dried tomato | Parts by mass |  |  |  |
|  | [Edible part] dried sesame | Parts by mass |  |  |  |
|  | [Inedible part] dried sweet corn (core) | Parts by mass |  | 250 | 250 |
|  | [Inedible part] dried bell pepper (seed, gut) | Parts by mass |  |  |  |
|  | [Inedible part] dried pumpkin (seed, gut) | Parts by mass |  |  |  |
|  | [Inedible part] dried beetroot (skin) | Parts by mass |  |  |  |
|  | [Inedible part] dried broccoli (stalk, leave) | Parts by mass | 100 |  |  |
|  | [Inedible part] dried edamame (pod) | Parts by mass |  |  |  |
|  | [Inedible part] dried green pea (pod) | Parts by mass |  |  |  |
|  | [Inedible part] dried tomato (stem) | Parts by mass |  |  |  |
|  | [Inedible part] dried carrot (skin, stem) | Parts by mass |  |  |  |

TABLE 5-continued

|  |  |  |  |  |  |
|---|---|---|---|---|---|
|  | Palm oil | Parts by mass |  | 50 |  |
|  | Olive oil | Parts by mass | 600 | 600 | 570 |
|  | Rapeseed oil | Parts by mass |  |  |  |
|  | Water | Parts by mass | 150 | 50 | 80 |
|  | Total | Parts by mass | 1000 | 1000 | 1000 |
| Measured value | Bostwick viscosity measured value (20° C. · 10 sec) of fat/oil parts in composition | cm | 15 cm | More than 28 cm | More than 28 cm |
|  | Total content of food materials containing insoluble dietary fibers to total insoluble component content in composition | % | 80 | 100 | 100 |
|  | Inedible part/ (edible part + inedible part) |  | 9% | 71% | 71% |
| Microrefinement treatment conditions | Pretreatment |  | Rotation crusher (Wonder crusher) | Rotation crusher (Wonder crusher) | Rotation crusher (Wonder crusher) |
|  | Microrefinement treatment method |  | Stirred media mill | Stirred media mill | Stirred media mill |
|  | Treatment time | min | 3 | 0.5 | 0.5 |
|  | Bead size |  | Bead mill φ1 mm bead | Bead mill φ1 mm bead | Bead mill φ1 mm bead |
|  | Treatment temperature (immediately after starting) (T1) | ° C. | 20 | 22 | 22 |
|  | Treatment temperature (at time of completing treatment) (T2) | ° C. | 28 | 25 | 30 |
|  | Pressure applying condition at microrefining (Max pressure) | MPa | 0.09 | 0.11 | 0.15 |

|  |  |  | Preparation Example | | |
|---|---|---|---|---|---|
|  |  |  | Test Example 18 | Comparative Example 6 | Test Example 19 |
| Formulation | [Edible part] dried carrot | Parts by mass |  |  |  |
|  | [Edible part] dried pumpkin | Parts by mass |  |  |  |
|  | [Edible part] dried sweet corn | Parts by mass | 100 | 100 | 50 |
|  | [Edible part] dried edamame | Parts by mass |  |  |  |
|  | [Edible part] dried bell pepper | Parts by mass |  |  |  |
|  | [Edible part] dried beetroot | Parts by mass |  |  |  |
|  | [Edible part] dried green pea | Parts by mass |  |  |  |
|  | [Edible part] dried broccoli | Parts by mass |  |  |  |
|  | [Edible part] dried tomato | Parts by mass |  |  |  |
|  | [Edible part] dried sesame | Parts by mass |  |  |  |
|  | [Inedible part] dried sweet corn (core) | Parts by mass | 250 | 250 | 2 |
|  | [Inedible part] dried bell pepper (seed, gut) | Parts by mass |  |  |  |
|  | [Inedible part] dried pumpkin (seed, gut) | Parts by mass |  |  |  |
|  | [Inedible part] dried beetroot (skin) | Parts by mass |  |  |  |
|  | [Inedible part] dried broccoli (stalk, leave) | Parts by mass |  |  |  |
|  | [Inedible part] dried edamame (pod) | Parts by mass |  |  |  |
|  | [Inedible part] dried green pea (pod) | Parts by mass |  |  |  |
|  | [Inedible part] dried tomato (stem) | Parts by mass |  |  |  |
|  | [Inedible part] dried carrot (skin, stem) | Parts by mass |  |  |  |
|  | Palm oil | Parts by mass |  |  |  |
|  | Olive oil | Parts by mass | 500 | 450 | 650 |
|  | Rapeseed oil | Parts by mass |  |  | 298 |
|  | Water | Parts by mass | 150 | 200 |  |
|  | Total | Parts by mass | 1000 | 1000 | 1000 |

TABLE 5-continued

| | | | | | | |
|---|---|---|---|---|---|---|
| Measured value | Bostwick viscosity measured value (20° C. · 10 sec) of fat/oil parts in composition | cm | | More than 28 cm | More than 28 cm | More than 28 cm |
| | Total content of food materials containing insoluble dietary fibers to total insoluble component content in composition | % | | 100 | 100 | 100 |
| | Inedible part/ (edible part + inedible part) | | | 71% | 71% | 4% |
| Microrefinement treatment conditions | Pretreatment | | | Rotation crusher (Wonder crusher) | Rotation crusher (Wonder crusher) | Rotation crusher (Wonder crusher) |
| | Microrefinement treatment method | | | Stirred media mill | Stirred media mill | Stirred media mill |
| | Treatment time | min | | 0.5 | 0.5 | 20 |
| | Bead size | | | Bead mill φ1 mm bead | Bead mill φ1 mm bead | Bead mill φ1 mm bead |
| | Treatment temperature (immediately after starting) | (T1) | ° C. | 22 | 22 | 22 |
| | Treatment temperature (at time of completing treatment) | (T2) | ° C. | 34 | 39 | 29 |
| | Pressure applying condition at microrefining (Max pressure) | MPa | | 0.20 | 0.29 | 0.15 |

TABLE 6

| | | | Preparation Example | | | | |
|---|---|---|---|---|---|---|---|
| | | | Comparative Example 1 | Test Example 1 | Test Example 2 | Test Example 3 | Test Example 4 |
| Measured value | Insoluble dietary fiber content | Mass % | 6.2% | 3.4% | 6.2% | 5.7% | 4.9% |
| | Fine particle content | Mass % | 76.0 | 52.0 | 82.6 | 76.1 | 59.3 |
| | Water content proportion | Mass % | 2.1 | 1.3 | 2.1 | 1.8 | 1.5 |
| | Total fat/oil content | Mass % | 53.6 | 75.4 | 53.6 | 60.2 | 69.2 |
| | Bostwick viscosity measured value (20° C. · 1 sec) of composition | cm | 4.0 | 5.0 | 2.0 | 3.5 | 7.0 |
| | Total fat/oil content/(water content proportion + total fat/oil content) | % | 96.3% | 98.3% | 96.3% | 97.0% | 97.9% |
| Before ultrasonication | Maximum particle size before ultrasonication | μm | 837.2 | 296.0 | 148.0 | 352.0 | 592.0 |
| | Modal diameter before ultrasonication | μm | 322.80 | 124.50 | 8.48 | 148.00 | 209.30 |
| | Minimum particle size before ultrasonication | μm | 7.13 | 2.12 | 1.78 | 1.50 | 11.00 |
| | Specific surface area per unit volume before ultrasonication | :γB  m²/ml | 0.21 | 0.28 | 0.66 | 0.54 | 0.12 |
| After ultrasonication | Maximum particle size after ultrasonication | μm | 704.0 | 124.5 | 62.2 | 74.0 | 114.1 |
| | Modal diameter after ultrasonication | μm | 228.20 | 10.09 | 9.25 | 7.13 | 47.98 |
| | Minimum particle size after ultrasonication | :dmin μm | 3.00 | 1.50 | 1.50 | 1.06 | 1.64 |
| | Specific surface area per unit volume after ultrasonication | :γA  m²/ml | 0.21 | 0.79 | 0.86 | 1.11 | 0.78 |
| | γA/dmin | | 0.07 | 0.53 | 0.58 | 1.05 | 0.48 |
| | γB/γA | | 1.01 | 0.36 | 0.76 | 0.49 | 0.15 |
| (Arithmetic mean) Sensory inspection | "Material feel" | | 2 | 4 | 5 | 5 | 5 |
| | "Swallowability" | | 2 | 4 | 5 | 5 | 4 |
| | "Fibrous feel" | | 1 | 5 | 5 | 5 | 5 |
| | "Eating difficulty" | | 1 | 5 | 5 | 5 | 5 |

| | | | Preparation Example | | | | |
|---|---|---|---|---|---|---|---|
| | | | Test Example 5 | Test Example 6 | Comparative Example 2 | Test Example 7 | Test Example 8 |
| Measured value | Insoluble dietary fiber content | Mass % | 7.5% | 5.3% | 5.3% | 6.1% | 2.5% |
| | Fine particle content | Mass % | 94.9 | 71.8 | 59.9 | 80.9 | 35.4 |
| | Water content proportion | Mass % | 2.3 | 1.7 | 1.7 | 2.1 | 0.9 |
| | Total fat/oil content | Mass % | 50.0 | 67.6 | 67.6 | 53.5 | 85.0 |
| | Bostwick viscosity measured value (20° C. · 1 sec) of composition | cm | 0.3 | 6.0 | 9.0 | 6.0 | 15.0 |

TABLE 6-continued

|  |  |  | | | | | |
|---|---|---|---|---|---|---|---|
|  | Total fat/oil content/(water content proportion + total fat/oil content) | % | 95.6% | 97.6% | 97.6% | 96.3% | 99.0% |
| Before ultrasonication | Maximum particle size before ultrasonication | μm | 592.0 | 704.0 | 837.2 | 837.2 | 592.0 |
|  | Modal diameter before ultrasonication | μm | 148.00 | 248.90 | 271.40 | 248.90 | 209.30 |
|  | Minimum particle size before ultrasonication | μm | 47.98 | 1.26 | 8.48 | 44.00 | 6.00 |
|  | Specific surface area per unit volume before ultrasonication :γB | m²/ml | 0.04 | 0.47 | 0.10 | 0.08 | 0.12 |
| After ultrasonication | Maximum particle size after ultrasonication | μm | 418.6 | 88.0 | 704.0 | 176.0 | 124.5 |
|  | Modal diameter after ultrasonication | μm | 7.13 | 6.00 | 271.40 | 9.25 | 16.96 |
|  | Minimum particle size after ultrasonication :dmin | μm | 1.06 | 0.89 | 3.57 | 1.95 | 3.00 |
|  | Specific surface area per unit volume after ultrasonication :γA | m²/ml | 0.91 | 1.29 | 0.10 | 0.69 | 0.47 |
|  | γA/dmin |  | 0.86 | 1.44 | 0.03 | 0.36 | 0.16 |
|  | γB/γA |  | 0.05 | 0.37 | 1.02 | 0.11 | 0.25 |
| (Arithmetic mean) Sensory inspection | "Material feel" |  | 5 | 5 | 3 | 4 | 4 |
|  | "Swallowability" |  | 4 | 5 | 1 | 4 | 4 |
|  | "Fibrous feel" |  | 5 | 5 | 1 | 5 | 4 |
|  | "Eating difficulty" |  | 5 | 5 | 1 | 4 | 4 |

TABLE 7

|  |  |  |  | Preparation Example | | | | |
|---|---|---|---|---|---|---|---|---|
|  |  |  |  | Comparative Example 3 | Test Example 9 | Test Example 10 | Test Example 11 | Test Example 12 |
| Measured Value | Insoluble dietary fiber content |  | Mass % | 6.1% | 2.8% | 6.5% | 11.9% | 15.9% |
|  | Fine particle content |  | Mass % | 76.1 | 36.1 | 82.8 | 79.2 | 92.2 |
|  | Water content proportion |  | Mass % | 2.1 | 0.9 | 2.1 | 2.1 | 2.9 |
|  | Total fat/oil content |  | Mass % | 53.5 | 85.8 | 52.9 | 52.1 | 30.7 |
|  | Bostwick viscosity measured value (20° C. · 1 sec) of composition |  | cm | 4.5 | 23.0 | 5.0 | 3.0 | 1.0 |
|  | Total fat/oil content/(water content proportion + total fat/oil content) |  | % | 96.3% | 99.0% | 96.2% | 96.2% | 91.5% |
| Before ultrasonication | Maximum particle size before ultrasonication |  | μm | 995.6 | 296.0 | 418.6 | 497.8 | 497.8 |
|  | Modal diameter before ultrasonication |  | μm | 418.60 | 124.50 | 161.40 | 191.90 | 209.30 |
|  | Minimum particle size before ultrasonication |  | μm | 10.19 | 5.04 | 33.93 | 47.98 | 47.98 |
|  | Specific surface area per unit volume before ultrasonication: | γB | m²/ml | 0.22 | 0.10 | 0.14 | 0.04 | 0.04 |
| After ultrasonication | Maximum particle size after ultrasonication |  | μm | 592.0 | 124.5 | 52.3 | 592.0 | 704.0 |
|  | Modal diameter after ultrasonication |  | μm | 228.20 | 5.43 | 8.48 | 15.56 | 15.56 |
|  | Minimum particle size after ultrasonication: | dmin | μm | 2.52 | 2.12 | 1.16 | 1.50 | 1.50 |
|  | Specific surface area per unit volume after ultrasonication: | γA | m²/ml | 0.22 | 0.68 | 0.89 | 0.53 | 0.54 |
|  | γA/dmin |  |  | 0.09 | 0.32 | 0.77 | 0.35 | 0.36 |
|  | γB/γA |  |  | 1.00 | 0.14 | 0.16 | 0.08 | 0.07 |
| (Arithmetic mean) Sensory inspection | "Material feel" |  |  | 3 | 5 | 4 | 4 | 4 |
|  | "Swallowability" |  |  | 1 | 4 | 5 | 4 | 4 |
|  | "Fibrous feel" |  |  | 1 | 4 | 5 | 5 | 5 |
|  | "Eating difficulty" |  |  | 2 | 4 | 5 | 4 | 4 |

|  |  |  |  | Preparation Example | | | |
|---|---|---|---|---|---|---|---|
|  |  |  |  | Test Example 13 | Comparative Example 4 | Test Example 14 | Comparative Example 5 |
| Measured Value | Insoluble dietary fiber content |  | Mass % | 3.9% | 5.6% | 6.3% | 14.0% |
|  | Fine particle content |  | Mass % | 56.4 | 49.6 | 87.0 | 99.0 |
|  | Water content proportion |  | Mass % | 1.3 | 2.1 | 2.3 | 4.0 |
|  | Total fat/oil content |  | Mass % | 71.1 | 52.1 | 46.7 | 54.2 |
|  | Bostwick viscosity measured value (20° C. · 1 sec) of composition |  | cm | 13.0 | 15.0 | 3.0 | 0.0 |
|  | Total fat/oil content/(water content proportion + total fat/oil content) |  | % | 98.2% | 96.2% | 95.3% | 93.1% |
| Before ultrasonication | Maximum particle size before ultrasonication |  | μm | 296.0 | 1184.0 | 352.0 | 497.8 |
|  | Modal diameter before ultrasonication |  | μm | 124.50 | 497.80 | 104.70 | 11.00 |
|  | Minimum particle size before ultrasonication |  | μm | 40.35 | 1.78 | 3.89 | 2.12 |
|  | Specific surface area per unit volume before ultrasonication: | γB | m²/ml | 0.06 | 0.13 | 0.12 | 0.46 |
| After ultrasonication | Maximum particle size after ultrasonication |  | μm | 104.7 | 62.2 | 124.5 | 497.8 |
|  | Modal diameter after ultrasonication |  | μm | 9.25 | 271.40 | 14.27 | 7.13 |
|  | Minimum particle size after ultrasonication: | dmin | μm | 1.78 | 0.53 | 2.52 | 1.50 |
|  | Specific surface area per unit volume after | γA | m²/ml | 0.78 | 0.03 | 0.56 | 0.65 |

TABLE 7-continued

|  |  |  | | | | |
|---|---|---|---|---|---|---|
|  | ultrasonication: |  | | | | |
|  | γA/dmin |  | 0.44 | 0.05 | 0.22 | 0.43 |
|  | γB/γA |  | 0.07 | 5.28 | 0.21 | 0.70 |
| (Arithmetic mean) Sensory inspection | "Material feel" "Swallowability" "Fibrous feel" "Eating difficulty" |  | 4 5 5 5 | 1 3 1 1 | 5 4 4 4 | 1 1 3 2 |

TABLE 8

|  |  |  |  | Preparation Example | | | | | |
|---|---|---|---|---|---|---|---|---|---|
|  |  |  |  | Test Example 15 | Test Example 16 | Test Example 17 | Test Example 18 | Comparative Example 6 | Test Example 19 |
| Measured value | Insoluble dietary fiber content |  | Mass % | 3.9% | 4.9% | 4.9% | 4.9% | 4.9% | 0.5% |
|  | Fine particle content |  | Mass % | 35.3 | 58.9 | 58.5 | 55.8 | 53.8 | 22.1 |
|  | Water content proportion |  | Mass % | 16.6 | 6.7 | 9.8 | 17.1 | 22.2 | 0.2 |
|  | Total fat/oil content |  | Mass % | 31.2 | 63.7 | 60.4 | 52.7 | 47.3 | 98.0 |
|  | Bostwick viscosity measured value (20° C. · 1 sec) of composition |  | cm | 25.0 | 7.0 | 3.0 | 2.0 | 1.0 | 28.0 |
|  | Total fat/oil content/(water content proportion + total fat/oil content) |  | % | 65.3% | 90.4% | 86.0% | 75.5% | 68.1% | 99.8% |
| Before ultrasonication | Maximum particle size before ultrasonication |  | μm | 352.0 | 592.0 | 352.0 | 456.5 | 497.0 | 33.9 |
|  | Modal diameter before ultrasonication |  | μm | 104.70 | 8.48 | 23.99 | 28.53 | 31.11 | 7.77 |
|  | Minimum particle size before ultrasonication |  | μm | 3.89 | 1.78 | 2.12 | 2.75 | 3.00 | 1.64 |
|  | Specific surface area per unit volume before ultrasonication: | γB | m²/ml | 0.12 | 0.61 | 0.53 | 0.31 | 0.29 | 0.34 |
| After ultrasonication | Maximum particle size after ultrasonication |  | μm | 124.5 | 352.0 | 296.0 | 271.4 | 248.9 | 31.1 |
|  | Modal diameter after ultrasonication |  | μm | 14.27 | 8.48 | 8.48 | 16.96 | 18.50 | 1.95 |
|  | Minimum particle size after ultrasonication: | dmin | μm | 2.52 | 1.78 | 1.78 | 1.95 | 2.12 | 0.32 |
|  | Specific surface area per unit volume after ultrasonication: | γA | m²/ml | 0.56 | 0.73 | 0.68 | 0.40 | 0.20 | 1.45 |
|  | γA/dmin |  |  | 0.22 | 0.41 | 0.38 | 0.21 | 0.09 | 4.60 |
|  | γB/γA |  |  | 0.21 | 0.84 | 0.78 | 0.78 | 1.43 | 0.23 |
| (Arithmetic mean) Sensory inspection | "Material feel" "Swallowability" "Fibrous feel" "Eating difficulty" |  |  | 4 4 4 4 | 5 4 5 5 | 5 4 5 4 | 4 4 4 4 | 3 1 3 3 | 4 5 5 5 |

[Treated Products and Preparation of Cooked Products Using Composition Samples and Evaluation]

The followings are examples of test methods on effects of the composition of one or more embodiments of the present invention in various treated products and cooked product using the composition of one or more embodiments of the present invention and evaluation results. The following sensory evaluations on Comparative Examples 7 to 13 and Test Examples 20 to 90 were carried out in accordance with the procedure described above but comprehensive opinions by all panelists were considered evaluation results.

[Effects of the Composition of One or More Embodiments of the Present Invention on Liquid Compositions]

As described in Table 9, the composition of one or more embodiments of the present invention and a liquid composition were mixed using a commercial electric hand mixer to evaluate changes in physical properties, liquid part separation (homogeneous dispersibility) after left out at room temperature for 1 hour and anti-drippingness (consistency impartation) at room temperature. As a result, it is revealed that when the composition of one or more embodiments of the present invention is mixed, the viscosity of the liquid compositions is increased as shown in Table 9.

TABLE 9

|  |  |  |  | Comparative Example 7 | Test Example 20 | Test Example 21 | Test Example 22 | Test Example 23 | Test Example 24 |
|---|---|---|---|---|---|---|---|---|---|
| Present composition | Test Example 2 | Corn paste | Mass % |  |  | 50 |  |  |  |
|  | Test Example 6 | Edamame paste | Mass % |  |  |  | 100 |  |  |
|  | Test Example 7 | Bell pepper paste | Mass % |  |  |  |  | 300 |  |
|  | Test Example 9 | Beet paste | Mass % |  |  |  |  |  | 500 |
|  | Test Example 10 | Pumpkin paste | Mass % |  |  |  |  |  |  |
|  | Test Example 11 | Green pea paste | Mass % |  | 10 |  |  |  |  |

TABLE 9-continued

| Liquid composition | | | | | | | | | |
|---|---|---|---|---|---|---|---|---|---|
| | Nam Pla | Mass % | 1000 | | 950 | 900 | 700 | 500 | |
| | Double-rich fish stock (oigatsuo tsuyu) | Mass % | | 990 | | | | | |
| | Soymilk | Mass % | | | | | | | |
| | Shochu | Mass % | | | | | | | |
| | Water | Mass % | | | | | | | |
| | total | Mass % | | 1000 | 1000 | 1000 | 1000 | 1000 | |
| Physical property | | Liquid | Rather low consistent liquid | Rather low consistent liquid | Rather low consistent liquid | Consistent liquid | Consistent liquid | | |
| Liquid part separation when left out at room temperature for 1 hour | | — | Slight liquid part separation caused but tolerable | Liquid part separation is less noted and preferable | Liquid part separation is less noted and preferable | Liquid part separation is less noted and preferable | Liquid part separation is less noted and preferable | | |
| Anti-drippingness at room temperature | | Easy to drip | Viscous and rather hard to drip | Viscous and rather hard to drip | Viscous and rather hard to drip | Viscous and rather hard to drip | Hard to drip | | |

| | | | | Test Example 25 | Test Example 26 | Test Example 27 | Test Example 28 |
|---|---|---|---|---|---|---|---|
| Present composition | Test Example 2 | Corn paste | Mass % | | | 500 | 500 |
| | Test Example 6 | Edamame paste | Mass % | | | | |
| | Test Example 7 | Bell pepper paste | Mass % | | | | |
| | Test Example 9 | Beet paste | Mass % | | | | |
| | Test Example 10 | Pumpkin paste | Mass % | 700 | | | |
| | Test Example 11 | Green pea paste | Mass % | | 900 | | |
| Liquid composition | | Nam Pla | Mass % | 300 | 100 | | |
| | | Double-rich fish stock (oigatsuo tsuyu) | Mass % | | | | |
| | | Soymilk | Mass % | | | 500 | |
| | | Shochu | Mass % | | | | 100 |
| | | Water | Mass % | | | | 100 |
| | | total | Mass % | 1000 | 1000 | 1000 | 600 |
| Physical property | | | | Rather hard consistent liquid | Hard consistent liquid | Consistent liquid | Marble pattern appearance when first mixed. Consistent liquid when mixed thoroughly |
| Liquid part separation when left out at room temperature for 1 hour | | | | Liquid part separation is less noted and preferable | Liquid part separation is less noted and preferable | Liquid part separation is less noted and preferable | Liquid part separation is less noted and preferable |
| Anti-drippingness at room temperature | | | | Hard to drip | Hard to drip | Hard to drip | Hard to drip |

[Effect of the Composition of One or More Embodiments of the Present Invention on Emulsified Liquid Compositions]

As described in Table 10, the composition of one or more embodiments of the present invention and an emulsified liquid composition were mixed using a commercial electric hand mixer to evaluate changes in physical properties, precipitation occurrence immediately after stirring and precipitation occurrence after being left out at room temperature for 1 hour. As a result, when the composition of one or more embodiments of the present invention are mixed with an emulsified liquid composition, emulsified liquid compositions with a stabilized emulsified system and free of precipitation occurrence can be obtained as shown in Table 10.

TABLE 10

| | | | | Comparative Example 8 | Test Example 29 | Test Example 30 | Test Example 31 | Test Example 32 |
|---|---|---|---|---|---|---|---|---|
| Present composition | Test Example 2 | Corn paste | Mass % | | | 50 | | |
| | Test Example 6 | Edamame paste | Mass % | | | | 100 | |
| | Test Example 7 | Bell pepper paste | Mass % | | | | | 300 |
| | Test Example 9 | Beet paste | Mass % | | | | | |
| | Test Example 10 | Pumpkin paste | Mass % | | | | | |
| | Test Example 11 | Green pea paste | Mass % | | 10 | | | |
| Emulsified liquid | | Soymilk | Mass % | 550 | 545 | 530 | 500 | 400 |
| | | Cow's milk | Mass % | | | | | |

TABLE 10-continued

| composition | | | | | | | | |
|---|---|---|---|---|---|---|---|---|
| Vinegar | | Grain vinegar | Mass % | 450 | 445 | 420 | 400 | 300 |
| | | total | Mass % | 1000 | 1000 | 1000 | 1000 | 1000 |
| Physical property | | | | Liquid | Rather low consistent liquid | Rather low consistent liquid | Consistent liquid | Consistent liquid |
| Precipitation occurrence immediately after stirring | | | | Denatured soymilk precipitated and separated from liquid part | Slight precipitation occurred but tolerable | Precipitation is less noted and preferable | Precipitation is less noted and preferable | Precipitation is less noted and preferable |
| Precipitation occurrence after left out at room temperature for 1 hour | | | | Precipitation is noted and not preferable | Slight precipitation occurred but tolerable | Slight precipitation occurred but tolerable | Slight precipitation occurred but tolerable | Slight precipitation occurred but tolerable |

| | | | | Test Example 33 | Test Example 34 | Test Example 35 | Test Example 36 | Test Example 37 |
|---|---|---|---|---|---|---|---|---|
| Present composition | Test Example 2 | Corn paste | Mass % | | | | | 350 |
| | Test Example 6 | Edamame paste | Mass % | | | | 500 | |
| | Test Example 7 | Bell pepper paste | Mass % | | | | | |
| | Test Example 9 | Beet paste | Mass % | 500 | | | | |
| | Test Example 10 | Pumpkin paste | Mass % | | 700 | | | |
| | Test Example 11 | Green pea paste | Mass % | | | 900 | | |
| Emulsified liquid composition | | Soymilk | Mass % | 300 | 200 | 75 | | 350 |
| | | Cow's milk | Mass % | | | | 300 | |
| Vinegar | | Grain vinegar | Mass % | 200 | 100 | 25 | 200 | 300 |
| | | total | Mass % | 1000 | 1000 | 1000 | 1000 | 1000 |
| Physical property | | | | Consistent liquid | Rather hard consistent liquid | Hard consistent liquid | Consistent liquid | Consistent liquid |
| Precipitation occurrence immediately after stirring | | | | Precipitation is less noted and preferable | Precipitation is less noted and preferable | Precipitation is less noted and preferable | Precipitation is less noted and preferable | Precipitation is less noted and preferable |
| Precipitation occurrence after left out at room temperature for 1 hour | | | | Precipitation is less noted and preferable | Precipitation is less noted and preferable | Precipitation is less noted and preferable | Precipitation is less noted and preferable | Precipitation is less noted and preferable |

[Effect of the Composition of One or More Embodiments of the Present Invention on Liquid Fats/Oils and Water]

As described in Table 11, the composition of one or more embodiments of the present invention and a liquid fat/oil were mixed using a commercial electric hand mixer to evaluate changes in physical properties, separation property of an oil layer and an aqueous layer immediately after stirring (emulsifiability) and separation property of an oil layer and aqueous layer after being left out at room temperature for 1 hour (emulsion stability). As a result, viscous compositions with good emulsion stability can be obtained as shown in Table 11.

TABLE 11

| | | | | Comparative Example 9 | Test Example 38 | Test Example 39 | Test Example 40 | Test Example 41 |
|---|---|---|---|---|---|---|---|---|
| Present composition | Test Example 2 | Corn paste | Mass % | | | 50 | | |
| | Test Example 6 | Edamame paste | Mass % | | | | 100 | |
| | Test Example 7 | Bell pepper paste | Mass % | | | | | 300 |
| | Test Example 9 | Beet paste | Mass % | | | | | |
| | Test Example 10 | Pumpkin paste | Mass % | | | | | |
| | Test Example 11 | Green pea paste | Mass % | | 10 | | | |
| Liquid composition | | Olive oil | Mass % | 550 | | | | |

TABLE 11-continued

| | | | | | | | | |
|---|---|---|---|---|---|---|---|---|
| Water | | Grain vinegar | Mass % | 450 | 500 | 500 | 500 | 500 |
| | | Water | Mass % | | 490 | 450 | 400 | 200 |
| | | total | Mass % | 1000 | 1000 | 1000 | 1000 | 1000 |
| | Physical property | | | Liquid | Rather low consistent liquid | Rather low consistent liquid | Consistent liquid | Consistent liquid |
| | Separation of oil layer and aqueous layer immediately after stirred | | | Separation of oil layer and aqueous layer | Slight separation of oil layer and aqueous layer occurred but tolerable | Separation of oil layer and aqueous layer is less noted and preferable | Separation of oil layer and aqueous layer is less noted and preferable | Separation of oil layer and aqueous layer is less noted and preferable |
| | Separation of oil layer and aqueous layer when left out at room temperature for 1 hour | | | Separation of oil layer and aqueous layer | Slight separation of oil layer and aqueous layer occurred but tolerable | Slight separation of oil layer and aqueous layer occurred but tolerable | Slight separation of oil layer and aqueous layer occurred but tolerable | Slight separation of oil layer and aqueous layer occurred but tolerable |

| | | | | Test Example 42 | Test Example 43 | Test Example 44 | Test Example 45 | Test Example 46 |
|---|---|---|---|---|---|---|---|---|
| Present composition | Test Example 2 | Corn paste | Mass % | | | | | 450 |
| | Test Example 6 | Edamame paste | Mass % | | | | 500 | |
| | Test Example 7 | Bell pepper paste | Mass % | | | | | |
| | Test Example 9 | Beet paste | Mass % | 500 | | | | |
| | Test Example 10 | Pumpkin paste | Mass % | | 700 | | | |
| | Test Example 11 | Green pea paste | Mass % | | | 900 | | |
| Liquid composition | | Olive oil | Mass % | | | | 300 | 450 |
| Water | | Grain vinegar | Mass % | 500 | 300 | 100 | | 100 |
| | | Water | Mass % | | | | 200 | |
| | | total | Mass % | 1000 | 1000 | 1000 | 1000 | 1000 |
| | Physical property | | | Consistent liquid | Rather hard consistent liquid | Hard consistent liquid | Consistent liquid | Consistent liquid |
| | Separation of oil layer and aqueous layer immediately after stirred | | | Separation of oil layer and aqueous layer is less noted and preferable | Separation of oil layer and aqueous layer is less noted and preferable | Separation of oil layer and aqueous layer is less noted and preferable | Separation of oil layer and aqueous layer is less noted and preferable | Separation of oil layer and aqueous layer is less noted and preferable |
| | Separation of oil layer and aqueous layer when left out at room temperature for 1 hour | | | Separation of oil layer and aqueous layer is less noted and preferable | Separation of oil layer and aqueous layer is less noted and preferable | Separation of oil layer and aqueous layer is less noted and preferable | Separation of oil layer and aqueous layer is less noted and preferable | Separation of oil layer and aqueous layer is less noted and preferable |

[Effect of the Composition of One or More Embodiments of the Present Invention on Solid Food Materials]

As described in Table 12, evaluations were made on changes in physical property and appearance after being treated when a solid food material and the composition of one or more embodiments of the present invention were mixed, or a mixture of a solid food material and the composition of one or more embodiments of the present invention was cooked. As a result, compositions in which the composition of one or more embodiments of the present invention and a solid food material are homogeneously mixed are obtained and unevenness food products when cooked can be obtained as shown in Table 12.

TABLE 12

|  |  |  |  | Comparative Example 10 | Test Example 47 | Test Example 48 | Test Example 49 |
|---|---|---|---|---|---|---|---|
| Present composition | Test Example 2 | Corn paste | Mass % |  |  | 50 |  |
|  | Test Example 6 | Edamame paste | Mass % |  |  |  | 100 |
|  | Test Example 7 | Bell pepper paste | Mass % |  |  |  |  |
|  | Test Example 9 | Beet paste | Mass % |  |  |  |  |
|  | Test Example 10 | Pumpkin paste | Mass % |  |  |  |  |
|  | Test Example 11 | Green pea paste | Mass % |  | 10 |  |  |
|  |  | Corn powder | Mass % | 300 |  |  |  |
| Solid food material |  | Pasta | Mass % | 700 |  |  |  |
|  |  | Tofu | Mass % |  |  |  |  |
|  |  | Potato salad | Mass % |  | 990 | 950 | 900 |
|  |  | Potato | Mass % |  |  |  |  |
|  |  | Rice | Mass % |  |  |  |  |
|  |  | total | Mass % | 1000 | 1000 | 1000 | 1000 |
|  | Cooking method |  |  | Solid food material and powder are mixed | Solid food material and composition are mixed | Solid food material and composition are mixed | Solid food material and composition are mixed |
| Easiness to toss |  |  |  | Difficult to toss due to lumps | Easy to toss with no lumps | Easy to toss with no lumps | Easy to toss with no lumps |
| Composition appearance after being mixed |  |  |  | Not preferable appearance due to lumps | Rather lumpy appearance but tolerable | Preferable appearance with no lumps | Preferable appearance with no lumps |

|  |  |  |  | Test Example 50 | Test Example 51 | Test Example 52 | Test Example 53 |
|---|---|---|---|---|---|---|---|
| Present composition | Test Example 2 | Corn paste |  |  |  |  |  |
|  | Test Example 6 | Edamame paste |  |  |  |  |  |
|  | Test Example 7 | Bell pepper paste |  | 300 |  |  |  |
|  | Test Example 9 | Beet paste |  |  | 500 |  |  |
|  | Test Example 10 | Pumpkin paste |  |  |  | 700 |  |
|  | Test Example 11 | Green pea paste |  |  |  |  | 900 |
|  |  | Corn powder |  |  |  |  |  |
| Solid food material |  | Pasta |  |  |  |  |  |
|  |  | Tofu |  |  |  |  |  |
|  |  | Potato salad |  | 700 | 500 | 300 | 100 |
|  |  | Potato |  |  |  |  |  |
|  |  | Rice |  |  |  |  |  |
|  |  | total |  | 1000 | 1000 | 1000 | 1000 |
|  | Cooking method |  |  | Solid food material and composition are mixed | Solid food material and composition are mixed | Solid food material and composition are mixed | Solid food material and composition are mixed |
| Easiness to toss |  |  |  | Easy to toss with no lumps | Easy to toss with no lumps | Easy to toss with no lumps | Easy to toss with no lumps |
| Composition appearance after being mixed |  |  |  | Preferable appearance with no lumps | Preferable appearance with no lumps | Rather lumpy appearance but tolerable | Rather lumpy appearance but tolerable |

TABLE 12-continued

|  |  |  | Test Example 54 | Test Example 55 | Test Example 56 | Test Example 57 |
|---|---|---|---|---|---|---|
| Present composition | Test Example 2 | Corn paste |  | 450 |  |  |
|  | Test Example 6 | Edamame paste | 500 |  |  |  |
|  | Test Example 7 | Bell pepper paste |  |  |  |  |
|  | Test Example 9 | Beet paste |  |  |  | 100 |
|  | Test Example 10 | Pumpkin paste |  |  | 200 |  |
|  | Test Example 11 | Green pea paste |  |  |  |  |
|  |  | Corn powder |  |  |  |  |
| Solid food material |  | Pasta | 500 |  |  |  |
|  |  | Tofu |  | 550 |  |  |
|  |  | Potato salad |  |  |  |  |
|  |  | Potato |  |  |  | 900 |
|  |  | Rice |  |  | 800 |  |
|  | total |  | 1000 | 1000 | 1000 | 1000 |
|  | Cooking method |  | Solid food material and composition are mixed | Solid food material and composition are mixed | Composition is added to immersed rice in which water and water in 1.4 times the amount of rice are mixed, and the rice is cooked | Composition is added to water in the same amount of that of potato and simmered until excess water evaporates |
| Easiness to toss |  |  | Easy to toss with no lumps | Easy to toss with no lumps | Easy to toss with no lumps | Easy to toss with no lumps |
| Composition appearance after being mixed |  |  | Preferable appearance with no lumps | Preferable appearance with no lumps | Preferable appearance with no lumps | Preferable appearance with no lumps |

[Heat Cooking Food Materials Using the Composition of One or More Embodiments of the Present Invention]

As described in Table 13, a food material was heat cooked using the composition of one or more embodiments of the present invention as a cooking oil for a food product to evaluate appearance of the heated dish (color tone changes) and the presence/absence of burning. As a result, when the composition of one or more embodiments of the present invention is used as a cooking oil, heated dishes heat with good appearance having a good color tone and free of burning and the like can be obtained as shown in Table 13.

TABLE 13

|  |  |  |  | Comparative Example 11 | Test Example 58 | Test Example 59 | Test Example 60 | Test Example 61 | Test Example 62 |
|---|---|---|---|---|---|---|---|---|---|
| Batter composition for tempura | Test Example 2 | Corn paste | Mass % |  |  | 50 |  |  |  |
|  | Test Example 6 | Edamame paste | Mass % |  |  |  |  | 100 |  |
|  | Test Example 7 | Bell pepper paste | Mass % |  |  |  |  |  | 300 |
|  | Test Example 9 | Beet paste | Mass % |  |  |  |  |  | 500 |
|  | Test Example 10 | Pumpkin paste | Mass % |  |  |  |  |  |  |
|  | Test Example 11 | Green pea paste | Mass % |  |  | 10 |  |  |  |
|  |  | Corn powder | Mass % | 300 |  |  |  |  |  |
|  |  | Water | Mass % | 400 | 550 | 520 | 500 | 400 | 300 |
|  |  | Wheat flour | Mass % | 300 | 440 | 430 | 400 | 300 | 200 |
|  | total |  | Mass % | 1000 | 1000 | 1000 | 1000 | 1000 | 1000 |

TABLE 13-continued

| Cooking method | Avocado ¼ is dipped in tempura batter and cooked in oil at 180° C. | | | | | |
|---|---|---|---|---|---|---|
| Color tone after heat cooked | Color of batter faded when cooked and appearance is not preferable | Color of batter is rather faded when cooked but tolerable | Color of batter is not faded when cooked and appearance is preferable | Color of batter is not faded when cooked and appearance is preferable | Color of batter is not faded when cooked and appearance is preferable | Color of batter is not faded when cooked and appearance is preferable |
| Burning after heat cooked | Burning is rather noted and appearance is not preferable | Burning is not noted and appearance is preferable | Burning is not noted and appearance is preferable | Burning is not noted and appearance is preferable | Burning is not noted and appearance is preferable | Burning is not noted and appearance is preferable |

| | | | | Test Example 63 | Test Example 64 | Test Example 65 | Test Example 66 | Test Example 67 | Test Example 68 |
|---|---|---|---|---|---|---|---|---|---|
| Batter composition for tempura | Test Example 2 | Corn paste | Mass % | | | | 450 | | |
| | Test Example 6 | Edamame paste | Mass % | | | 500 | | | |
| | Test Example 7 | Bell pepper paste | Mass % | | | | | | |
| | Test Example 9 | Beet paste | Mass % | | | | | | 100 |
| | Test Example 10 | Pumpkin paste | Mass % | 700 | | | | 200 | |
| | Test Example 11 | Green pea paste | Mass % | | 900 | | | | |
| | | Corn powder | Mass % | | | | | | |
| | | Water | Mass % | 200 | 60 | 300 | 330 | 450 | 500 |
| | | Wheat flour | Mass % | 100 | 40 | 200 | 220 | 350 | 400 |
| | | total | Mass % | 1000 | 1000 | 1000 | 1000 | 1000 | 1000 |
| Cooking method | | | | Avocado ¼ is dipped in tempura batter and cooked in oil at 180° C. | | | | | |
| Color tone after heat cooked | | | | Color of batter is not faded when cooked and appearance is preferable | Color of batter is not faded when cooked and appearance is preferable | Color of batter is not faded when cooked and appearance is preferable | Color of batter is not faded when cooked and appearance is preferable | Color of batter is not faded when cooked and appearance is preferable | Color of batter is not faded when cooked and appearance is preferable |
| Burning after heat cooked | | | | Burning is not noted and appearance is preferable | Burning is not noted and appearance is preferable | Burning is not noted and appearance is preferable | Burning is not noted and appearance is preferable | Burning is not noted and appearance is preferable | Burning is not noted and appearance is preferable |

[Effect of the Composition of One or More Embodiments of the Present Invention on Expandable Food Products Having Easily Changeable Texture by Water Absorption]

As described in Table 14, expandable food products having easily changeable texture by water absorption (white bread) was treated (applied) with the composition of one or more embodiments of the present invention and allowed to contact with sliced tomatoes to evaluate whether the texture of the food product (white bread) will change by water absorption. As a result, when the bread is in contact with the water of the sliced tomatoes, neither expansion nor softening occurred thereby revealing that water resistance is enhanced as shown in Table 14.

TABLE 14

| | | | | Comparative Example 12 | Test Example 69 | Test Example 70 | Test Example 71 | Test Example 72 | Test Example 73 |
|---|---|---|---|---|---|---|---|---|---|
| Composition | Test Example 2 | Corn paste | Mass % | | | 50 | | | |
| | Test Example 6 | Edamame paste | Mass % | | | | 100 | | |
| | Test Example 7 | Bell pepper paste | Mass % | | | | | 300 | |
| | Test Example 9 | Beet paste | Mass % | | | | | | 500 |
| | Test Example 10 | Pumpkin paste | Mass % | | | | | | |
| | Test | Green pea | Mass % | | 10 | | | | |

TABLE 14-continued

| | | | | | | | | |
|---|---|---|---|---|---|---|---|---|
| Example 11 | paste | | | | | | | |
| | Olive oil | Mass % | | 990 | 950 | 900 | 700 | 500 |
| | total | Mass % | | 1000 | 1000 | 1000 | 1000 | 1000 |
| Cooking method | | | Sandwich is produced by placing sliced tomatoes between breads onto which nothing is applied | Sandwich is produced by applying a sample of examples onto breads and placing sliced tomatoes therebetween | | | | |
| Texture of expandable food product after stored for 1 hour | | | Softened by absorbing water | Slightly softened by absorbing water but tolerable | Softening is not noted and preferable | Softening is not noted and preferable | Softening is not noted and preferable | Softening is not noted and preferable |

| | | | | Test Example 74 | Test Example 75 | Test Example 76 | Test Example 77 | Test Example 78 | Test Example 79 |
|---|---|---|---|---|---|---|---|---|---|
| Composition | Test Example 2 | Corn paste | Mass % | | | | 450 | | |
| | Test Example 6 | Edamame paste | Mass % | | | 500 | | | |
| | Test Example 7 | Bell pepper paste | Mass % | | | | | | |
| | Test Example 9 | Beet paste | Mass % | | | | | | 100 |
| | Test Example 10 | Pumpkin paste | Mass % | 700 | | | | 200 | |
| | Test Example 11 | Green pea paste | Mass % | | 900 | | | | |
| | | Olive oil | Mass % | 300 | 100 | 500 | 550 | 800 | 900 |
| | | total | Mass % | 1000 | 1000 | 1000 | 1000 | 1000 | 1000 |
| Cooking method | | | | Sandwich is produced by applying a sample of examples onto breads and placing sliced tomatoes therebetween | | | | | |
| Texture of expandable food product after stored for 1 hour | | | | Softening is not noted and preferable | Softening is not noted and preferable | Softening is not noted and preferable | Softening is not noted and preferable | Softening is not noted and preferable | Softening is not noted and preferable |

[Effect of the Composition of One or More Embodiments of the Present Invention on Food Materials from which Water is Easily Lost]

A food material (beef) from which water is easily lost was treated with the composition of one or more embodiments of the present invention before or after cooked to evaluate the degree of water loss from the food material. As a result, it is revealed that the water loss from the food material from which water is easily lost can be controlled when treated with the composition of one or more embodiments of the present invention as shown in Table 15.

TABLE 15

| | | | | Comparative Example 13 | Test Example 80 | Test Example 81 | Test Example 82 | Test Example 83 | Test Example 84 |
|---|---|---|---|---|---|---|---|---|---|
| Composition | Test Example 2 | Corn paste | Mass % | | | 50 | | | |
| | Test Example 6 | Edamame paste | Mass % | | | | 100 | | |
| | Test Example 7 | Bell pepper paste | Mass % | | | | | 300 | |
| | Test Example 9 | Beet paste | Mass % | | | | | | 500 |
| | Test Example 10 | Pumpkin paste | Mass % | | | | | | |
| | Test Example 11 | Green pea paste | Mass % | | 10 | | | | |
| | | Olive oil | Mass % | | 990 | 950 | 900 | 700 | 500 |
| | | total | Mass % | | 1000 | 1000 | 1000 | 1000 | 1000 |
| Cooking method | | | | Raw meat onto which nothing is applied is | Raw meat onto which a composition of examples is applied is cooked by grilling | | | | |

TABLE 15-continued

| | | | | Test Example 85 | Test Example 86 | Test Example 87 | Test Example 88 | Test Example 89 | Test Example 90 |
|---|---|---|---|---|---|---|---|---|---|
| Condition of component loss | | | | cooked by grilling Component loss is noted and not preferable | Component loss is rather noted but tolerable | Component loss is controlled and intense beef taste is perceived | Component loss is controlled and intense beef taste is perceived | Component loss is controlled and intense beef taste is perceived | Component loss is controlled and intense beef taste is perceived |
| Composition | Test Example 2 | Corn paste | Mass % | | | | 450 | | |
| | Test Example 6 | Edamame paste | Mass % | | | 500 | | | |
| | Test Example 7 | Bell pepper paste | Mass % | | | | | | |
| | Test Example 9 | Beet paste | Mass % | | | | | | 100 |
| | Test Example 10 | Pumpkin paste | Mass % | 700 | | | | 200 | |
| | Test Example 11 | Green pea paste | Mass % | | 900 | | | | |
| | | Olive oil | Mass % | 300 | 100 | 500 | 550 | 800 | 900 |
| | | total | Mass % | 1000 | 1000 | 1000 | 1000 | 1000 | 1000 |
| Cooking method | | | | A sample of examples is applied onto grilled beef | | | | | |
| Condition of component loss | | | | Component loss is controlled and intense beef taste is perceived | Component loss is controlled and intense beef taste is perceived | Component loss is controlled and intense beef taste is perceived | Component loss is controlled and intense beef taste is perceived | Component loss is controlled and intense beef taste is perceived | Component loss is controlled and intense beef taste is perceived |

Further, the analysis and evaluation results of the composition samples of Test Examples 91 to 107 are shown in the following Table 16 and Table 17. As a result, it is revealed that when the total content of the food materials containing insoluble dietary fibers to the total insoluble component content in the composition was reduced step by step, the effect of one or more embodiments of the present invention was recognized. It is also revealed that when all the olive oil of Test Example 2 was replaced step by step with a palm oil, which is a solid fat/oil, the effect of one or more embodiments of the present invention was recognized. It is further revealed that when the composition after microrefinement treatment was conched (treated for 10 hours at room temperature using Wonder Table Top Wet Grinder manufactured by Premier), eatability was improved.

Similarly, the same results were recognized even in the composition in which all the palm oil of Test Examples 100 to 105 was replaced with a coconut butter, which is a solid fat/oil.

TABLE 16

| | | | Preparation Example | | | | | |
|---|---|---|---|---|---|---|---|---|
| | | | Test Example 91 | Test Example 92 | Test Example 93 | Test Example 94 | Test Example 95 | Test Example 96 |
| Formulation | [Edible part] dried carrot | Parts by mass | | | | | | |
| | [Edible part] dried pumpkin | Parts by mass | | | | | | |
| | [Edible part] dried sweet corn | Parts by mass | | 50 | | 100 | | 150 |
| | [Edible part] dried edamame | Parts by mass | 25 | | 50 | | 100 | |
| | [Edible part] dried bell pepper | Parts by mass | | | | | | |
| | [Edible part] dried beetroot | Parts by mass | | 48 | | 50 | | 100 |
| | [Edible part] dried green pea | Parts by mass | | | | | | |
| | [Edible part] dried broccoli | Parts by mass | | | | | | |
| | [Edible part] dried tomato | Parts by mass | | | | | | |
| | [Edible part] dried sesame | Parts by mass | | | | | | |

TABLE 16-continued

|  |  |  | Preparation Example | | | | | |
|---|---|---|---|---|---|---|---|---|
|  |  |  | Test Example 91 | Test Example 92 | Test Example 93 | Test Example 94 | Test Example 95 | Test Example 96 |
|  | [Inedible part] dried sweet corn (core) | Parts by mass |  | 2 |  |  |  | 50 |
|  | [Inedible part] dried bell pepper (seed, gut) | Parts by mass | 25 |  | 50 |  | 100 |  |
|  | [Inedible part] dried pumpkin (seed, gut) | Parts by mass |  |  |  |  |  |  |
|  | [Inedible part] dried beetroot (skin) | Parts by mass |  |  |  | 50 |  |  |
|  | [Inedible part] dried broccoli (stalk, leave) | Parts by mass |  |  |  |  | 50 |  |
|  | [Inedible part] dried edamame (pod) | Parts by mass |  |  | 50 |  |  |  |
|  | [Inedible part] dried green pea (pod) | Parts by mass |  |  |  |  |  |  |
|  | [Inedible part] dried tomato (stem) | Parts by mass |  |  |  |  |  |  |
|  | [Inedible part] dried carrot (skin, stem) | Parts by mass |  |  |  |  |  |  |
|  | Salt | Parts by mass | 450 | 400 | 350 | 300 | 250 | 200 |
|  | Palm oil | Parts by mass |  |  |  |  |  |  |
|  | Olive oil | Parts by mass | 500 | 500 | 500 | 500 | 500 | 500 |
|  | Rapeseed oil | Parts by mass |  |  |  |  |  |  |
|  | Water | Parts by mass |  |  |  |  |  |  |
|  | Total | Parts by mass | 1000 | 1000 | 1000 | 1000 | 1000 | 1000 |
| Measured value | Bostwick viscosity measured value (20° C. · 10 sec) of fat/oil parts in composition | cm | More than 28 cm | More than 28 cm | More than 28 cm | More than 28 cm | More than 28 cm | More than 28 cm |
|  | Total content of food materials containing insoluble dietary fibers to total insoluble component content in composition | % | 10 | 20 | 30 | 40 | 50 | 60 |
|  | Inedible part/(edible part + inedible part) |  | 50% | 2% | 67% | 25% | 60% | 17% |
| Microrefinement treatment conditions | Pretreatment |  | Rotation crusher (Wonder crusher) | Rotation crusher (Wonder crusher) | Rotation crusher (Wonder crusher) | Rotation crusher (Wonder crusher) | Rotation crusher (Wonder crusher) | Rotation crusher (Wonder crusher) |
|  | Microrefinement treatment method |  | Stirred media mill | Stirred media mill | Stirred media mill | Stirred media mill | Stirred media mill | Stirred media mill |
|  | Treatment time | min | 20 | 20 | 20 | 20 | 20 | 20 |
|  | Bead size |  | Bead mill φ1 mm bead | Bead mill φ1 mm bead | Bead mill φ1 mm bead | Bead mill φ1 mm bead | Bead mill φ1 mm bead | Bead mill φ1 mm bead |
|  | Treatment temperature (immediately after starting) (T1) | ° C. | 20 | 20 | 20 | 20 | 20 | 20 |
|  | Treatment temperature (at time of completing treatment) (T2) | ° C. | 30 | 33 | 35 | 32 | 33 | 30 |
|  | Pressure applying condition at microrefining (Max pressure) | MPa | 0.10 | 0.21 | 0.14 | 0.19 | 0.10 | 0.20 |

TABLE 17

|  |  |  | Preparation Example | | | | | |
|---|---|---|---|---|---|---|---|---|
|  |  |  | Test Example 97 | Test Example 98 | Test Example 99 | Test Example 100 | Test Example 101 | Test Example 102 |
| Formulation | [Edible part] dried carrot | Parts by mass |  |  |  |  |  |  |
|  | [Edible part] dried pumpkin | Parts by mass |  |  |  |  |  |  |
|  | [Edible part] dried sweet corn | Parts by mass |  |  | 200 |  | 250 | 250 |

TABLE 17-continued

| | | | Preparation Example | | | | | |
|---|---|---|---|---|---|---|---|---|
| | | | Test Example 97 | Test Example 98 | Test Example 99 | Test Example 100 | Test Example 101 | Test Example 102 |
| | [Edible part] dried edamame | Parts by mass | 100 | | 125 | | | |
| | [Edible part] dried bell pepper | Parts by mass | | | | | | |
| | [Edible part] dried beetroot | Parts by mass | | 50 | | | 400 | |
| | [Edible part] dried green pea | Parts by mass | | | | | | |
| | [Edible part] dried broccoli | Parts by mass | | | | | | |
| | [Edible part] dried tomato | Parts by mass | | | | | | |
| | [Edible part] dried sesame | Parts by mass | | | | | | |
| | [Inedible part] dried sweet corn (core) | Parts by mass | | | | 250 | | 250 |
| | [Inedible part] dried bell pepper (seed, gut) | Parts by mass | | | | | | |
| | [Inedible part] dried pumpkin (seed, gut) | Parts by mass | | | | | | |
| | [Inedible part] dried beetroot (skin) | Parts by mass | | | | | 100 | |
| | [Inedible part] dried broccoli (stalk, leave) | Parts by mass | | | | | | |
| | [Inedible part] dried edamame (pod) | Parts by mass | 100 | 50 | 325 | | | |
| | [Inedible part] dried green pea (pod) | Parts by mass | 150 | | | | | |
| | [Inedible part] dried tomato (stem) | Parts by mass | | | | | | |
| | [Inedible part] dried carrot (skin, stem) | Parts by mass | | | | | | |
| | Salt | Parts by mass | 150 | 100 | 50 | | | |
| | Palm oil | Parts by mass | | | | 100 | 200 | 300 |
| | Olive oil | Parts by mass | 500 | 500 | 500 | 400 | 300 | 200 |
| | Rapeseed oil | Parts by mass | | | | | | |
| | Water | Parts by mass | | | | | | |
| | Total | Parts by mass | 1000 | 900 | 1000 | 1000 | 1000 | 1000 |
| Measured value | Bostwick viscosity measured value (20° C. · 10 sec) of fat/oil parts in composition | cm | More than 28 cm | More than 28 cm | More than 28 cm | 13.0 cm | 10.0 cm | 1.0 cm |
| | Total content of food materials containing insoluble dietary fibers to total insoluble component content in composition | % | 70 | 75 | 90 | 83 | 71 | 63 |
| | Inedible part/(edible part + inedible part) | | 71% | 17% | 72% | 50% | 20% | 50% |
| Micro-refinement treatment conditions | Pretreatment | | Rotation crusher (Wonder crusher) | Rotation crusher (Wonder crusher) | Rotation crusher (Wonder crusher) | Rotation crusher (Wonder crusher) | Rotation crusher (Wonder crusher) | Rotation crusher (Wonder crusher) |
| | Microrefinement treatment method | | Stirred media mill | Stirred media mill | Stirred media mill | Stirred media mill | Stirred media mill | Stirred media mill |
| | Treatment time | min | 20 | 20 | 20 | 60 | 60 | 60 |
| | Bead size | | Bead mill φ1 mm bead | Bead mill φ1 mm bead | Bead mill φ1 mm bead | Bead mill φ1 mm bead | Bead mill φ1 mm bead | Bead mill φ1 mm bead |
| | Treatment temperature (immediately after starting) (T1) | ° C. | 20 | 20 | 20 | 30 | 30 | 30 |
| | Treatment temperature (at time of completing treatment) (T2) | ° C. | 34 | 35 | 35 | 35 | 35 | 35 |
| | Pressure applying condition at microrefining (Max pressure) | MPa | 0.22 | 0.15 | 0.26 | 0.15 | 0.13 | 0.14 |

TABLE 18

| | | | Preparation Example | | | | |
|---|---|---|---|---|---|---|---|
| | | | Test Example 103 | Test Example 104 | Test Example 105 | Test Example 106 | Test Example 107 |
| Formulation | [Edible part] dried carrot | Parts by mass | | | | | |
| | [Edible part] dried pumpkin | Parts by mass | | | | | |
| | [Edible part] dried sweet corn | Parts by mass | | 250 | 250 | 400 | 400 |
| | [Edible part] dried edamame | Parts by mass | | | | | |
| | [Edible part] dried bell pepper | Parts by mass | | | | | |
| | [Edible part] dried beetroot | Parts by mass | 400 | | | | |
| | [Edible part] dried green pea | Parts by mass | | | | | |
| | [Edible part] dried broccoli | Parts by mass | | | | | |
| | [Edible part] dried tomato | Parts by mass | | | | | |
| | [Edible part] dried sesame | Parts by mass | | | | | |
| | [Inedible part] dried sweet corn (core) | Parts by mass | | 250 | 250 | 500 | 500 |
| | [Inedible part] dried bell pepper (seed, gut) | Parts by mass | | | | | |
| | [Inedible part] dried pumpkin (seed, gut) | Parts by mass | | | | | |
| | [Inedible part] dried beetroot (skin) | Parts by mass | 100 | | | | |
| | [Inedible part] dried broccoli (stalk, leave) | Parts by mass | | | | | |
| | [Inedible part] dried edamame (pod) | Parts by mass | | | | | |
| | [Inedible part] dried green pea (pod) | Parts by mass | | | | | |
| | [Inedible part] dried tomato (stem) | Parts by mass | | | | | |
| | [Inedible part] dried carrot (skin, stem) | Parts by mass | | | | | |
| | Salt | Parts by mass | | | | | |
| | Palm oil | Parts by mass | 400 | 500 | 500 | | |
| | Olive oil | Parts by mass | 100 | | | 100 | 100 |
| | Rapeseed oil | Parts by mass | | | | | |
| | Water | Parts by mass | | | | | |
| | Total | Parts by mass | 1000 | 1000 | 1000 | 1000 | 1000 |
| Measured value | Bostwick viscosity measured value (20° C. · 10 sec) of fat/oil parts in composition | cm | 0 cm | 0 cm | 0 cm | 0.1 cm | 0.1 cm |
| | Total content of food materials containing insoluble dietary fibers to total insoluble component content in composition | % | 56 | 50 | 50 | 100 | 100 |
| | Inedible part/(edible part + inedible part) | | 20% | 50% | 50% | 71% | 71% |
| Microrefinement treatment conditions | Pretreatment | | Rotation crusher (Wonder crusher) | Rotation crusher (Wonder crusher) | Rotation crusher (Wonder crusher) | Rotation crusher (Wonder crusher) | Rotation crusher (Wonder crusher) |
| | Microrefinement treatment method | | Stirred media mill | Stirred media mill | Stirred media mill | Stirred media mill | Stirred media mill |
| | Treatment time | min | 60 | 60 | 60 | 10 | 10 |
| | Bead size | | Bead mill φ1 mm bead | Bead mill φ1 mm bead | Bead mill φ1 mm bead | Bead mill φ1 mm bead | Bead mill φ1 mm bead |
| | Treatment temperature (immediately after starting) | (T1) ° C. | 30 | 30 | 30 | 22 | 22 |

TABLE 18-continued

| | | | | Preparation Example | | | | |
|---|---|---|---|---|---|---|---|---|
| | | | | Test Example 103 | Test Example 104 | Test Example 105 | Test Example 106 | Test Example 107 |
| Treatment temperature (at time of completing treatment) | (T2) | °C. | | 35 | 35 | 35 | 34 | 34 |
| Pressure applying condition at microrefining (Max pressure) | | MPa | | 0.3 | 0.23 | 0.23 | 0.20 | 0.20 |

TABLE 19

| | | | | Preparation Example | | | | | |
|---|---|---|---|---|---|---|---|---|---|
| | | | | Test Example 91 | Test Example 92 | Test Example 93 | Test Example 94 | Test Example 95 | Test Example 96 |
| Measured value | Insoluble dietary fiber content | | Mass % | 0.8% | 1.2% | 2.2% | 2.3% | 3.6% | 3.7% |
| | Fine particle content | | Mass % | 12.0 | 23.2 | 28.8 | 39.2 | 43.5 | 53.3 |
| | Water content proportion | | Mass % | 0.2 | 0.4 | 0.6 | 0.8 | 1.0 | 1.3 |
| | Total fat/oil content | | Mass % | 98.0 | 98.0 | 98.0 | 98.0 | 98.0 | 98.0 |
| | Bostwick viscosity measured value (20° C. · 1 sec) of composition | | cm | More than 28.0 cm | More than 28.0 cm | More than 28.0 cm | More than 28.0 cm | More than 28.0 cm | More than 28.0 cm |
| | Total fat/oil content/(water content proportion + total fat/oil content) | | % | 99.8% | 99.6% | 99.4% | 99.2% | 98.9% | 98.7% |
| Before ultrasonication | Maximum particle size before ultrasonication | | μm | 592.0 | 74.0 | 352.0 | 322.8 | 352.0 | 271.4 |
| | Modal diameter before ultrasonication | | μm | 209.30 | 9.25 | 148.00 | 104.70 | 40.35 | 88.00 |
| | Minimum particle size before ultrasonication | | μm | 6.00 | 1.78 | 3.57 | 11.00 | 2.12 | 22.00 |
| | Specific surface area per unit volume before ultrasonication: | γB | m²/ml | 0.12 | 0.83 | 0.13 | 0.11 | 0.27 | 0.09 |
| After ultrasonication | Maximum particle size after ultrasonication | | μm | 124.5 | 62.2 | 148.0 | 31.1 | 148.0 | 40.4 |
| | Modal diameter after ultrasonication | | μm | 16.96 | 9.25 | 12.00 | 7.13 | 12.00 | 7.78 |
| | Minimum particle size after ultrasonication: | dmin | μm | 3.00 | 1.50 | 1.50 | 1.78 | 1.50 | 1.78 |
| | Specific surface area per unit volume after ultrasonication: | γA | m²/ml | 0.47 | 0.86 | 0.69 | 1.00 | 0.70 | 0.95 |
| | γA/dmin | | | 0.16 | 0.57 | 0.46 | 0.56 | 0.47 | 0.53 |
| | γB/γA | | | 0.26 | 0.97 | 0.19 | 0.11 | 0.38 | 0.09 |
| (Arithmetic mean) Sensory inspection | "Material feel" | | | 4 | 4 | 5 | 5 | 5 | 5 |
| | "Swallowability" | | | 4 | 4 | 5 | 5 | 5 | 5 |
| | "Fibrous feel" | | | 4 | 4 | 5 | 5 | 5 | 5 |
| | "Eating difficulty" | | | 4 | 4 | 5 | 5 | 5 | 5 |

TABLE 20

| | | | Preparation Example | | | | | |
|---|---|---|---|---|---|---|---|---|
| | | | Test Example 97 | Test Example 98 | Test Example 99 | Test Example 100 | Test Example 101 | Test Example 102 |
| Measured value | Insoluble dietary fiber content | Mass % | 4.7% | 3.6% | 6.1% | 6.2% | 7.5% | 6.2% |
| | Fine particle content | Mass % | 58.7 | 52.7 | 78.6 | 86.0 | 82.5 | 84.2 |
| | Water content proportion | Mass % | 1.5 | 1.3 | 1.9 | 2.1 | 2.0 | 2.0 |
| | Total fat/oil content | Mass % | 98.0 | 98.0 | 98.0 | 98.0 | 98.0 | 98.0 |
| | Bostwick viscosity measured value (20° C. · 1 sec) of composition | cm | More than 28.0 cm | More than 28.0 cm | More than 28.0 cm | 5.0 | 2.0 | 1.0 |
| | Total fat/oil content/(water content proportion + total fat/oil content) | % | 98.5% | 98.7% | 98.1% | 97.9% | 98.0% | 98.0% |
| Before ultrasonication | Maximum particle size before ultrasonication | μm | 995.6 | 248.0 | 704.0 | 497.8 | 1086.0 | 837.2 |
| | Modal diameter before ultrasonication | μm | 322.80 | 114.10 | 248.90 | 10.09 | 352.00 | 7.13 |
| | Minimum particle size before ultrasonication | μm | 2.52 | 40.35 | 1.26 | 1.78 | 2.75 | 1.38 |

TABLE 20-continued

|  |  |  |  | Preparation Example | | | | | |
|---|---|---|---|---|---|---|---|---|---|
|  |  |  |  | Test Example 97 | Test Example 98 | Test Example 99 | Test Example 100 | Test Example 101 | Test Example 102 |
|  | Specific surface area per unit volume before ultrasonication | :γB | m²/ml | 0.11 | 0.06 | 0.47 | 0.34 | 0.14 | 0.43 |
| After ultrasonication | Maximum particle size after ultrasonication |  | μm | 837.2 | 52.3 | 88.0 | 322.8 | 645.6 | 456.5 |
|  | Modal diameter after ultrasonication |  | μm | 6.54 | 7.78 | 6.00 | 6.00 | 44.00 | 6.54 |
|  | Minimum particle size after ultrasonication | :dmin | μm | 0.89 | 1.78 | 0.89 | 0.97 | 1.16 | 1.16 |
|  | Specific surface area per unit volume after ultrasonication | :γA | m²/ml | 0.76 | 0.89 | 1.29 | 1.30 | 0.95 | 1.12 |
|  | γA/dmin |  |  | 0.85 | 0.50 | 1.44 | 1.34 | 0.82 | 0.97 |
|  | γB/γA |  |  | 0.15 | 0.07 | 0.37 | 0.26 | 0.15 | 0.38 |
| (Arithmetic mean) Sensory inspection | "Material feel" |  |  | 5 | 5 | 5 | 5 | 5 | 4 |
|  | "Swallowability" |  |  | 5 | 5 | 5 | 5 | 5 | 5 |
|  | "Fibrous feel" |  |  | 5 | 5 | 5 | 5 | 5 | 5 |
|  | "Eating difficulty" |  |  | 5 | 5 | 5 | 5 | 5 | 5 |

TABLE 21

|  |  |  |  | Preparation Example | | | | |
|---|---|---|---|---|---|---|---|---|
|  |  |  |  | Test Example 103 | Test Example 104 | Test Example 105 | Test Example 106 | Test Example 107 |
| Measured value | Insoluble dietary fiber content |  | Mass % | 7.5% | 6.2% | 6.2% | 11.5% | 11.5% |
|  | Fine particle content |  | Mass % | 77.5 | 82.1 | 82.9 | 95.0 | 95.0 |
|  | Water content proportion |  | Mass % | 2.0 | 2.0 | 2.0 | 3.6 | 3.6 |
|  | Total fat/oil content |  | Mass % | 98.0 | 98.0 | 98.0 | 12.5 | 12.5 |
|  | Bostwick viscosity measured value (20° C.-1 sec) of composition |  | cm | 0.0 | 0.0 | 0.0 | 0.1 | 0.1 |
|  | Total fat/oil content/(water content proportion + total fat/oil content) |  | % | 98.0% | 98.0% | 98.0% | 77.5% | 77.5% |
| Before ultrasonication | Maximum particle size before ultrasonication |  | μm | 1184.0 | 837.2 | 767.7 | 592.0 | 497.8 |
|  | Modal diameter before ultrasonication |  | μm | 383.90 | 6.54 | 6.00 | 209.30 | 176.00 |
|  | Minimum particle size before ultrasonication |  | μm | 3.00 | 1.26 | 1.38 | 2.52 | 2.52 |
|  | Specific surface area per unit volume before ultrasonication: | γB | m²/ml | 0.09 | 0.53 | 0.55 | 0.12 | 0.13 |
| After ultrasonication | Maximum particle size after ultrasonication |  | μm | 704.0 | 497.8 | 456.5 | 74.0 | 62.2 |
|  | Modal diameter after ultrasonication |  | μm | 47.98 | 6.54 | 6.00 | 7.78 | 7.13 |
|  | Minimum particle size after ultrasonication: | dmin | μm | 1.26 | 1.06 | 1.06 | 1.26 | 1.26 |
|  | Specific surface area per unit volume after ultrasonication: | γA | m²/ml | 0.45 | 0.91 | 0.99 | 0.98 | 1.08 |
|  | γA/dmin |  |  | 0.35 | 0.85 | 0.93 | 0.78 | 0.85 |
|  | γB/γA |  |  | 0.21 | 0.59 | 0.56 | 0.13 | 0.12 |
| (Arithmetic mean) Sensory inspection | "Material feel" |  |  | 4 | 4 | 4 | 4 | 4 |
|  | "Swallowability" |  |  | 5 | 4 | 4 | 4 | 4 |
|  | "Fibrous feel" |  |  | 4 | 4 | 4 | 4 | 4 |
|  | "Eating difficulty" |  |  | 4 | 4 | 5 | 4 | 5 |

The composition of one or more embodiments of the present invention is expected to be applied mainly in the food field due to the unprecedented attribution of improving textures (swallowability and a fibrous feel) and a taste (a material feel) described hereinbefore.

Although the disclosure has been described with respect to only a limited number of embodiments, those skilled in the art, having benefit of this disclosure, will appreciate that various other embodiments may be devised without departing from the scope of one or more embodiments of the present invention. Accordingly, the scope of the invention should be limited only by the attached claims.

The invention claimed is:
1. A composition comprising:
    a fine particle composite comprising insoluble dietary fibers; and
    a fat/oil,
    wherein the fine particle composite comprises agglomerated fine particles comprising the insoluble dietary fibers,
    wherein the composition satisfies the following (1) to (8):
        (1) the composition comprises an edible part and an inedible part of a food material comprising insoluble dietary fibers, wherein a dry weight proportion of the inedible part to a sum of the edible part and the inedible part is 1% or more and 80% or less,
        (2) the composition comprises the insoluble dietary fiber at a content of 0.1 mass % or more,
        (3) a content of the fine particles is 2 mass % or more and 98 mass % or less,
        (4) a total fat/oil content is 10 mass % or more and 98 mass % or less,
        (5) the composition comprises water at a content of less than 20 mass %,

(6) a modal diameter after ultrasonication is 0.3 mm or more and 200 mm or less,
(7) a ratio of a specific surface area per unit volume after ultrasonication [m²/mL] to a minimum particle size after ultrasonication [μm] is 0.1 or more,
(8) a ratio of a specific surface area per unit volume before ultrasonication [m²/mL] to the specific surface area per unit volume after ultrasonication [m²/mL] is 0.01 or more and 0.99 or less, and
wherein the insoluble dietary fibers are derived from the edible part and the inedible part of one kind of the food material comprising insoluble dietary fibers.

2. The composition according to claim 1, wherein the total fat/oil content is 20 mass % or more and 98 mass % or less.

3. The composition according to claim 1, wherein a ratio of the total fat/oil content in mass % to a sum of water content in mass % and the total fat/oil content in mass % is 75% or more.

4. The composition according to claim 1, wherein 90 mass % or more of the total fat/oil content is an edible fat/oil in a liquid state at 20° C.

5. The composition according to claim 1, wherein a viscosity by a Bostwick viscometer at a measurement temperature of 20° C. for a measurement time of 1 second is 0.1 cm or more.

6. The composition according to claim 1, wherein a viscosity of a fat/oil part in the composition by a Bostwick viscometer at a measurement temperature of 20° C. for a measurement time of 10 seconds is 10.0 cm or more.

7. The composition according to claim 1, wherein a maximum particle size before ultrasonication is 30 mm or more.

8. The composition according to claim 1, wherein the content of the fine particles is 15 mass % or more and 98 mass % or less.

9. The composition according to claim 1, not comprising an emulsifier as a food additive formulation.

10. The composition according to claim 1, wherein a ratio of a total content of food materials containing the insoluble dietary fibers to a total insoluble component content in the composition is 30 mass % or more.

11. The composition according to claim 1, wherein the food material containing the insoluble dietary fibers is one or more selected from the group consisting of nuts/seeds, grains, pulses, vegetables, tubers, roots, mushrooms and fruits.

12. The composition according to claim 11, wherein the food material containing the insoluble dietary fibers is one or more selected from the group consisting of carrots, pumpkins, corns, edamame, bell peppers, beets, green peas, broccolis and tomatoes.

13. The composition according to claim 11, wherein the inedible part of the food material containing the insoluble dietary fibers is one or more selected from the group consisting of corn cores, bell pepper seeds or stems, pumpkin seeds or guts, carrot skins or stems, green pea pods, beet skins, broccoli stalks and leaves, edamame pods and tomato stems.

14. The composition according to claim 11, wherein a water activity value of the food material containing the insoluble dietary fibers is 0.10 or more and 0.95 or less.

15. The composition according to claim 1, comprising a pulverized product of the food material comprising the insoluble dietary fibers.

16. The composition according to claim 15, wherein the pulverized product is a stirred media mill-treated product of a dried food material.

17. The composition according to claim 16, wherein the stirred media mill-treated product is a wet stirred media mill-treated product.

18. A method for producing the composition according to claim 1, the method comprising:
pulverizing a food material containing insoluble dietary fibers selected from the group consisting of dried nuts/seeds, dried grains, dried pulses, dried vegetables, dried tubers, dried roots, dried mushrooms and dried fruits to produce dried pulverized products of the food material,
wherein a water activity value of the food material containing the insoluble dietary fibers is 0.95 or less,
adding a fat/oil to the dried pulverized products, and
carrying out a microrefinement treatment on the dried pulverized products with a presence of the fat/oil to produce the composition comprising:
the fine particle composite comprising the agglomerated fine particles of the insoluble dietary fibers, and
the fat/oil,
wherein the composition satisfies the following (1) to (8):
(1) the composition comprises the edible part and the inedible part of the food material comprising the insoluble dietary fibers, and a dry weight ratio of the inedible part to the sum of the edible part and the inedible part is 1% or more and 80% or less,
(2) the composition comprises the insoluble dietary fibers at the content of 0.1 mass % or more,
(3) the content of the fine particles is 2 mass % or more and 98 mass % or less,
(4) the total fat/oil content is 10 mass % or more and 98 mass % or less,
(5) the composition comprises water at a content of less than 20 mass %,
(6) the modal diameter after ultrasonication is 0.3 mm or more and 200 mm or less,
(7) the ratio of the specific surface area per unit volume after ultrasonication [m²/mL] to the minimum particle size after ultrasonication [μm]) is 0.1 or more,
(8) the ratio of the specific surface area per unit volume before ultrasonication [m²/mL] to the specific surface area per unit volume after ultrasonication [m²/mL]) is 0.01 or more and 0.99 or less, and
wherein the insoluble dietary fibers are derived from the edible part and the inedible part of one kind of the food material containing the insoluble dietary fibers.

19. The composition according to claim 11, wherein the food material containing the insoluble dietary fibers is one or more selected from the group consisting of bract, pistil and cob of corns; gut, seed and both ends of squash; stem, core and seed of green peppers; root end, skin and petiole of beets; stalk and leaf of broccoli; stem of tomato; core of cabbage; base of spinach; petiole base of kale; seed coat and/or pod of bean; root end and petiole base of carrots; epidermis and both ends of tubers or roots.

* * * * *

UNITED STATES PATENT AND TRADEMARK OFFICE
CERTIFICATE OF CORRECTION

| | |
|---|---|
| PATENT NO. | : 12,004,551 B2 |
| APPLICATION NO. | : 17/115616 |
| DATED | : June 11, 2024 |
| INVENTOR(S) | : Takeki Saito |

It is certified that error appears in the above-identified patent and that said Letters Patent is hereby corrected as shown below:

In the Claims

Column 85, Claim 1, Line 1, "0.3 mm" should read -- 0.3 µm --, and Line 2, "200 mm" should read -- 200 µm --;

Column 85, Claim 7, Line 32, "30 mm" should read -- 30 µm --; and

Column 86, Claim 18, Line 40, "0.3 mm" should read -- 0.3 µm --, and Line 41, "200 mm" should read -- 200 µm --.

Signed and Sealed this
Sixth Day of August, 2024

Katherine Kelly Vidal
*Director of the United States Patent and Trademark Office*